US008688834B2

(12) United States Patent
Fujimoto et al.

(10) Patent No.: US 8,688,834 B2
(45) Date of Patent: Apr. 1, 2014

(54) DYNAMIC HOST CONFIGURATION AND NETWORK ACCESS AUTHENTICATION

(75) Inventors: Kensaku Fujimoto, Bridgewater, NJ (US); Yasuhiro Katsube, Franklin Lakes, NJ (US); Yoshihiro Oba, Fort Lee, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1194 days.

(21) Appl. No.: 10/975,497

(22) Filed: Oct. 29, 2004

(65) Prior Publication Data

US 2006/0036733 A1 Feb. 16, 2006

Related U.S. Application Data

(60) Provisional application No. 60/586,400, filed on Jul. 9, 2004.

(51) Int. Cl.
*G06F 15/177* (2006.01)
*G06F 15/173* (2006.01)
*G06F 15/16* (2006.01)
*H04L 29/06* (2006.01)

(52) U.S. Cl.
USPC ........... 709/225; 709/222; 709/223; 709/227; 709/229; 713/155; 726/11; 726/12; 726/13; 726/14

(58) Field of Classification Search
USPC ......... 709/220–222, 225, 227–230, 237, 245, 709/248, 223; 375/354–357; 713/155; 726/11–14
See application file for complete search history.

(56) References Cited

U.S. PATENT DOCUMENTS 5,673,254 A 9/1997 Crayford
6,393,484 B1 5/2002 Massarani
(Continued)

FOREIGN PATENT DOCUMENTS

CN 1437114 A 8/2003
JP 2001-292135 A 10/2001
(Continued)

OTHER PUBLICATIONS

International Search Report dated Jan. 11, 2008 (3 pages).
(Continued)

*Primary Examiner* — Gregory Todd
(74) *Attorney, Agent, or Firm* — Westerman, Hattori, Daniels & Adrian, LLP

(57) ABSTRACT

According to some embodiments, systems and methods for binding dynamic host configuration and network access authentication are provided related to, inter alia, interactions between a PAA (PANA Authentication Agent) and a DHCP (Dynamic Host Configuration Protocol) server, such as, e.g., for synchronization between the PANA SA state and the DHCP SA state, such as, e.g., maintaining synchronization when a connection is lost. In some embodiments, systems and methods for binding network bridge and network access authentication are also provided related to, inter alia, interactions between a PAA and a layer-2 switch, such as, e.g., for avoiding service thefts and the like (such as, e.g., MAC address and/or IP address spoofing) in the context of, e.g., the above. In some other embodiments, systems and methods for bootstrapping multicast security from network access authentication protocol are also provided related to, inter alia, key management for protected IP multicast streams, such as, e.g., to avoid IP multicast streams unnecessarily received and/or processed by unauthorized receivers connected to the same layer 2 segment as authorized receivers in the context of, e.g., the above.

12 Claims, 59 Drawing Sheets

(56) References Cited

U.S. PATENT DOCUMENTS

| | | | |
|---|---|---|---|
| 6,587,680 B1* | 7/2003 | Ala-Laurila et al. | 455/411 |
| 6,615,264 B1* | 9/2003 | Stoltz et al. | 709/227 |
| 6,640,251 B1 | 10/2003 | Wiget et al. | |
| 6,704,789 B1* | 3/2004 | Ala-Laurila et al. | 709/230 |
| 7,627,116 B2* | 12/2009 | Yanovsky | 380/46 |
| 2002/0075844 A1* | 6/2002 | Hagen | 370/351 |
| 2002/0199120 A1* | 12/2002 | Schmidt | 713/201 |
| 2003/0182431 A1* | 9/2003 | Sturniolo et al. | 709/227 |
| 2004/0148504 A1 | 7/2004 | Forsberg | |
| 2004/0160904 A1* | 8/2004 | Enomoto et al. | 370/256 |
| 2005/0060535 A1* | 3/2005 | Bartas | 713/154 |
| 2005/0177515 A1* | 8/2005 | Kalavade et al. | 705/52 |
| 2006/0002351 A1* | 1/2006 | Madour | 370/338 |
| 2006/0002557 A1* | 1/2006 | Madour | 380/270 |

FOREIGN PATENT DOCUMENTS

| | | |
|---|---|---|
| JP | 2002-084306 A | 3/2002 |
| JP | 2003-513514 A | 4/2003 |
| JP | 2004-147228 A | 5/2004 |
| KR | 1999-021934 B1 | 3/1999 |
| KR | 2001-092028 A | 10/2001 |

OTHER PUBLICATIONS

B. Cain, Internet Group Management Protocol Version 3, Oct. 2002, p. 1-50, The Internet Society, USA.
R. Vida. Multicast Listener Discovery Version 2 for IPv6, Jun. 2004, p. 1-58, The Internet Society, USA.
Access Control for Mobile Mulitcast, OCR Text, p. 1-17, USA.
M. Christensen, Considerations for IGMP and MLD Snooping Switches, May 2004, The Internet Society, USA.
B. Lloyd, PPP Authentication Protocols, Oct. 1992, p. 1-15, USA.
M. Baugher, The Secure Real-time Transport Protocol, Mar. 2004, p. 1-53, The Internet Society, USA.
J. Arkko, Mikey: Multimedia Internet KEYing, Dec. 2003, p. 1-64, The Internet Society, USA.
M. Thomas, Kerberized Internet Negotiation of Keys (KINK), Jan. 21, 2003, p. 1-42, The Internet Society, USA.
T. Hardjono, The Multicast Group Security Architecture, Mar. 2004, p. 1-25, The Internet Society, USA.
H. Harn, GSAKMP: Group Secure Association Key Management Protocol, Jun. 20, p. 1-101,The Internet Society, USA.
T. Narten, Neighbor Discovery for IP Version 6, Dec. 1998, p. 1-87, The Internet Society, USA.
H. Schulzrinne, RTP: A Transport Protocol for Real-Time Applications, Jul. 2003, p. 1-98, The Internet Society, USA.
B. Aboba, Extensible Authentication Protocol, Jun. 2004, p. 1-63, The Internet Society, USA.
Dynamic Host Configuration and Network Access Authentication, p. 1-19, OCR Text, USA.
A. Ballardie, Core Based Trees Multicast Routing, Sep. 1997, p. 1-22, USA.
D. Estrin, Protocol Independent Multicast-Sparse Mode: Protocol Specification, Jun. 1998, p. 1-62, The Internet Society, USA.
D. Forsberg, Protocol for Carrying Authentication for Network Access, May 7, 2004, p. 1-71, The Internet Society, USA.
Chinese Office Action dated May 11, 2010, issued in corresponding Chinese Patent Application No. 200580029696.
Korean Office Action dated Oct. 6, 2010, issued in corresponding Korean Patent Application No. 10-2009-7014270.
Chinese Office Action dated Jun. 2, 2011, issued in corresponding Chinese Patent Application No. 200580029696.X.
Korean Office Action dated Aug. 7, 2012, issued in corresponding Korean Patent Application No. 10-2012-7011243, with English translation (4 pages).
European Search Report dated Mar. 6, 2012, issued in corresponding European Patent Application No. 05771015.4, (11 pages).
D. Forsberg et al.; "Protocol for Carrying Authentication for Network Access (PANA) draft-ietf-pana-pana-03.txt",20040209, vol. pana, No. 3, Feb. 9, 2004, XP015024818, p. 1-71.(cited in European Search Report dated Mar. 6, 2012).
Japanese Office Action dated Feb. 21, 2012, issued in corresponding Japanese Patent Application No. 2010-057792.
Yacine Ei Mghazli "PANA PAA-EP Protocol Requirements", draft-yacine-pana-pana-paa-ep-reqs-00.txt,20030601, Jun. 1, 2003,XP015037061, 11 pages (cited in European Search Report dated Mar. 6, 2012).
Chinese Office Action dated Feb. 13, 2012, issued in corresponding Chinese Patent Application No. 200580029696.X.
Korean Office Action dated Oct. 31, 2011, issued in corresponding Korean Patent Application No. 10-2009-7014270.
English translation only of Chinese Office Action dated Oct. 12, 2012, issued in corresponding Chinese patent application No. 200580029696.X.
European Office Action dated Jan. 28, 2013, issued in corresponding European patent application No. 05 771 015.4.
Japanese Office Action dated Mar. 5, 2013, issued in corresponding Japanese Patent Application No. 2010-057792, with English translation (4 pages).
Japanese Office Action dated Sep. 11, 2012, issued in corresponding Japanese Patent Application No. 2010-057792, with English translation (5 pages).
Korean Office Action dated Sep. 26, 2012, issued in corresponding Korean Patent Application No. 10-2009-7014270, with English translation (5 pages).
Korean Office Action dated Jun. 26, 2013, issued in corresponding Korean Patent Application No. 10-2012-7011243 with English translation (5 pages).
Korean Office Action dated Jul. 24, 2013 issued in corresponding Korean Patent Application No. 10-2013-7007645 with English translation (5 pages).
Japanese Office Action dated Jul. 23, 2013 issued in corresponding Japanese Patent Application No. 2010-057792 with English translation (4 pages).

* cited by examiner

DYNAMIC HOST CONFIGURATION AND NETWORK ACCESS AUTHENTICATION

BACKGROUND

1. Field of the Invention

The present application relates to computer networks, especially dynamic host configuration, multicast security and network access authentication.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (ie., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANS) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Dynamic Host Configuration Protocol:

Dynamic Host Configuration Protocol (DHCP) is a communications protocol which enables administrators to manage and/or automate IP address assignments in a network. With Internet Protocol (IP), every device that connects to the Internet needs a unique IP address. When an ISP or organization connects a user's computer to the Internet, an IP address needs to be assigned to that device. DHCP enables an administrator to distribute IP addresses and send a new IP address when a computer is plugged into a different place in the network. DHCP also supports static addresses for computers containing Web servers that need a permanent IP address. DHCP is an extension of an earlier network IP management protocol, Bootstrap Protocol (BOOTP).

As detailed in RFC2131 entitled Dynamic Host Configuration Protocol by R. Droms, March, 1997, DHCP provides configuration parameters to Internet hosts. DHCP includes two components: a protocol for delivering host-specific configuration parameters from a DHCP server to a host and a mechanism for allocation of network addresses to hosts. See RFC2131. "DHCP is built on a client-server model, where designated DHCP server hosts allocate network addresses and deliver configuration parameters to dynamically configured hosts." Id.

As described in RFC2131, a DHCP server refers to a host providing initialization parameters through DHCP and a DHCP client refers to a host requesting initialization parameters from a DHCP server. A host does not act as a DHCP server unless appropriately configured by a system administrator. DHCP supports three mechanisms for IP address allocation: 1) "automatic allocation" in which DHCP assigns a permanent IP address to a client; 2) "dynamic allocation" in which DHCP assigns an IP address to a client for a limited period of time (or until the client explicitly relinquishes the address); and 3) "manual allocation" in which a client's IP address is assigned by a network administrator, and DHCP is used to convey the assigned address to the client. Of these, dynamic allocation allows automatic reuse of an address that is no longer needed by a client to which it was assigned. Thus, dynamic allocation is useful for assigning an address to a client that will be connected to the network only temporarily or for sharing a limited pool of IP addresses among a group of clients that do not need permanent IP addresses. See Id. In addition, "dynamic allocation may also be a good choice for assigning an IP address to a new client being permanently connected to a network where IP addresses are sufficiently scarce that it is important to reclaim them when old clients are retired." Id.

While a variety of systems and methods are known, there remains a need for improved systems and methods.

SUMMARY OF THE PREFERRED EMBODIMENTS

The preferred embodiments of the present invention can significantly improve upon existing methods and/or apparatuses.

According to some embodiments, systems and methods for binding dynamic host configuration and network access authentication are provided related to, inter alia, interactions between an Authentication Agent (e.g., PAA) and a DHCP server, such as, e.g., for synchronization between an authentication SA state (e.g., a PANA SA state) and a DHCP SA state, such as, e.g., for maintaining synchronization when a connection is lost.

According to some embodiments, systems and methods for binding network bridge and network access authentication are provided related to, inter alia, interactions between an Authentication Agent (e.g., a PAA) and a layer-2 switch, such as, e.g., for avoiding service thefts and the like (such as, e.g., MAC address and/or IP address spoofing) in the context of, e.g., the above.

According to some embodiments, systems and methods for bootstrapping multicast security from network access authentication protocol are provided related to, inter alia, key management for protected IP multicast streams, such as, e.g., to avoid IP multicast streams unnecessarily received and/or processed by unauthorized receivers connected to the same layer 2 segment as authorized receivers in the context of, e.g., the above.

BRIEF DESCRIPTION OF THE DRAWINGS

The preferred embodiments of the present invention are shown by a way of example, and not limitation, in the accompanying figures, in which:

FIG. 1 is a schematic diagram of a general architectural model;

FIG. 2 is a schematic diagram illustrating, among other things, network access authentication and DHCP;

FIG. 3 is a schematic diagram illustrating, among other things, a server's behavior in the case an authentication session is gone;

FIG. 4 is a schematic diagram illustrating, among other things, a client's behavior in the case an authentication session is gone;

FIG. 5 is a schematic diagram illustrating, among other things, an AAA-key update method 1: DHCP key remains unchanged;

FIG. 6 is a schematic diagram illustrating, among other things, an AAA-key update method 2: Deferred DHCP key update;

FIG. 7 is a schematic diagram illustrating, among other things, an AAA-key update method 3: Immediate DHCP key update;

FIG. 8 is a schematic diagram illustrating, among other things, a DHCP server restart method 1: Non-volatile storage;

FIG. 9 is a schematic diagram illustrating, among other things, a DHCP server restart method 2: Reboot from scratch;

FIG. 10 is a schematic diagram illustrating, among other things, a DHCP server restart method 3: Ask Authenticator for keys;

FIG. 11 is a schematic diagram illustrating, among other things, a DHCP lifetime expiration method 1: Keep current DHCP key; and FIG. 12 is a schematic diagram illustrating, among other things, a DHCP lifetime expiration method 2: Require re-authentication.

FIG. 13 is a schematic diagram illustrating, among other things, possible service thefts: MAC and IP address spoofing;

FIG. 14 is a schematic diagram illustrating, among other things, an outline of an example network;

FIG. 15 is a schematic diagram illustrating, among other things, illustrative packet filtering functionality;

FIG. 16 is a schematic diagram illustrating, among other things, illustrative forwarding with a Port Identifier Tag (PIT) functionality;

FIG. 17 is a schematic diagram illustrating, among other things, session identification with PIT;

FIG. 18 is a schematic diagram illustrating, among other things, an example of a PIT message format;

FIGS. 19-23 are schematic diagrams illustrating, among other things, an illustrative example 1: Step 1-A to Step 5-A, respectively;

FIGS. 24-25 are schematic diagrams illustrating, among other things, an illustrative example 1: Step 4-B to Step 5-B, respectively;

FIG. 26 is a schematic diagram showing an illustrative example 1: threat 1;

FIG. 27 is a schematic diagram showing an illustrative example 1: threat 2 (Step 1-A to 3-A and 4-B);

FIG. 28 is a schematic diagram illustrating, among other things, an illustrative example 1: threat 2 (Step 5-B);

FIG. 29 is a schematic diagram showing an illustrative example 1: threat 2: simultaneous attacks;

FIG. 30 is a schematic diagram showing an illustrative example 1: threat 3;

FIGS. 31 to 37 are schematic diagrams showing illustrative example 2: Step 1-A to 7-A, respectively;

FIG. 38 is a schematic diagram showing an illustrative example 2: threat 1 & 2: multiple sessions at Step 5-A; and FIG. 39 is a schematic diagram showing an illustrative example 2: threat 1 & 2: multiple sessions at Step 7-A.

FIG. 40 is a schematic architectural diagram of an illustrative IP Multicast Network;

FIG. 41 is a schematic architectural diagram of an example packet forwarding path for 160 (S1, G);

FIG. 42 is a schematic architectural diagram of an example packet forwarding path for (S2, G);

FIG. 43 is a schematic architectural diagram of an illustrative IP Multicast Network with a shared link;

FIG. 44 is a schematic architectural diagram of an example packet forwarding path for (S1, G);

FIG. 45 is a schematic architectural diagram of a multicast listener discovery (query);

FIG. 46 is a schematic architectural diagram of a multicast listener discovery (report);

FIG. 47 is a schematic architectural diagram showing multicast data packet forwarding without MLD snooping;

DETAILED DESCRIPTION OF THE PREFERRED EMBODIMENTS

Figure 1:
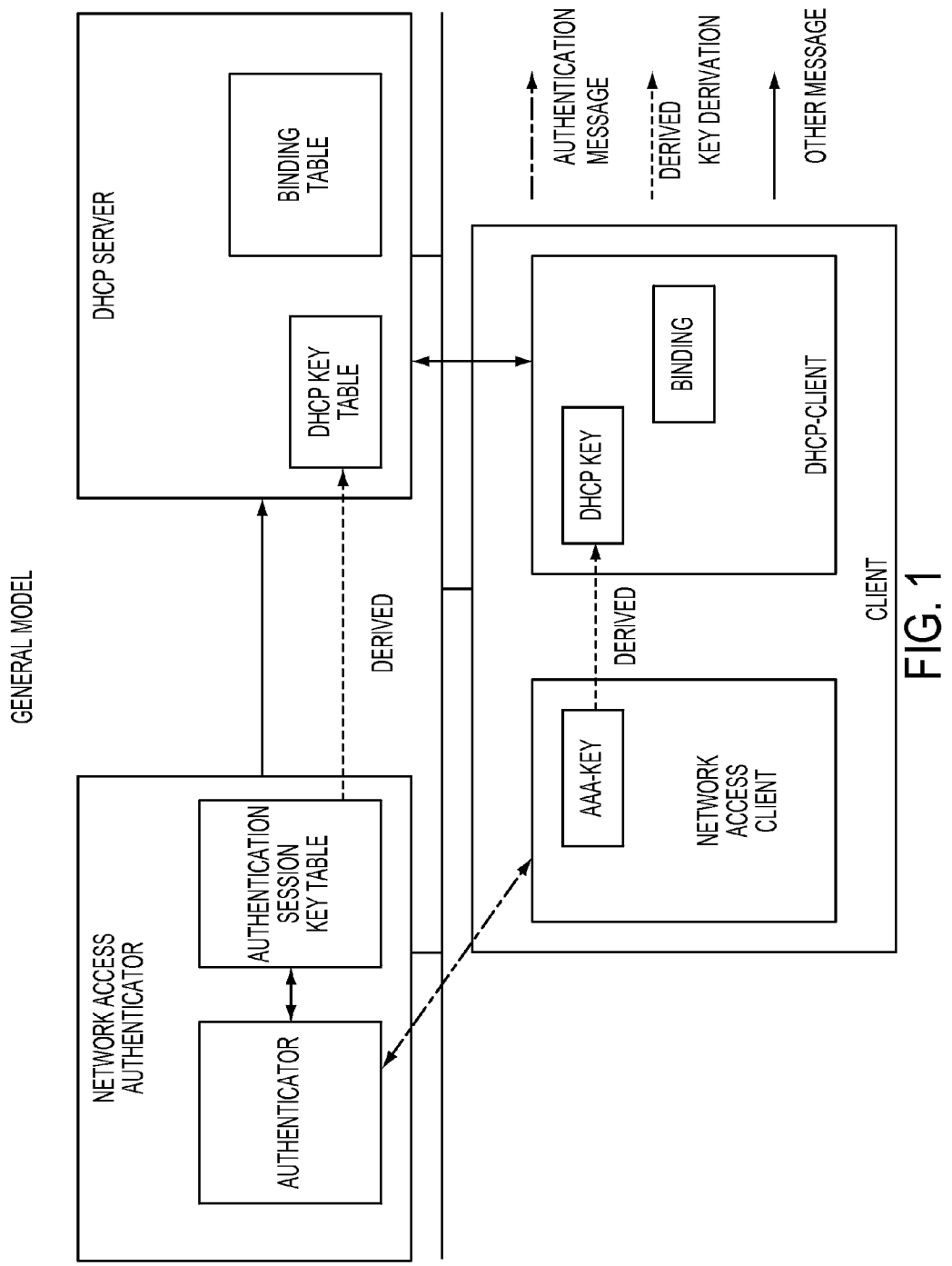
FIGS. 1-12 are illustrative schematic diagrams demonstrating, inter alia, features according to some preferred embodiments of the invention related to, inter alia, binding dynamic host configuration and network access authentication related to Part I of the detailed description of the preferred embodiments, and more particularly.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

In the following detailed description, preferred embodiments of the invention are described in three parts. Part I entitled Binding Dynamic Host Configuration and Network Access Authentication relates to, inter alia, interactions between a PAA (PANA Authentication Agent) and a DHCP server. Among other things, Part I describes methodologies for synchronization between the PANA SA state and the DHCP SA state, such as, e.g., maintaining synchronization when a connection is lost. On the other hand, Part II entitled Binding Network Bridge and Network Access Authentication relates to, inter alia, interactions between a PAA and a layer-2 switch. Among other things, Part II describes methodologies for avoiding service thefts and the like (such as, e.g., MAC address and/or IP address spoofing) in the context of Part I. On the other hand, Part III entitled Bootstrapping Multicast Security from Network Access Authentication Protocol relates to, inter alia, key management for protected IP multicast streams. Among other things, Part III describes methodologies of avoiding IP multicast streams being unnecessarily received and/or processed by unauthorized receivers connected to the same layer 2 segment as authorized receivers in the context of Part I.

Part I: Binding Dynamic Host Configuration and Network Access Authentication

1. Existing Protocols

RFC2131, discussed above and incorporated herein by reference in its entirety, of the Internet Engineering Task Force (IETF) defines Dynamic Host Configuration Protocol (DHCP). As discussed above, DHCP provides a framework for passing configuration information to hosts on a TCP/IP network. DHCP has the capability of automatic allocation of reusable network addresses and additional configuration options.

RFC3118, incorporated herein by reference in its entirety, of the IETF describes Authentication for DHCP Messages, which defines the DHCP option through which authorization tickets can be easily generated and newly attached hosts with proper authorization can be automatically configured from an authenticated DHCP server.

RFC3315, incorporated herein by reference in its entirety, of the IETF defines Dynamic Host Configuration Protocol for IPv6 (DHCPv6). DHCPv6 enables DHCP servers to pass configuration parameters such as IPv6 network addresses to IPv6 nodes. It offers the capability of automatic allocation of reusable network addresses and additional configuration flexibility. RFC3315 also includes Delayed Authentication Protocol for DHCPv6.

The Internet Draft-document entitled Bootstrapping RFC3118 Delayed DHCP Authentication Using EAP-based Network Access Authentication, by A. Yegin, et al., dated 02-09-2004 found at [http://www.ieff.org/internet-drafts/Yegin-Eap-Boot-RFC3118-00.txt] and incorporated herein by reference in its entirety describes bootstrapping RFC3118 Delayed DHCP Authentication using EAP-based Network Access Authentication. It outlines how EAP-based network access authentication mechanisms can be used to establish a local trust relation and generate keys that can be used in conjunction with RFC3118.

2. Some Current Limitations

RFC3118 and RFC3315 describe how DHCP/DHCPv6 message can be authenticated using Delayed Authentication Protocol, but they do not describe anything about configuring shared keys required to initiate Delayed Authentication Protocol. On the other hand, Draft-Yegin-EAP-Boot-rfc3118-00.txt describes how to generate keys using EAP-based network access authentication mechanisms, so it enables to initiate Delayed Authentication Protocol at the very first time a DHCP client host attached to the network.

However, Draft-Yegin-EAP-Boot-rfc3118-00.txt does not contemplate nor describe how EAP-based authentication session and DHCP sessions can most effectively interact each other after the first bootstrapping of DHCP.

The present inventors have developed new architectures and relationships between network access authentication mechanisms and host configuration mechanisms having significant advantages over existing art. Among other things, according to some preferred embodiments of the invention, systems and methods for how DHCP and authentication sessions can be dealt with in following cases are provided:

termination: e.g., cases in which authentication sessions are terminated;

updating: e.g., cases in which authentication session keys are updated;

restarting: e.g., cases in which DHCP servers need to be restarted;

expiration: e.g., cases in which lifetimes of DHCP bindings expire; and/or new session establishment: e.g., cases in which a new authentication session is established.

3. Proposed Methods

FIG. 1 labeled "General Model" shows a basic environment within which some of the preferred embodiments can be implemented. In this illustrative environment, the Authenticator is preferably a functional entity that has a capability to authenticate clients and authorize their network access through the access network. In addition, the EAP server is preferably an entity that executes an EAP authentication method to authenticate EAP clients. In addition, the PANA server is preferably an entity that authenticates PANA clients by using EAP.

Although FIG. 1 shows, for illustrative purposes, an Authenticator, a DHCP server and a Client, other embodiments may be varied as would be appreciated by those in the art based on this disclosure. For example, other embodiments can employ multiple Authenticators, multiple DHCP servers and/or multiple Clients.

Figure 2:
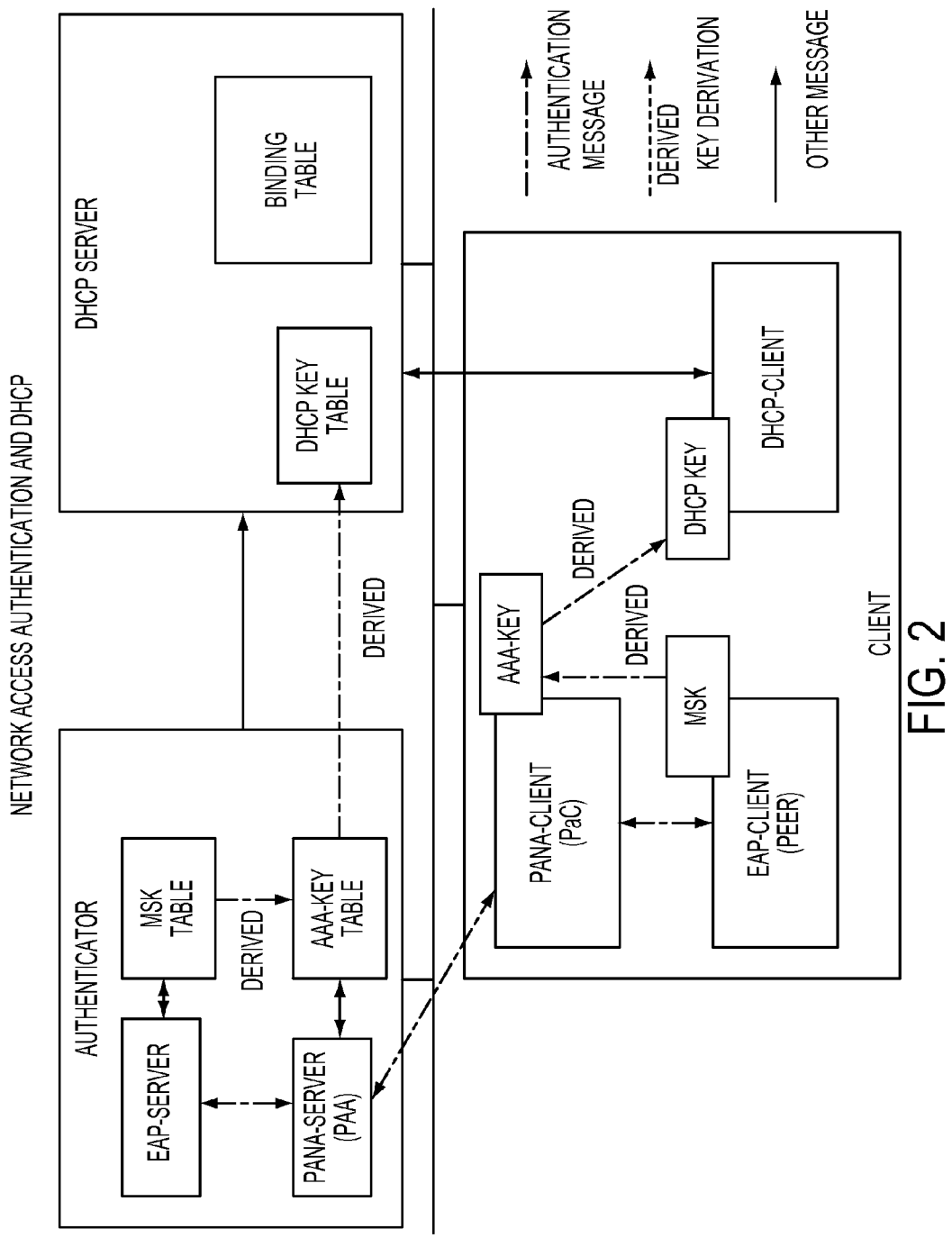

FIG. 2 labeled "Network Access Authentication and DHCP" helps to demonstrate some principles employed within some of the preferred embodiments.

While some illustrative examples are described in the context wherein PANA is used as the protocol to carry authentication information for network access and EAP is used as the actual authentication protocol that is carried by the protocol to carry authentication information for network access, these are merely some examples. Various embodiments of the present invention can, as would be well appreciated based on this disclosure, can be applied to any protocol or set of protocols that provides a similar functionality as PANA and EAP—e.g., functionality to establish an authentication session key between a client and an authenticator as a result of successful authentication and authorization. As some examples, the systems and methods of the preferred embodiments can be employed within an access network where IEEE 802.1X is used as a protocol to carry EAP.

In addition, although the figures illustrate cases where a EAP-server and a PANA-server are co-located in a single node, these two entities can be implemented in separate nodes, such as, e.g., using an AAA protocol to carry EAP messages between them. Also, in such examples, authentication session keys may be expressed as AAA Keys.

3.1. Server Behavior when Authentication Session is Terminated

Figure 3:
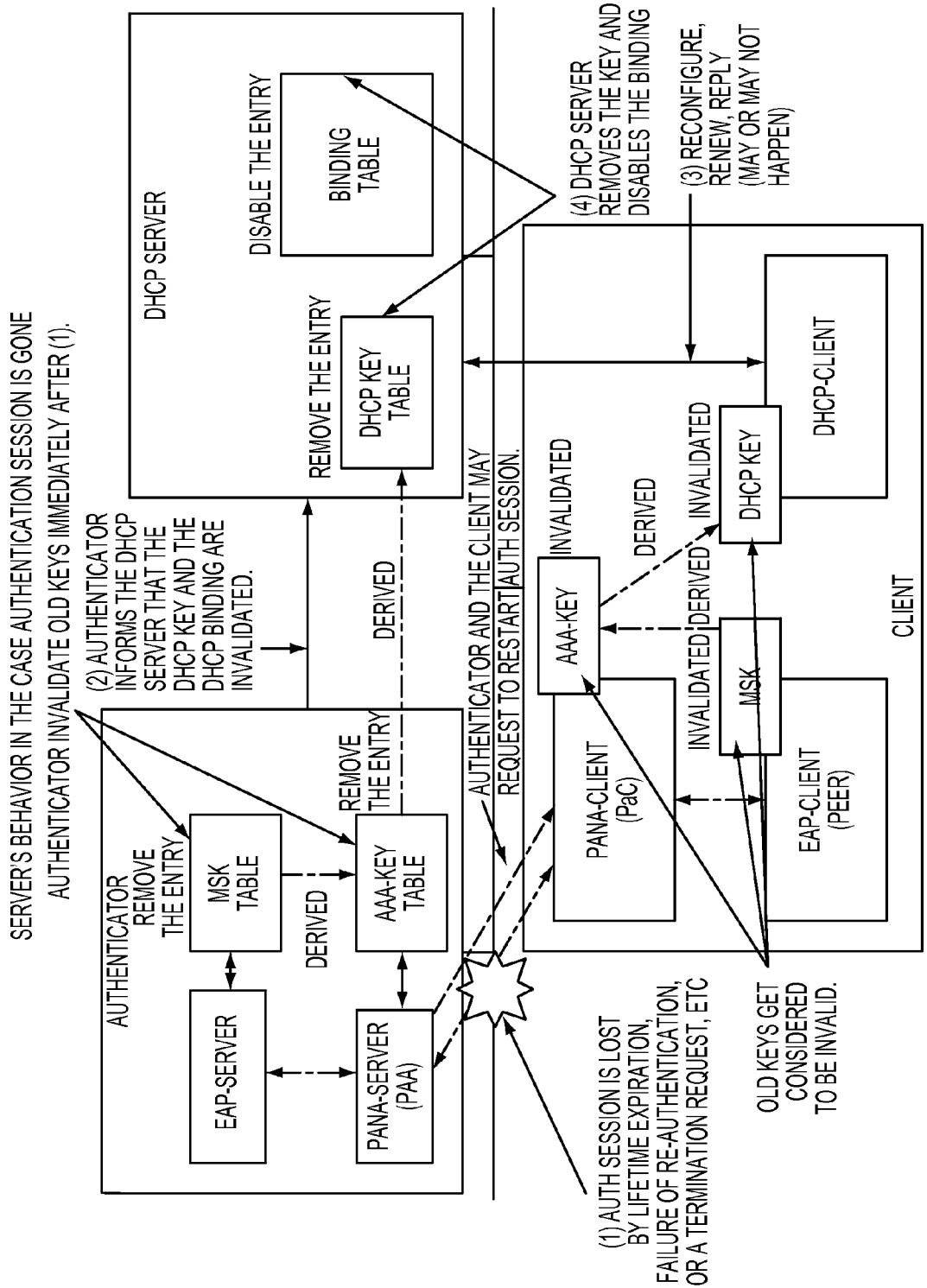

This section describes how the Authenticator and the DHCP server behave when the authentication session is terminated purposely or accidentally in some preferred embodiments. In this regard, FIG. 3 labeled "Server's Behavior in the Case Authentication Session Is Gone" is used for reference.

(1) Typically, the Authenticator notices the authentication session has terminated. The cases the Authenticator can notice the termination of an authentication session include:
   expiration of the lifetime of the authentication session;
   failure during re-authentication of the client;
   receiving a termination request from the client.
In such situations, the Authenticator may or may not send an authentication request message to try restarting a new authentication session if the termination is considered to be an accident.

(2) According to some preferred embodiments of the invention, the Authenticator can inform the DHCP server that the DHCP key derived from the authentication session that just terminated is no longer valid. Among other things, this can be advantageous because the DHCP server typically stores old configuration files even when a session has terminated. Preferably, the Authenticator informs the DHCP server as soon as the authenticator recognizes the termination of the authentication session. In various embodiments, there are a number of potential implementations for Authenticator to inform the DHCP server of an invalidity or change of the status of DHCP keys.

In a first example, the configuration file can be rewritten or reloaded. For instance, the Authenticator can modify the configuration file of the DHCP server. Then, it can make the DHCP server restart or it can send a signal asking the DHCP server to read the configuration file again.

In a second example, a request can be sent to the DHCP server to delete the client configuration. For instance, the Authenticator can send a request message through a communication protocol such as IP or UNIX domain socket.

(3) In some systems, optional features may include that if the DHCP server receives a message of a DHCP key revocation, and if the Host Configuration Protocol allows, the DHCP server requests the DHCP client to release bindings allocated to the client in the previous DHCP messages. By way of example, a DHCPv6 server can request the client to update its bindings by following illustrative steps:

1. The DHCPv6 server sends a Reconfigure message using the previous DHCP key.
2. The DHCPv6 client sends a Renew message or Information-request message to the DHCP server.
3. The DHCPv6 server checks DHCP Authentication option using the previous DHCP key and sends a Reply message including bindings with a lifetime of zero.
4. The DHCPv6 client stops using the old bindings and may begin to request new bindings.
5. The DHCPv6 server discards messages with the previous DHCP key.

In some instances, if the client notices the termination of the authentication session, then the client will discard the previous key by itself. Accordingly, the above step 2 and the subsequent steps may not happen in such cases.

(4) In some systems, the DHCP server removes the DHCP key and makes the binding disabled. The following possible implementations to make binding entries disabled exist:
   Removing the entries from the binding table;
   Forcing lifetimes of entries to be zero as if they are expired.
It is noted that removing entries from the binding table does not mean that the resources for them are freed. For example, the client may possibly continue to accidentally use the resources. The DHCP server can check whether the resources related to the binding are still used by any entity in the network or not. For example, RFC2131 describes that the allocating (DHCPv4) server should probe the reused address before allocating the address, such as, e.g., with an ICMP echo request. DHCPv6 servers can check the consistency of network resources in similar manners.

3.1.1. Client Behavior when Authentication Session is Gone

Figure 4:
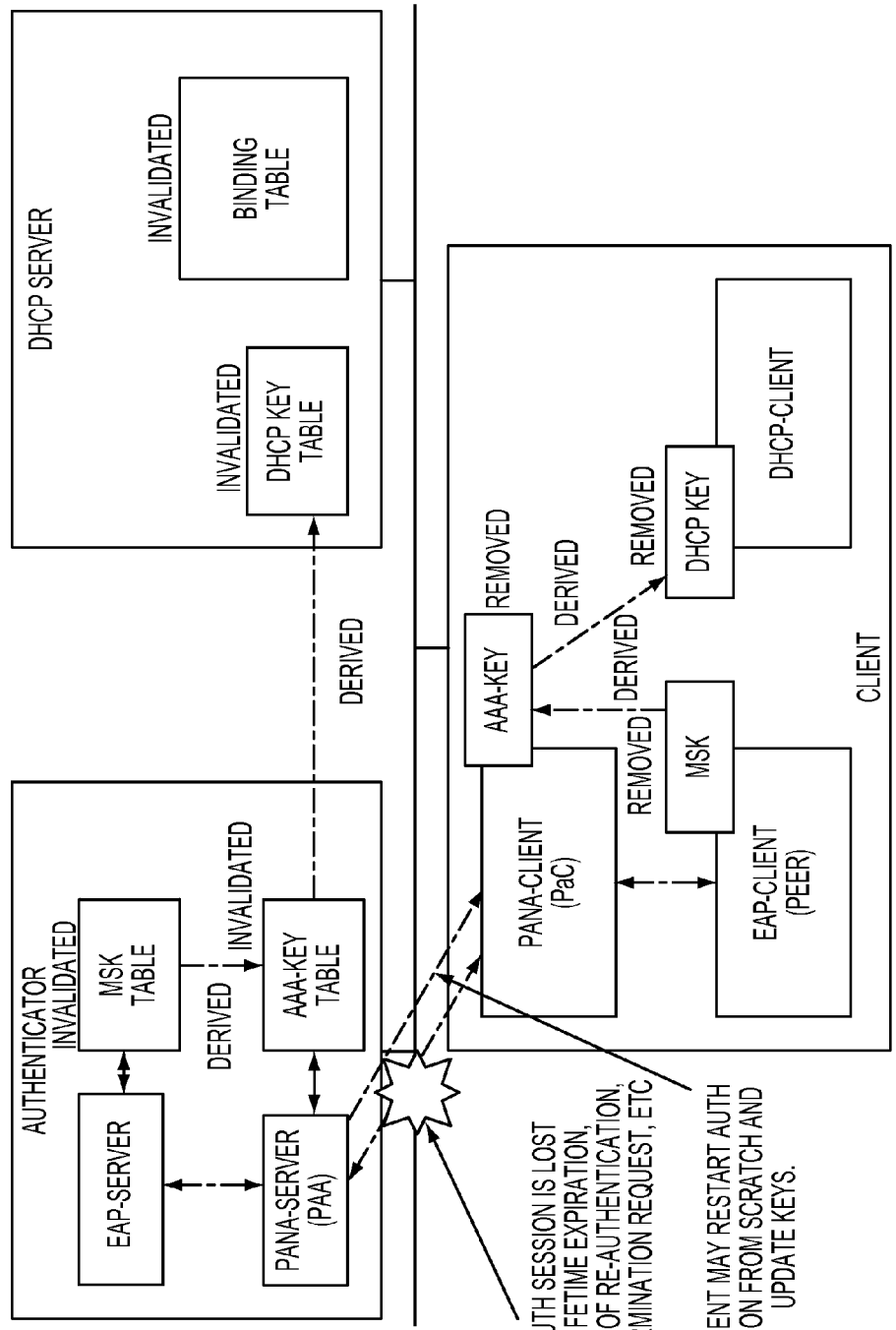

This subsection describes how the client deals with termination of the authentication session from the viewpoint of the client. In this regard, FIG. 4 entitled "Client's Behavior in the Case Authentication Session Is Gone" illustrates features related thereto. With reference to FIG. 4, the system performs the following steps.

(1) First, as shown at (1) in the figure, the client notices the authentication session is terminated. In this regard, the cases that the client can notice the termination of an authentication session include:
   an expiration of a lifetime of an authentication session;
   a failure of a re-authentication;
   a termination request.

(2) Second, the client stops using resources allocated by the DHCP server. The client may or may not send a Release message to release the bindings using the previous DHCP key.

(3) Third, as shown at (3) in the figure, the client restarts a new authentication session and get new keys, if necessary.

3.2. The Case that Authentication Session Keys are Updated

According to some preferred embodiments, DHCP keys are specially dealt with when the authentication session keys are updated. In the preferred embodiments, three potential methodologies are available.

In some embodiments, the client and the authenticator and/or the dynamic host configuration server can negotiate regarding which methodologies are to be employed. For example, in some embodiments, the client may send a signal indicating which methods it supports. For example, in some embodiments, a method performed by a client device for use in a system for binding dynamic host configuration and network access authentication when authentication session keys are updated might include: upon termination of either of said authentication session or said dynamic host configuration session or upon beginning such a session, said client device sends a message identifying which dynamic host configuration key handling methodologies that client device supports to deal with such termination or beginning. In some embodiments, said client device sends said message to the authenticator. In some embodiments, said client device sends said message to the dynamic host configuration server.

3.2.1. DHCP Key Remains Unchanged (Method 1)

Figure 5:
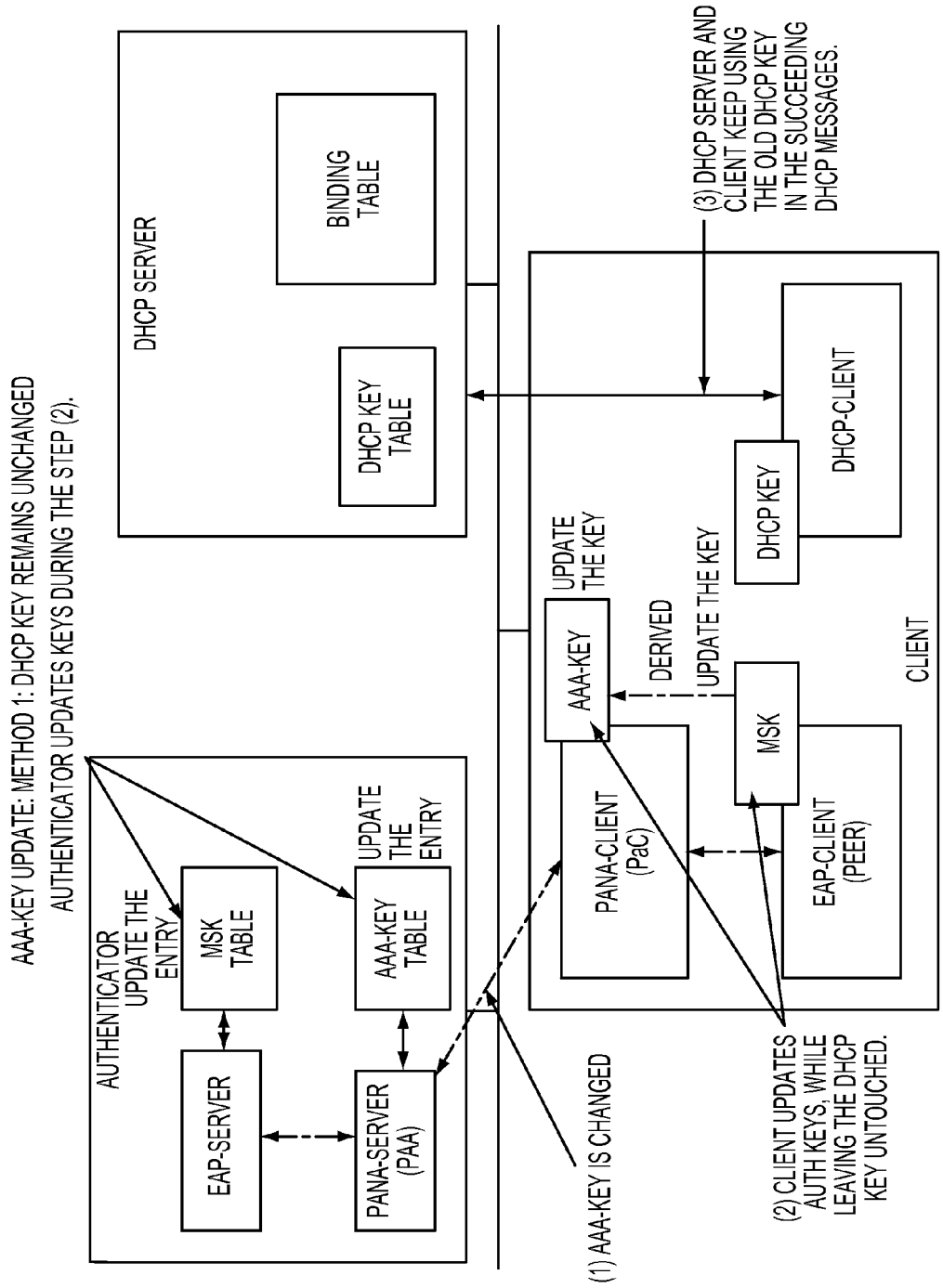

According to a first embodiment, a first method includes that the DHCP key remains unchanged, while the authentication keys are changed. FIG. 5 labeled "AAA-Key Update: Method 1: DHCP Key Remains Unchanged" helps to illustrate features according to preferred implementations of this embodiment. With reference to FIG. 5, the system preferably performs the following steps:

(1) First, as shown at (1) in the figure, the authentication session keys are changed in the authentication session.

(2) Second, as shown at (2) in the figure, the client updates the authentication session keys, while leaving the DHCP key untouched. The Authenticator does not send anything about the DHCP key to the DHCP server.

(3) Third, as shown at (3) in the figure, when DHCP message exchanges are required by the client or the DHCP server, they keep using the same DHCP key.

3.2.2 Deferred DHCP Key Update (Method 2)

Figure 6:
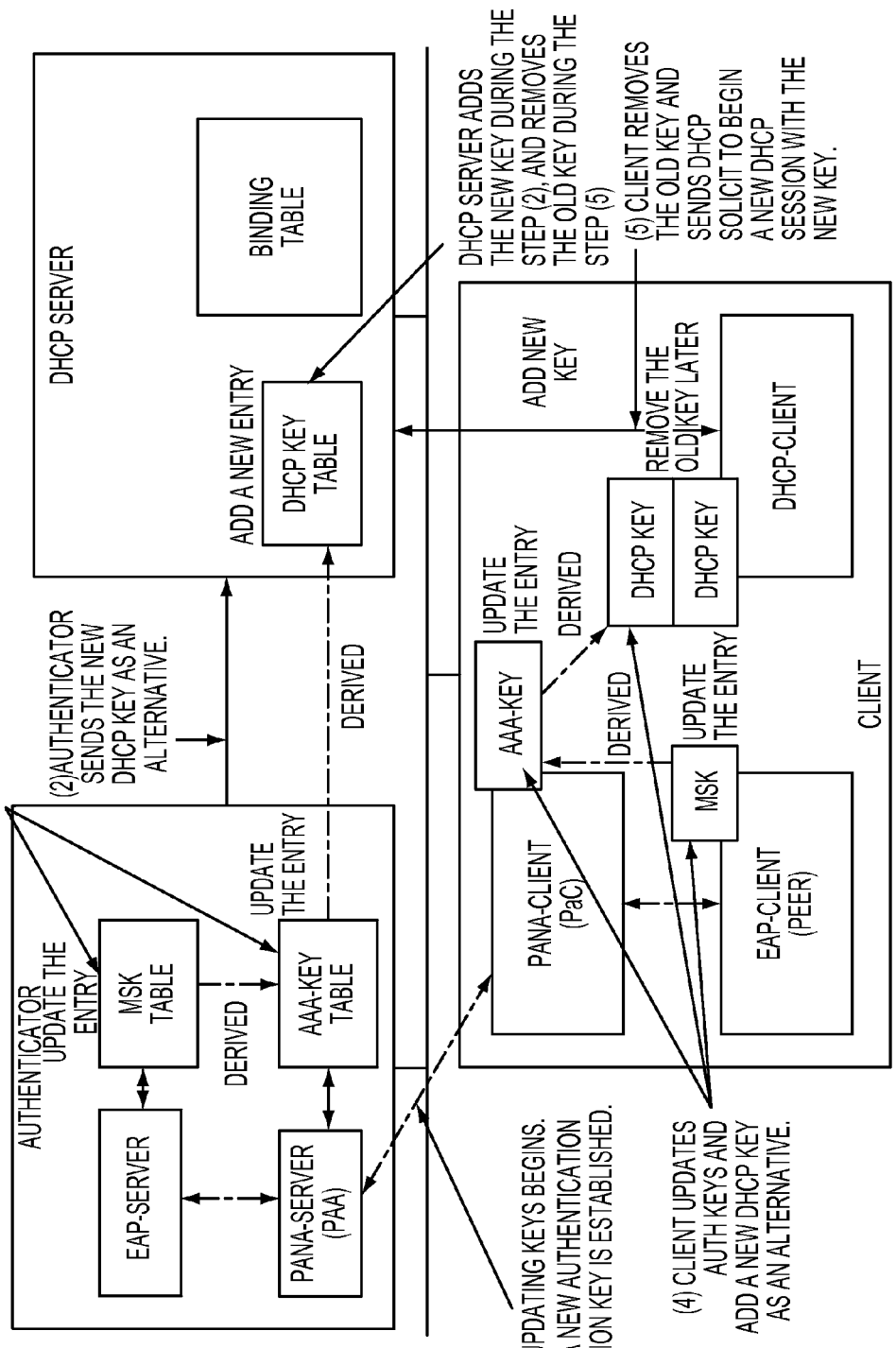

According to a second embodiment, a second method includes that the DHCP key is updated at a later time. Notably, the changing of the authentication session keys does not cause immediate DHCP message exchanges. Thus, in some preferred embodiments, the DHCP server and the client will update the DHCP key, when they need DHCP message exchanges for the first time after changing keys. In this regard, FIG. 6 labeled "AAA-Key Update: Method 2: Deferred DHCP Key Update" shows preferred features according to this illustrative embodiment. With reference to FIG. 6, the system preferably performs the following steps:

(1) First, as shown at (1) in the figure, an authentication session key update is triggered by an event;

(2) Second, as shown at (2) in the figure, the Authenticator sends the new DHCP key to the DHCP server;

(3) Third, as shown at (3) in the figure, a new authentication session key is established between the authenticator and the client;

(4) Fourth, as shown at (4) in the figure, the client also stores a new DHCP key as an alternative key in this step;

(5) Fifth, as shown at (5) in the figure, the DHCP server and the client will use the new DHCP key, if it is applicable, for message exchanges after obtaining the new authentication key. Once the DHCP server and the client use the new DHCP key, the DHCP server and the client will remove the old DHCP key.

3.2.3. Immediate DHCP Key Update (METHOD 3)

Figure 7:
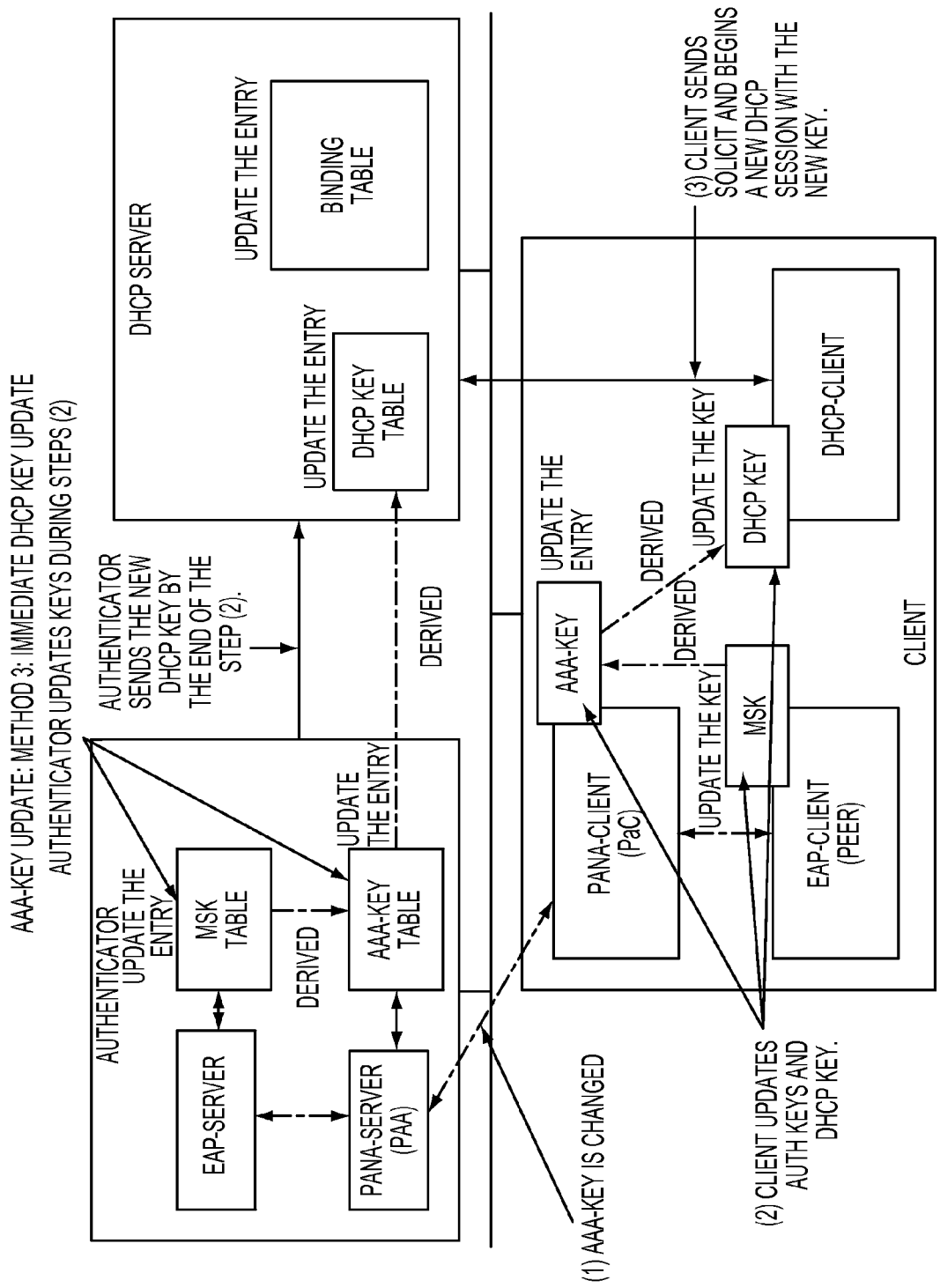

According to a third embodiment, a third method includes that the DHCP session is restarted using the new DHCP key immediately after the changing of keys. FIG. 7 labeled "AAA-Key Update: Method 3: Immediate DHCP Key Update" shows features according to this illustrative embodiment. With reference to FIG. 7, the system preferably performs the following steps:

(1) First, as shown at (1) in the figure, the authentication session keys are changed in the authentication session.

(2) Second, as shown at (2) in the figure, a new authentication session key is established between the authenticator and the client. According to the preferred embodiments of the invention, the Authenticator preferably sends the new DHCP key to the DHCP server by the end of this step.

(3) Third, as shown at (3) in the figure, the client preferably initiates a new DHCP session using the new DHCP key.

3.3. The Case that the DHCP Server Needs to be Restarted

According to some preferred embodiments, the DHCP server is restarted after rebooting or for other reasons in a special manner. In the preferred embodiments, there are three potential methodologies that can be employed.

In some embodiments, the client and the authenticator and/or the dynamic host configuration server can negotiate regarding which methodologies are to be employed. For example, in some embodiments, the client may send a signal indicating which methods it supports. For example, in some examples, a method performed by a client device for use in a system for binding dynamic host configuration and network access authentication when the lifetime of dynamic host configuration bindings expire might include: upon expiration of dynamic host configuration bindings (or similarly upon beginning a dynamic host configuration session), the client device can send a message identifying which dynamic host configuration key handling methodologies that client device supports to deal with such termination or beginning. In some embodiments, said client device sends said message to the authenticator. In some embodiments, said client device sends said message to the dynamic host configuration server.

3.3.1. Recover the Entire States from Non-Volatile Storage (Method 1)

Figure 8:
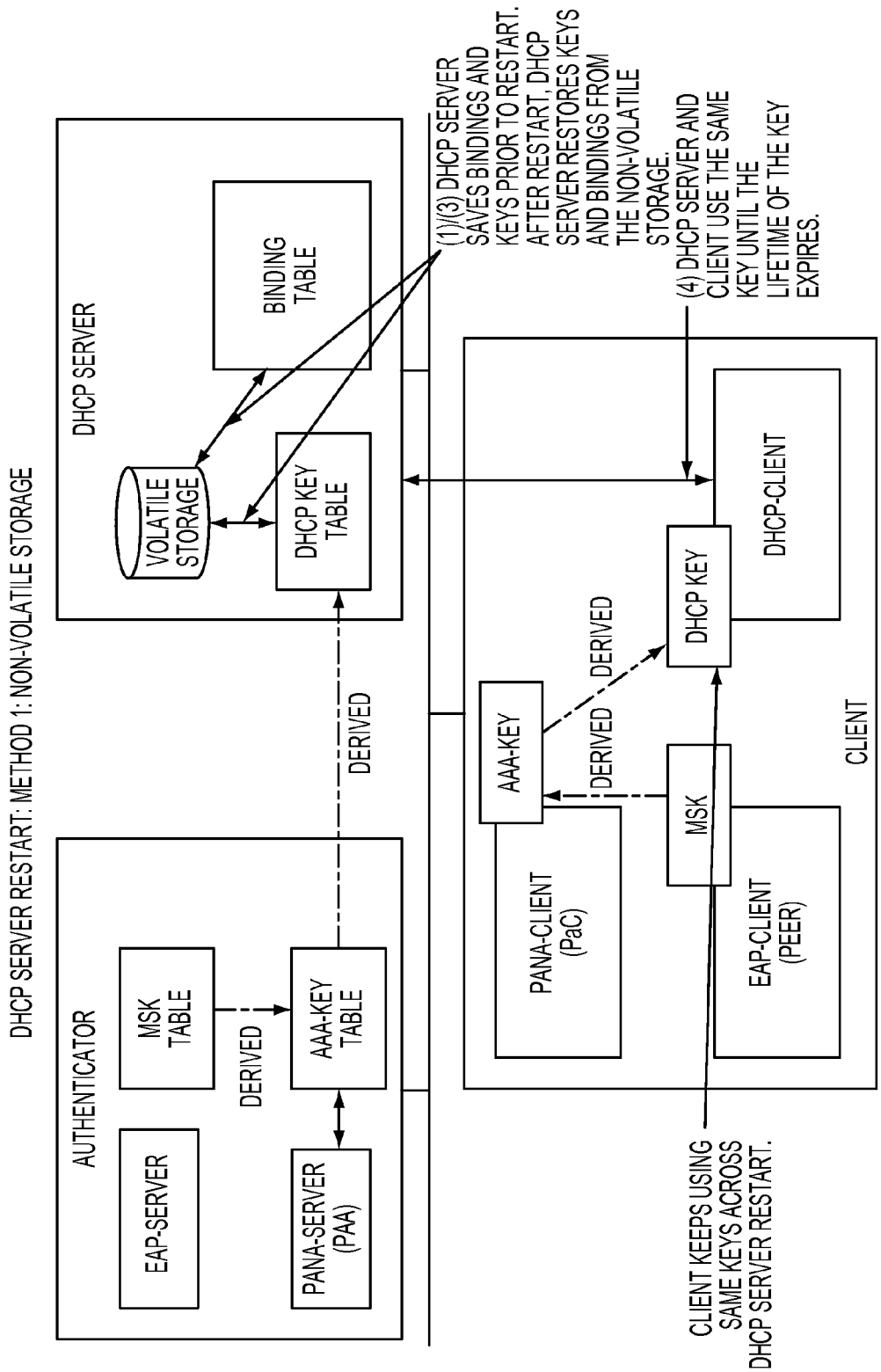

According to a first embodiment of the invention, a first method includes using non-volatile memory storage to recover the states. In this regard, FIG. 8 labeled "DHCP Server Restart: Method 1: Non-Volatile Storage" shows illustrative features according to this embodiment. With reference to FIG. 8, the system preferably performs the following steps:

(1) First, as shown at (1) in the figure, the DHCP server preferably saves the DHCP key table and the binding table to a non-volatile memory storage. The DHCP server may update the non-volatile memory anytime when tables are updated and/or may update it periodically. The non-volatile memory storage can be implemented using any appropriate data storage or memory, such as, e.g., hard drives, magnetic disks, flash memories or the like.

(2) Second, the DHCP server preferably restarts for some reason.

(3) Third, as shown at (3) in the figure, the DHCP server preferably restores the key table and the binding table from the non-volatile memory storage. Preferably, the DHCP server removes the entries for which lifetimes have expired.

(4) Fourth, as shown at (4), the DHCP server and the client preferably use the same key until the lifetime of the key expires.

3.3.2. Reboot Notification from DHCP Server or Reboot Detection by the Authenticator (Method 2)

Figure 9:
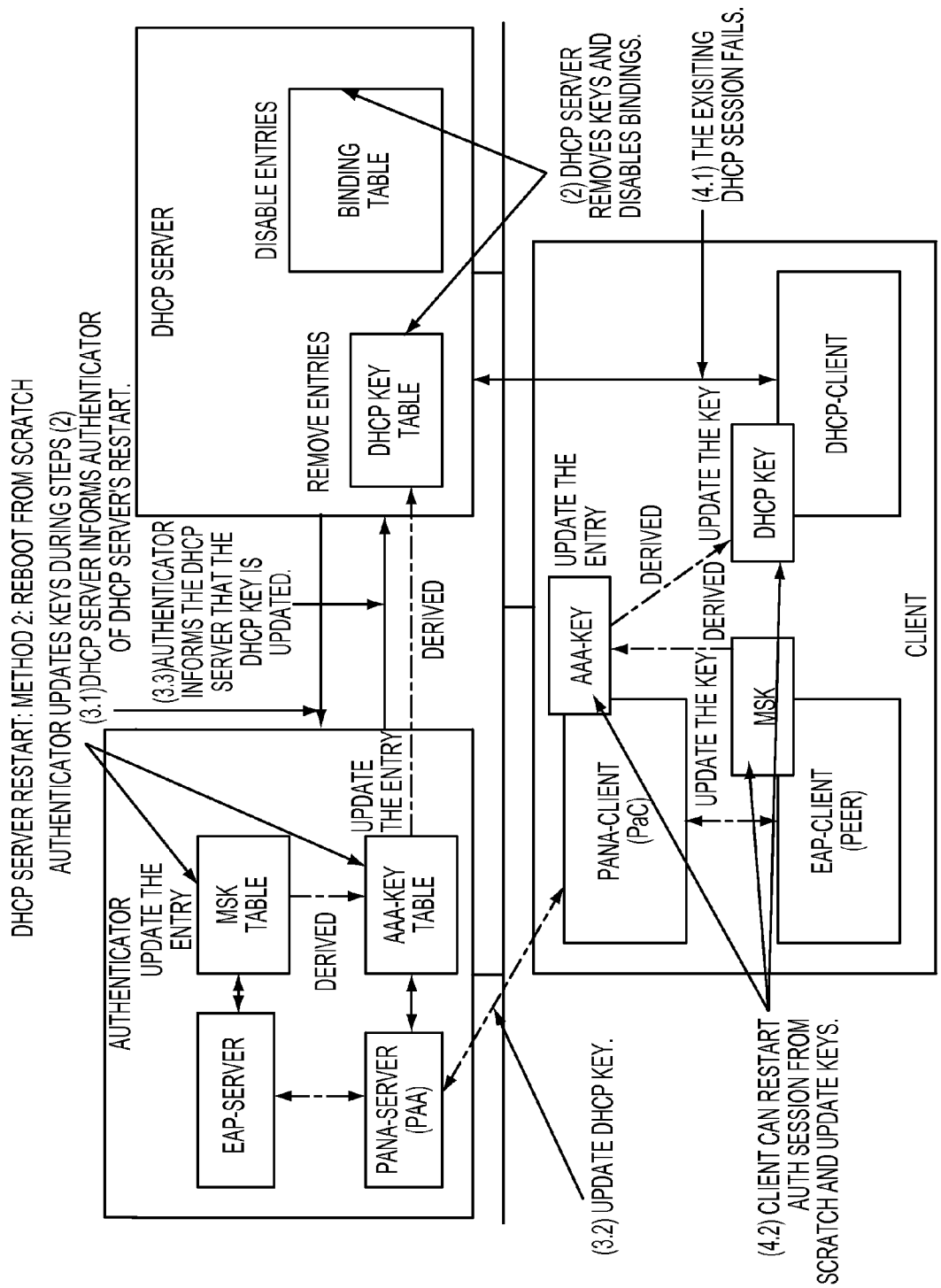

According to another embodiment, a second method can include that the DHCP restarts from the scratch. In that regard, the previous key table and the binding table will be discarded. And, each client needs to restart the authentication session. FIG. 9 labeled "DHCP Server Restart: Method 2: Reboot from Scratch" shows some illustrative features according to this embodiment. With reference to FIG. 9, the system preferably performs the following steps:

(1) The DHCP server restarts for some reason.

(2) All DHCP keys obtained dynamically from Authenticator and corresponding entries in the binding table will be lost. The DHCP server may or may not check resources possibly allocated for previous bindings to prevent multi-allocation. Some ways of implementation to do this include:

The DHCP server may send Reconfigure to each clients to restore and update the binding table, if possible.

The DHCP server may use the non-volatile memory storage to restore the binding table.

(3) According to some preferred embodiments, a step can optionally be employed in which a) the DHCP Server informs the Authenticator that DHCP keys have been erased or b) the Authenticator has the ability to know of a reboot of the DHCP server without notification from the DHCP server. In such cases, the Authenticator preferably updates the DHCP keys for each client and sends them to the DHCP server.

(4) The client restarts the authentication session and the DHCP sessions when the Authenticator so requests, or the client notices terminations of DHCP sessions.

3.3.3. Ask Authenticator for Keys (Method 3)

Figure 10:
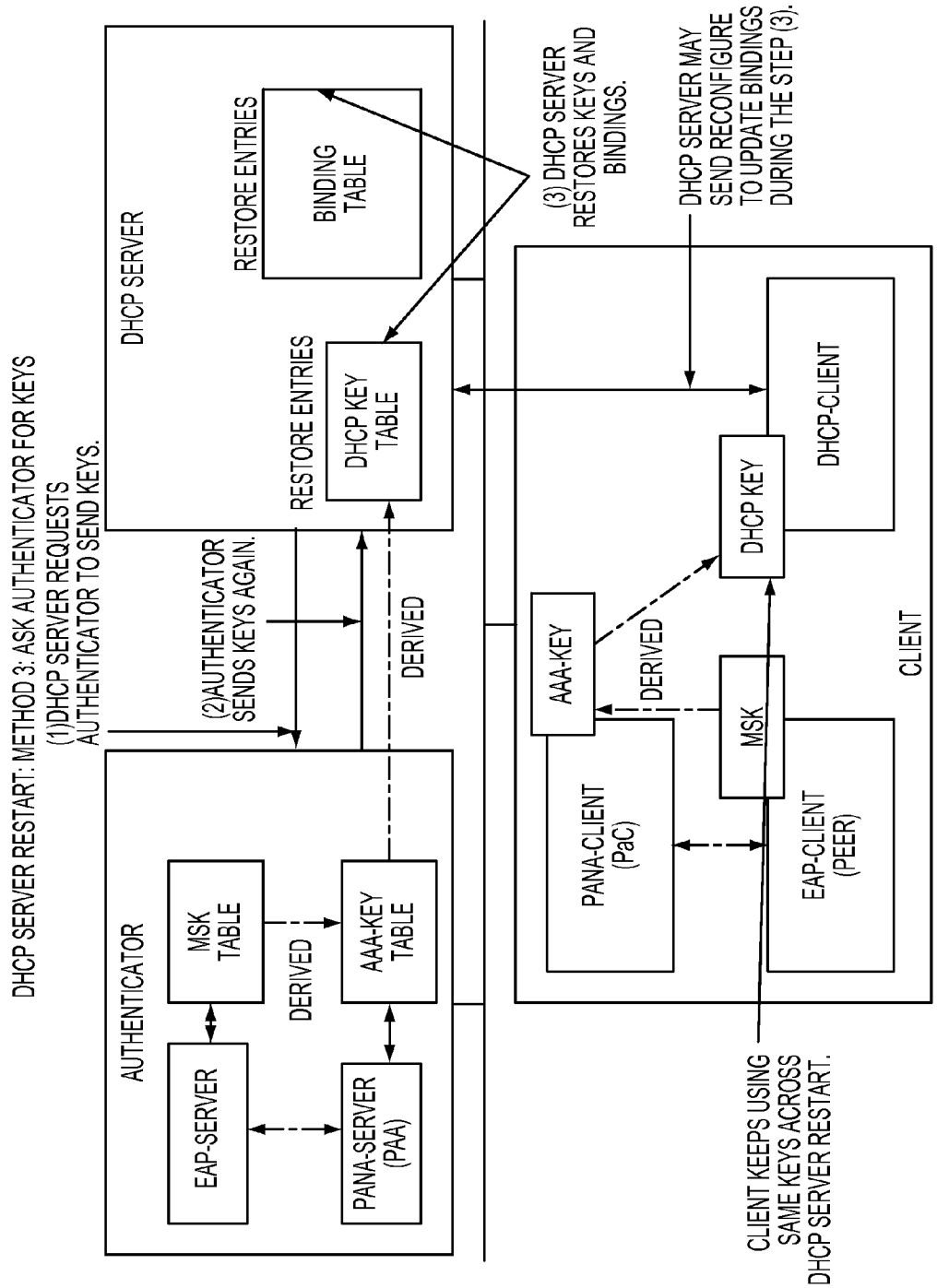

According to another embodiment of the invention, a third method includes that the DHCP server requests the Authenticator to resend key information and restores the DHCP key table. FIG. 10 labeled "DHCP Server Restart: Method 3: Ask Authenticator for Keys" shows illustrative features according to this embodiment. With reference to FIG. 10, the system preferably performs the following steps:

(1) First, as shown at (1) in the figure, the DHCP server requests the Authenticator to resend DHCP keys when the DHCP server starts.

(2) Second, as shown at (2) in the figure, the Authenticator sends all valid DHCP keys to the DHCP server.

(3) Third, as shown at (3) in the figure, the DHCP server restores the DHCP key table. In this regard, the binding table entries may or may not be restored.

In some embodiments, the DHCP server may send a Reconfigure message to each client to restore and update the binding table, if possible.

In some embodiments, the DHCP server can use a non-volatile memory storage to restore the binding table.

3.4. The Case that Lifetimes of DHCP Bindings Expire

This section describes how a DHCP client behave when the lifetime of DHCP bindings expire. There are a number of potential methodologies that can be implemented.

3.4.1. Keep Current DHCP Key

Figure 11:
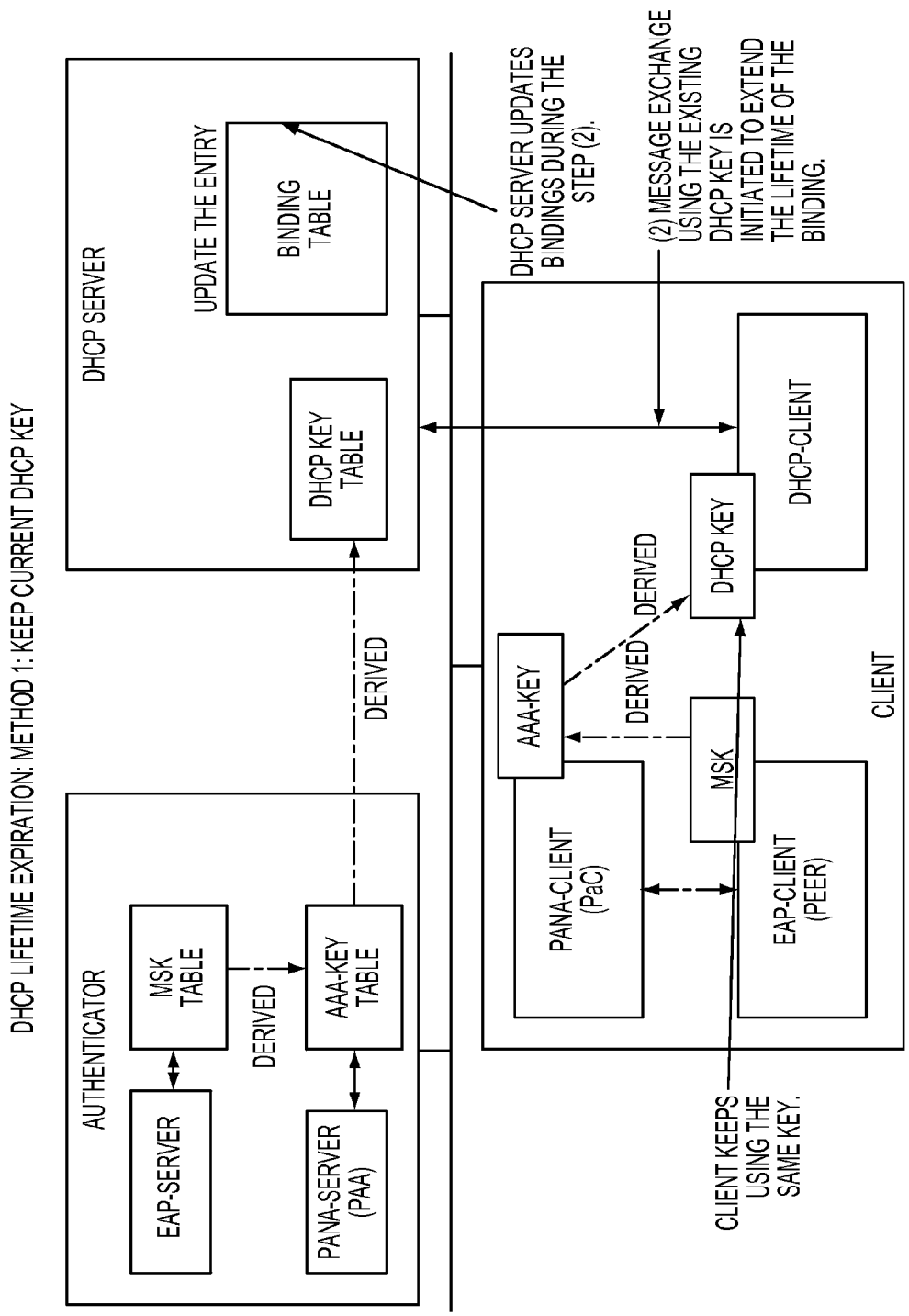

An existing methodology involves that the DHCP client and server use the current key to extend the lifetime. In this regard, FIG. 11 labeled "DHCP Lifetime Expiration: Method 1: Keep Current DHCP Key" shows features of this existing methodology. With reference to FIG. 11, the system preferably performs the following steps:

(1) First, as shown at (1) in the figure, the timer for the DHCP binding update expires.

(2) Second, as shown at (2) in the figure, the DHCP server or the client initiate a DHCP message exchange using the current DHCP key to extend the lifetime.

3.4.2. Require Re-Authentication

Figure 12:
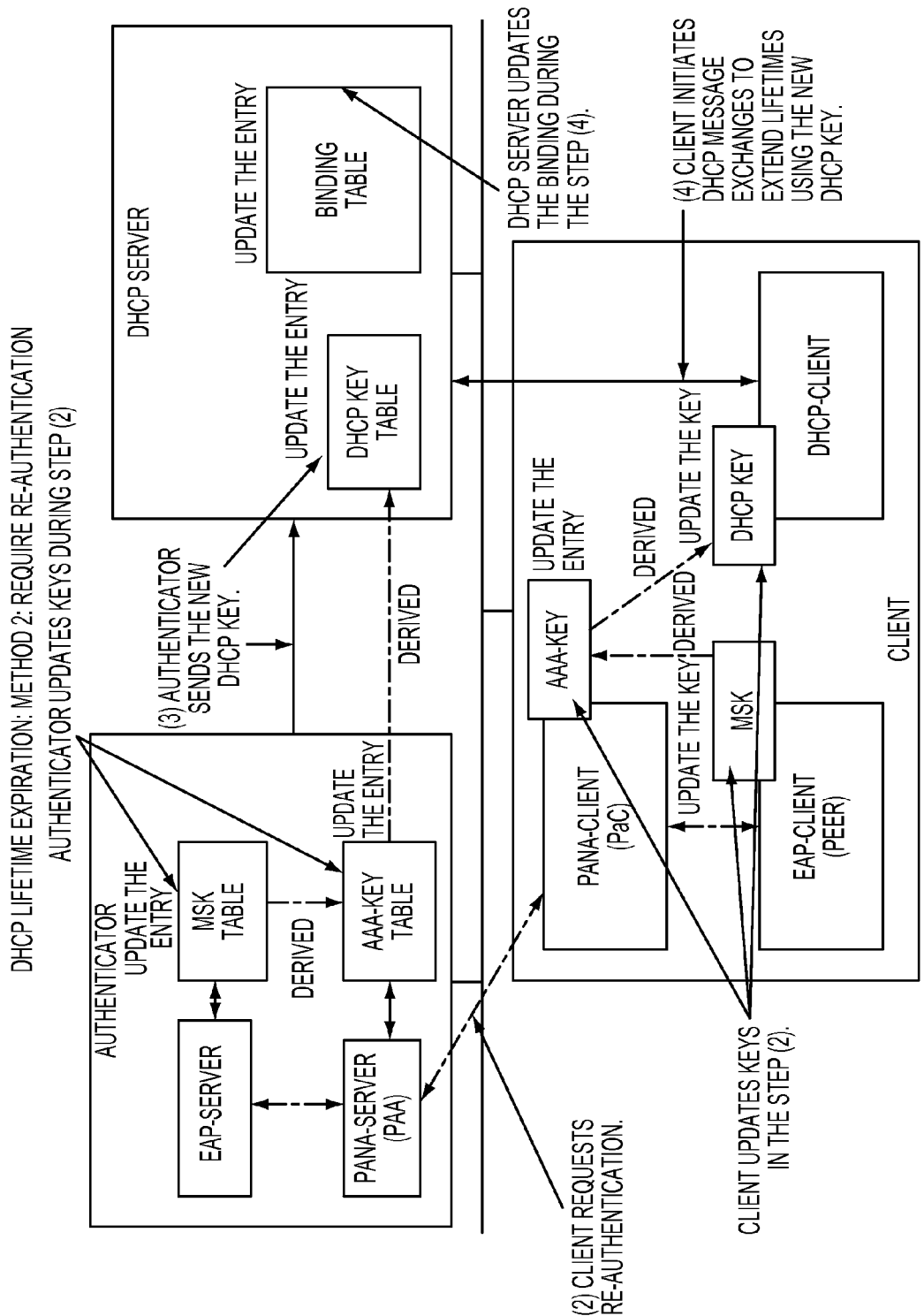

According to the preferred embodiments of the invention, another method can be employed that includes having the DHCP client request to renew the authentication session prior to DHCP message exchanges. In this regard, FIG. 12 labeled "DHCP Lifetime Expiration: Method 2: Require Re-authentication" shows illustrative features according to this embodiment. With reference to FIG. 11, the system preferably performs the following steps:

(1) First, the timer for the DHCP binding update expires.

(2) Second, as shown at (2) in the figure, the client requests the Authenticator to re-authenticate and update the DHCP key. In some embodiments, the DHCP server can request the Authenticator to re-authenticate and update the DHCP key.

(3) Third, as shown at (3) in the figure, the Authenticator sends the new DHCP key to the DHCP server. Preferably, the PANA client informs the DHCP client of the new DHCP key.

(4) Fourth, as shown at (4) in the figure, the client begins a new DHCP session using the new DHCP key.

3.5. Server Behavior when a New Authentication Session is Established

According to the preferred embodiments, while authentication messages are exchanged to create a new DHCP key between the authenticator and the client, the Authenticator preferably will not return a message which indicates that a new authentication session has been successfully established until the DHCP key is successfully installed on the DHCP server. In this manner, the client can begin a new DHCP session with the new key promptly after the successful authentication session establishment while, at the same time, avoiding a race condition.

Part II: Binding Network Bridge and Network Access Authentication

1. Existing Methods

Internet Draft-IETF-EAP-RFC2284bis-09, incorporated herein by reference in its entirety, defines Extensible Authentication Protocol (EAP), an authentication framework which supports multiple authentication methods.

Internet Draft-IETF-PANA-PANA-04, incorporated herein by reference in its entirety, defines the Protocol for Carrying Authentication for Network Access (PANA), a link-layer agnostic transport for Extensible Authentication Protocol (EAP) to enable network access authentication between clients and access networks.

As discussed above, RFC3118 describes authentication for DHCP Messages, which defines the DHCP option through which authorization tickets can be generated and newly attached hosts with proper authorization can be automatically configured from an authenticated DHCP server.

As also discussed above, RFC3315 defines Dynamic Host Configuration Protocol for IPv6 (DHCPv6). DHCPv6 enables DHCP servers to pass configuration parameters such as IPv6 network addresses to IPv6 nodes. It offers the capability of automatic allocation of reusable network addresses and additional configuration flexibility. RFC3315 also includes Delayed Authentication Protocol for DHCPv6.

As also described above, Draft-Yegin-EAP-Boot-RFC3118-00.txt describes bootstrapping RFC3118 Delayed DHCP Authentication using EAP-based Network Access Authentication. It describes how EAP-based network access authentication mechanisms can be used to establish a local trust relation and generate keys that can be used in conjunction with RFC3118.

In addition, IEEE DRAFT P802.1X entitled "Draft Stands for Local and Metropolitan Area Networks: Standard for Port based Network Access Control," incorporated herein by reference in its entirety, describes the architectural framework within which the authentication, and consequent actions, take place. However, it does not describe interactions among different physical ports of a switch.

The Switch Book by Rich Seifert, JOHN WILEY & SONS, INC. ISBN 0-471034586-5, incorporated herein by reference in its entirety, explains how existing switches and bridges operate.

2. Limitations of Existing Methods

EAP and PANA provide frameworks for authentication for network access. In addition, Delayed DHCP Authentication can be used to authenticate DHCP packets. Once these processes are done, clients may begin sending and receiving packets such as, e.g., application data. At this point, EAP/PANA and DHCP authentication no longer provide per-packet protection for such packets and there may be a possibility of service theft.

Figure 13:
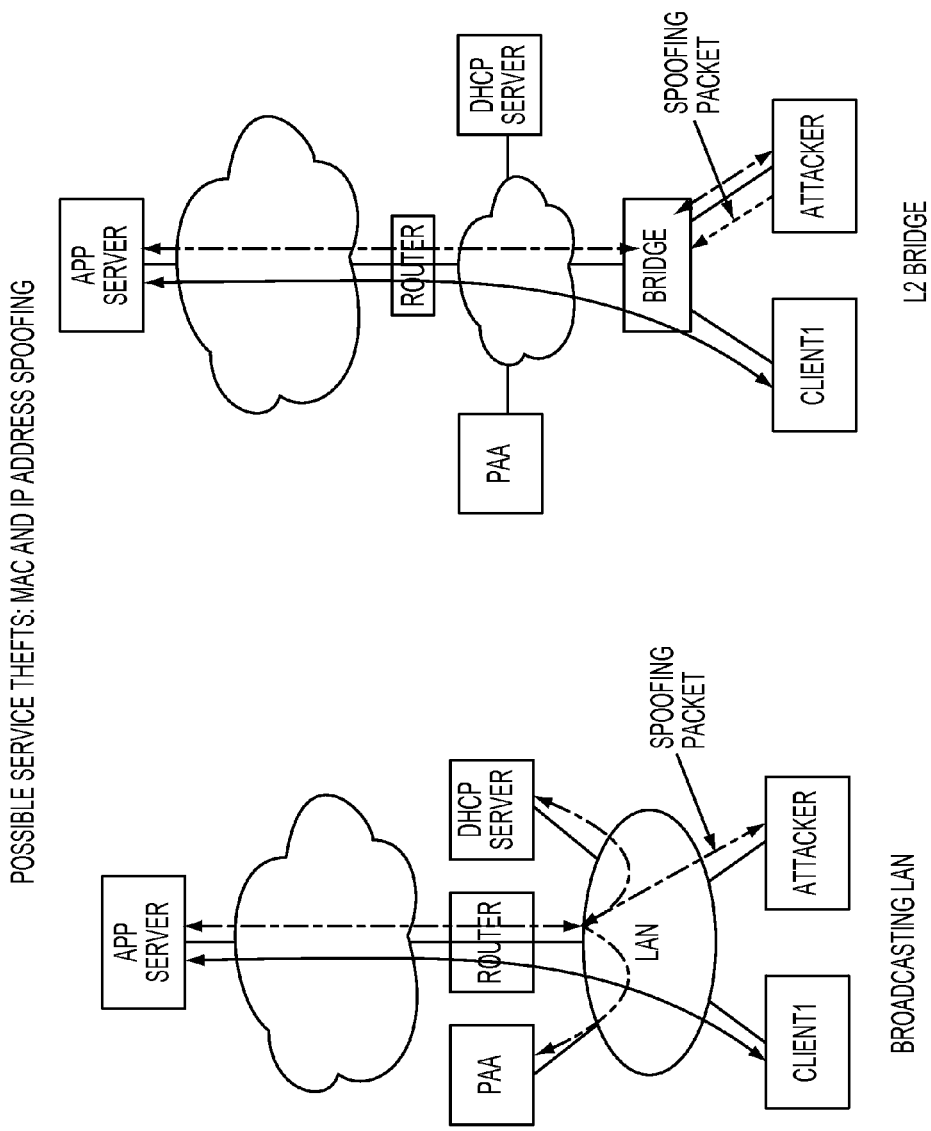
FIGS. 13-39 are illustrative schematic diagrams demonstrating, inter alia, features according to some preferred embodiments of the invention related to, inter alia, binding network bridge and network access authentication related to Part II of the detailed description of the preferred embodiments, and more particularly.

FIG. 13 labeled "Possible Service Thefts" shows some examples of service thefts that may occur. Part (a) of the figure shows a simple access network to which a PAA, a DHCP server, a router and some clients (see, e.g., Client1 and Attacker) are connected with a broadcasting LAN, such as, e.g., a broadcast hub or coaxial cable Ethernet. When Client1 is using a network service shown as Application server (App), packets sent from the App server to Client1 are broadcasted to all of nodes directly connected to the LAN. As a result, the Attacker can potentially receive packets from the App server. In addition, the Attacker may also able to send packets to the App server as if they were sent from Client1 by spoofing the source IP address. This is considered as an illustrative "service theft."

On the other hand, part (b) shows the network which uses a L2 bridge as a LAN instead of the broadcasting medium. The bridge does not send unicast packets addressed to Client1 to any nodes other than Client1 usually. But once an Attacker sends a packet spoofing the MAC address of Client1, the bridge updates its forwarding database according to the malicious information, and forwards subsequent packets addressed to Client1 to the Attacker instead of the legitimate Client1. The service theft is, thus, still possible. By using these methods of attack, the attacker can gain network access without any authentication.

There has, thus, been a need for new methods to prevent malicious attackers from gaining unauthorized network accesses in these environments.

3. Proposed Models 3.1. The Outline of the Example Network

Figure 14:
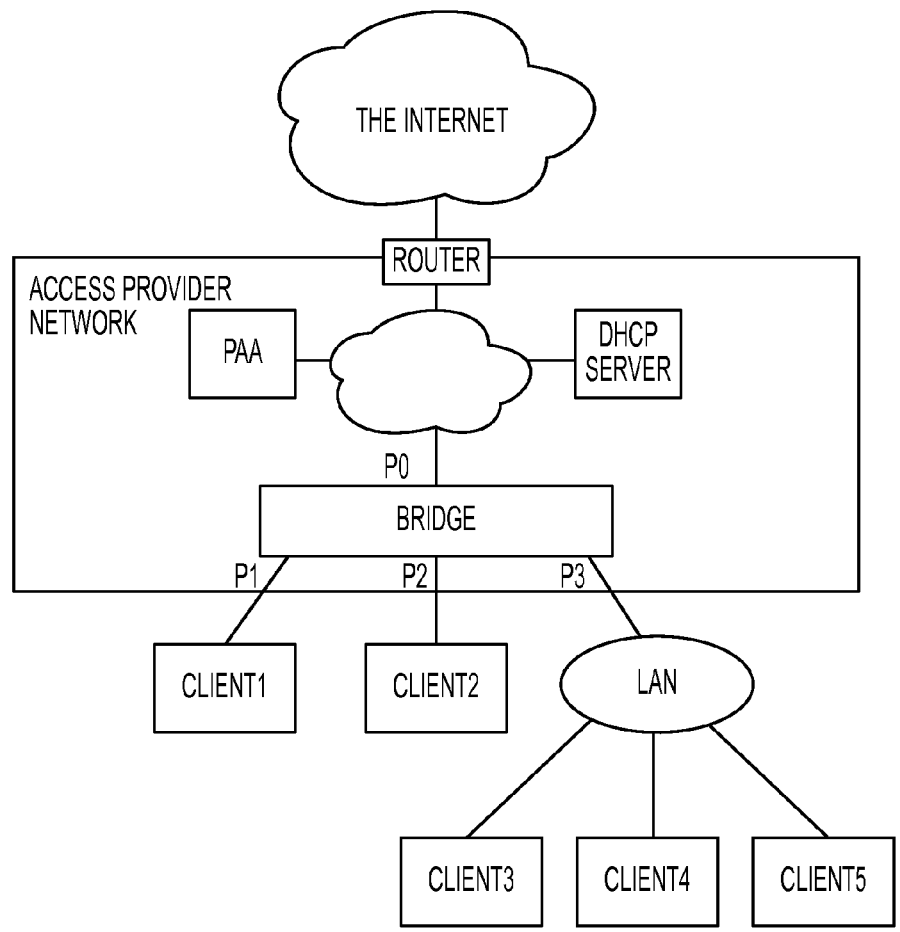

FIG. 14 labeled "Outline of the Example Network" shows an exemplary network. In this illustrative example, a network access provider has a PAA as an authenticator, a DHCP server, a router and a layer 2 network bridge. The bridge has a physical port connected to the network for the authenticator and the DHCP server. In this document, this port is referred to as the "server port." In FIG. 14, the port named P0 is the server port.

In addition, the bridge also has other physical ports connected to client hosts and networks. These are referred to as "client ports." For example, each client port has a name like P1, P2 and P3. In the embodiment shown in FIG. 14, a router connects the provider network and outer networks, such as, e.g., the Internet. It should be appreciated that the network shown in FIG. 14 is exemplary and used merely for explanatory purposes. By way of example, in various other networks, the system may vary substantially, such as, e.g., that there may exist multiple authenticators, multiple DHCP servers, multiple routers, multiple bridges and/or the like.

3.2. Forwarding Databases

An existing network bridge has a table named a forwarding database, which stores relations between MAC addresses and bridge ports. In the preferred embodiments of the invention, a number of new types of forwarding databases are introduced into the bridge.

3.2.1. Authorized Forwarding Database

A first illustrative new database is referred to as an Authorized Forwarding Database (AFD) which preferably includes a list of pairs of a MAC address and a port number. An exemplary AFD is shown in the following Table 1

TABLE 1

| MAC | Port |
|------|------|
| MAC1 | P1 |
| MAC2 | P2 |
| MAC3 | P3 |
| MAC4 | P3 |
| MAC5 | P3 |

Preferably, the AFD is maintained in a way that any MAC address never appears two or more times. Preferably, if a record of a given MAC address exists in the AFD, it means that the client node which has the MAC address and is connected to the port is authenticated by the authenticator. In the preferred embodiments, all authenticated client nodes connected to the bridge appear in the AFD of the bridge. Preferably, when the authentication session between the client and the authenticator is deleted, the record corresponding to the MAC address of the client is promptly removed from the AFD. Preferably, when a record is removed from the AFD, the authentication session corresponding to the MAC address of the removed record is promptly deleted.

In the preferred embodiments, the authenticator is configured to request the bridge to add or remove a record in the AFD. In some embodiments, physical disconnection of the client node may or may not remove the record of the client from the AFD, such as, e.g., depending on the policy of the network provider and/or the client node.

For example, if a client node frequently switches from one port to another, it may want the record corresponding to its MAC address to be removed from the AFD promptly when it disconnects from a port.

But the automatic removal on disconnection can make denial of service (DoS) attacks easier. See discussion below regarding DoS attacks, described below as illustrative threats 2 and 3.

3.2.2. Unauthorized Forwarding Database

A second illustrative new database is referred to as an Unauthorized Forwarding Database (UFD) which preferably includes a list of pairs of a MAC address and a port number—i.e., similar to that of the AFD. Preferably, any MAC address never appears two or more times in the UFD. Preferably, the system is prohibited from adding a MAC address that already exists in the AFD or UFD. In the preferred embodiments, if a record of a given MAC address exists in the UFD, it means that the client node which has the MAC address and is considered to be connected to the port is not authenticated by the authenticator yet.

Preferably, when the authentication session between the client and the authenticator is established (i.e., it is authenticated), the record corresponding to the MAC address of the client is removed from the UFD and added to the AFD. On the other hand, preferably, when the authentication message exchanges fail, such as, e.g., with an error or a timeout, the record corresponding to the client is preferably removed from the UFD.

In the preferred embodiments, when a record needs to be deleted upon events such as, e.g., described above, the authenticator requests the bridge to add or remove the record in the UFD. Preferably, a record in the UFD has a lifetime. Preferably, there is an upper limit of the lifetime. If it exceeds the lifetime, the record is preferably removed from the UFD. In some embodiments, if a record in the UFD is removed in the middle of authentication message exchanges between the client and the authenticator, the authentication promptly fails.

Removal of the record and failure of the authentication session should preferably be performed synchronously. By way of example, a simple method to maintain the synchronization is that only the authenticator determines timeout of records in the UFD. In other embodiments, any other methods to maintain the synchronization may be employed as desired.

Preferably, if the bridge receives a packet from a MAC address through a port and the MAC address does not appear in any forwarding database(s), then the record of the MAC address and the port is added to the UFD. Preferably, the record stays until the upper limit of the lifetime passes or until the authenticator requests the record to be removed or to be moved to the AFD. In some embodiments, when an authentication failure or a timeout occurs, the record may or may not be moved to a penalty list described in the next section.

In some preferred embodiments, limiting the maximum number of records for a respective port can be employed to help prevent kinds of DoS attacks that aim at overflowing the UFD. If the number of records which has the same port number reaches the limit, the bridge preferably denies a request to add records for the port and blocks any packets not matching existing records in UFD until the number of records for that port decreases to below a certain threshold.

Figure 14A:
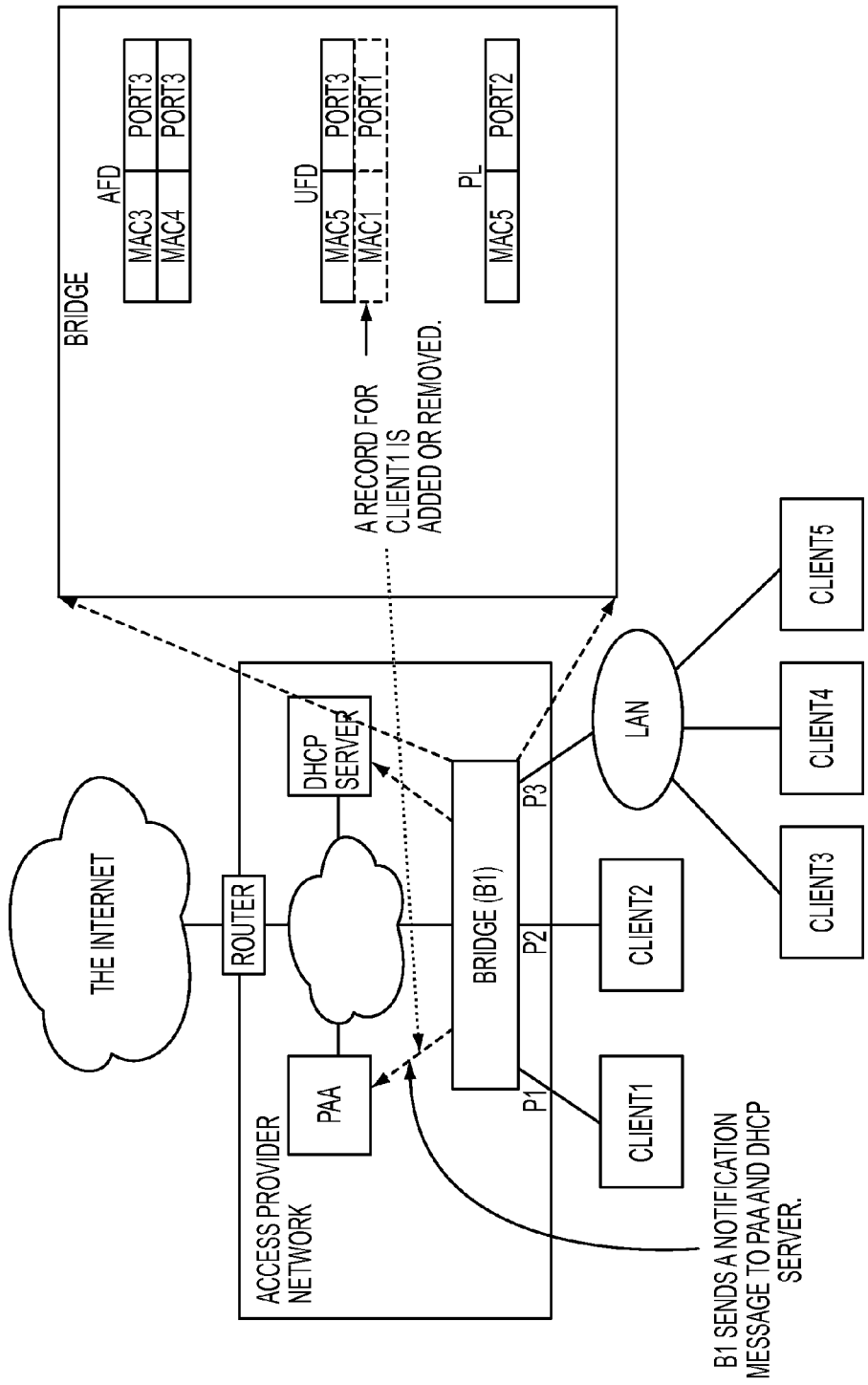
FIG. 14(A) is a schematic diagram illustrating, among other things, a notification of a record addition/removal.

In some preferred embodiments, the bridge notifies promptly the authenticator and/or the dynamic host configuration server (e.g., DHCP server) of an addition of a record to the UFD and of a removal of a record from UFD. The notification preferably includes the port number and the MAC address of the record. Using the notification, the authenticator and/or the dynamic host configuration server can know the port identifier of each client. The authenticator and/or the dynamic host configuration server can, thus, e.g., block requests from suspicious clients according to the port identifier. See FIG. 14(A) captioned "Notification of a Record Addition/Removal." In the illustrative example shown in FIG. 14(A), the record for Client1 is added or removed and the bridge B1 is shown as transmitting a notification message to an authenticator (such as, e.g., a Pana Authentication Agent [PAA]) and/or a dynamic host configuration server (such as, e.g., a DHCP server).

Figure 14B:
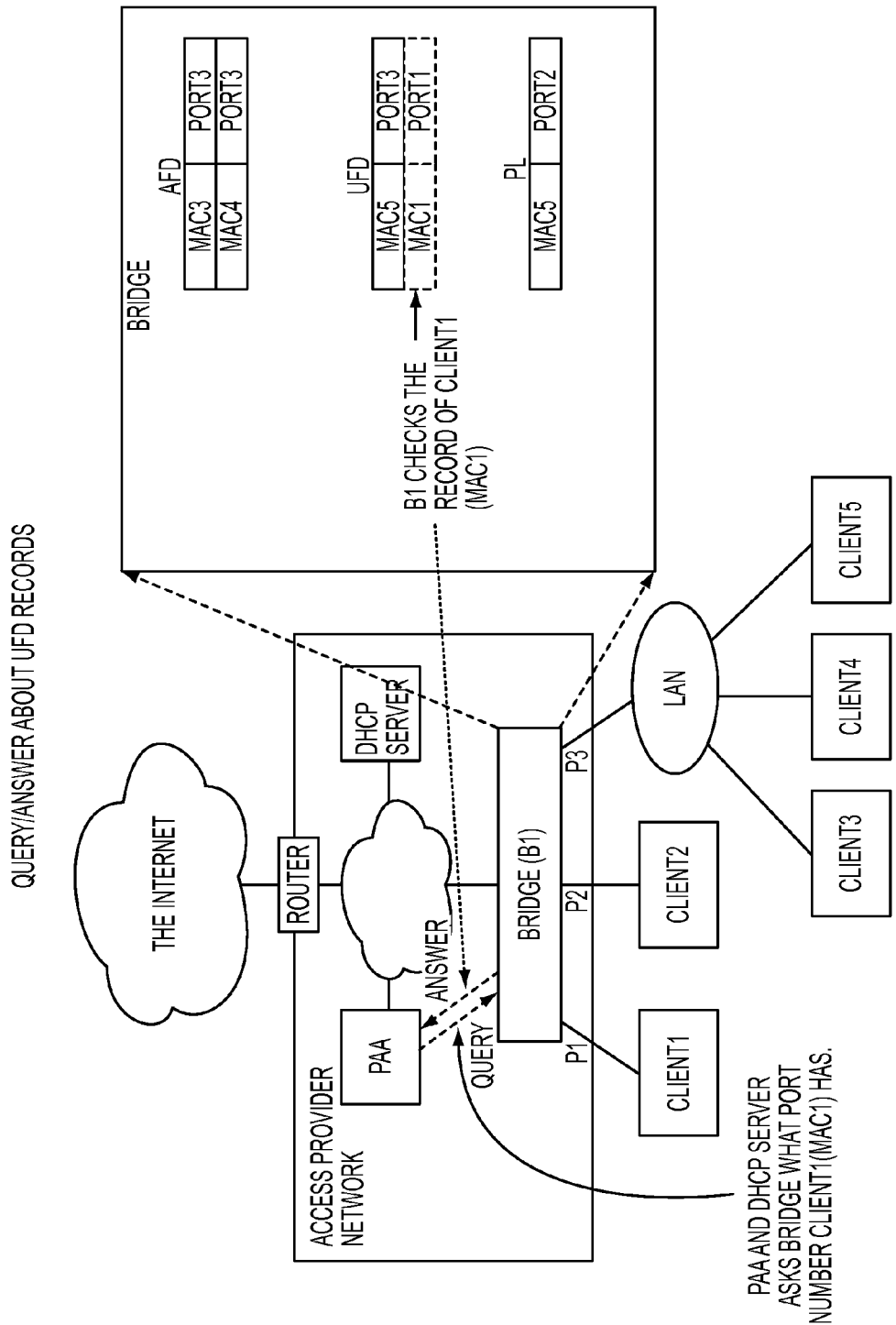
FIG. 14(B) is a schematic diagram illustrating, among other things, a query/answer about UFD records.

In some preferred embodiments, the bridge can answer a query from the authenticator and/or the dynamic host configuration server (e.g., DHCP server) about a record of UFD, so that the authenticator and/or the DHCP server can know the port identifier of clients. In some embodiments, the authenticator and/or the DHCP server, for example, can block requests from suspicious clients according to the port identifier. See FIG. 14(B) captioned "Query/Answer about UFD records." In the illustrative example shown in FIG. 14(B), an authenticator (such as, e.g., a Pana Authentication Agent [PAA]) and/or a dynamic host configuration server (such as, e.g., a DHCP server) sends a query to the bridge b1 asking, e.g., what port number Client1 (MAC1) has. Then, the bridge B1 checks the record of Client1 (MAC1). Then, the bridge B1 answers the authenticator or the dynamic host configuration server.

3.2.3. Penalty List

A third illustrative new database is referred to as a Penalty List (PL) which includes a list of pairs of a MAC address and a port number just like the AFD and UFD. Preferably, a record in the PL also has timeout information, such as, e.g., a time stamp or a timer, to deal with timeout. Preferably, each record in the PL has a lifetime, which may be set to a particular length statically or changed dynamically depending on implementations. When the lifetime timer expires, the record is preferably removed from the PL automatically.

Preferably, a MAC address can appear two or more times in the PL, but a combination of a MAC address and a port is preferably unique in a PL. An exemplary Penalty List is shown below in Table 2.

TABLE 2

| MAC | Port | Timeout Information |
|---|---|---|
| MAC1 | P2 | expires in 30 seconds |
| MAC3 | P2 | expires in 10 seconds |
| MAC3 | P3 | expires in 20 seconds |

In various embodiments, the actual format of the column "Timeout Information" may depend on implementation circumstances. By way of example, one illustrative implementation may store seconds left to expire (such as, e.g., in the example show in Table 2). As another example, another implementation may store the time of the day when the record is added to the PL and may determine the time of expiration dynamically.

In some alternative embodiments, the PL could be extended to include a "counter" field to the records. In this regard, when the same combination of a MAC address and a port are requested to be added to PL, the counter for the combination is preferably increased. In some embodiments, the network administrator may or may not configure the bridge not to start blocking until the counter reaches a certain value (e.g., to start blocking upon reaching a certain value). Among other things, this can enable the user to try an authentication soon after a password typo and/or another honest error. Preferably, an upper threshold for the counter may be used to block any further access from the same MAC address and port combination to prevent excessive wrong accesses.

In addition, limiting the maximum number of records per port is a good way to prevent kinds of DoS attacks that intend to make the PL overflow. Preferably, if the number of records which has the same port number P reaches a limit, the bridge adds a "wildcard" record (*, P) and removes other records which have a port number P to make a room for PL. The wildcard record may have, e.g., a maximum lifetime allowed. In addition, the wildcard record may take effect regardless of the counter. Preferably, the wildcard record does not affect packets matching records in the UFD or the AFD. If there is a wildcard record for a port P, the bridge preferably blocks any unmatching packets from port P.

3.2.4. Packet Filtering

In the preferred embodiments, the bridge preferably filters packets according to the AFD, the UFD and the PL forwarding databases described above. Preferably, a packet received at a client port P is considered to match exactly with a record in a forwarding database, if the MAC address field of the record equals to the source MAC address of the packet and the port number field of the record contains P. On the other hand, preferably a packet received at a server port is considered to match exactly with a record in a forwarding database, if the MAC address field of the record equals to the destination MAC address of the packet.

Figure 15:
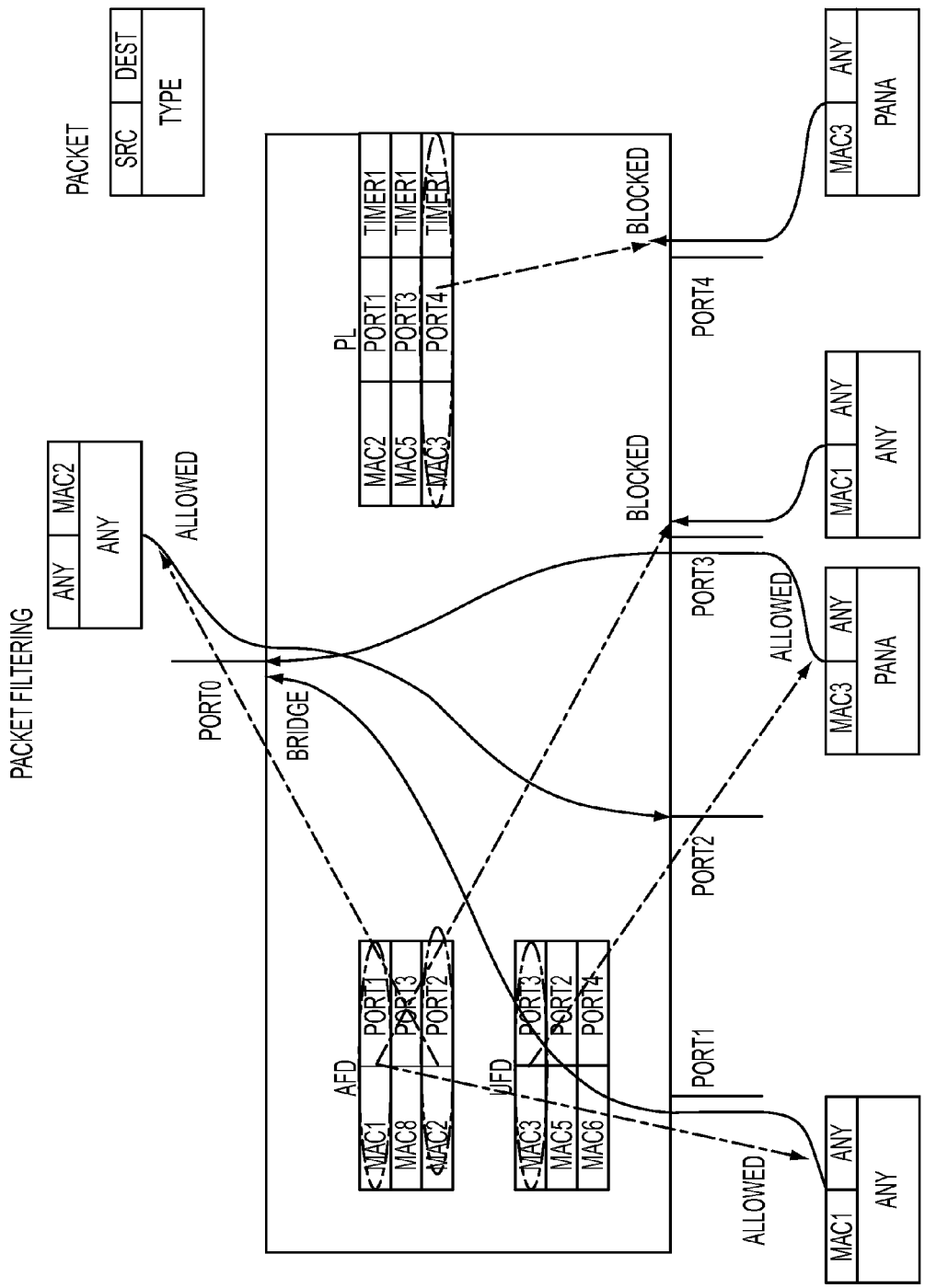

By way of example, FIG. 15, labeled "Packet Filtering" illustrates some packet filtering schemas according to some illustrative embodiments of the invention.

In the preferred embodiments, each packet is checked for filtering purposes in the following manner (i.e., according to at least some, preferably all, of the following schema):

If the packet matches a record in the AFD exactly, the bridge forwards the packet. See, e.g., MAC1 at port1 shown in FIG. 15.

If the packet matches a record in the UFD exactly, the bridge looks into the IP header of the packet. If the packet is addressed to a node outside the access network, the bridge blocks the packet. Otherwise, if it is addressed to a node inside the access network, the bridge may forward authorized types of packets. For example, a few types of packets may be forwarded by the bridge. In some illustrative embodiments, authorized types of packets may include an authentication (PANA) message and a DHCP message. See, e.g., MAC3 at port3 shown in FIG. 15.

If the packet matches a record in the PL exactly, the bridge blocks the packet. See, e.g., MAC3 at port4 in FIG. 15.

If the packet was received at a client port and the source MAC address is found in a record in AFD or UFD, the bridge blocks the packet. See, e.g., MAC1 at port3 in FIG. 15.

3.3. Port Identifier Tag 3.3.1. General description on Port Identifier Tag

In this document, a combination of an identifier of a bridge (i.e., bridge identifier) and a port number is referred to as a "port identifier." Preferably, a bridge identifier is unique among bridges used in the access network.

In preferred embodiments, a port identifier is advantageously attached to a packet. In this disclosure, this is referred to as a "Port Identifier Tag" (PIT). If a Port Identifier Tag feature is enabled, the bridge tags a port identifier to a packet addressed to an authenticator or a DHCP server and forwards the tagged packet instead of the original one. When the bridge receives a tagged packet sent from an authenticator or a DHCP server, the bridge looks at a port identifier in the tag and forwards an untagged packet to the port specified in the tag.

Figure 16:
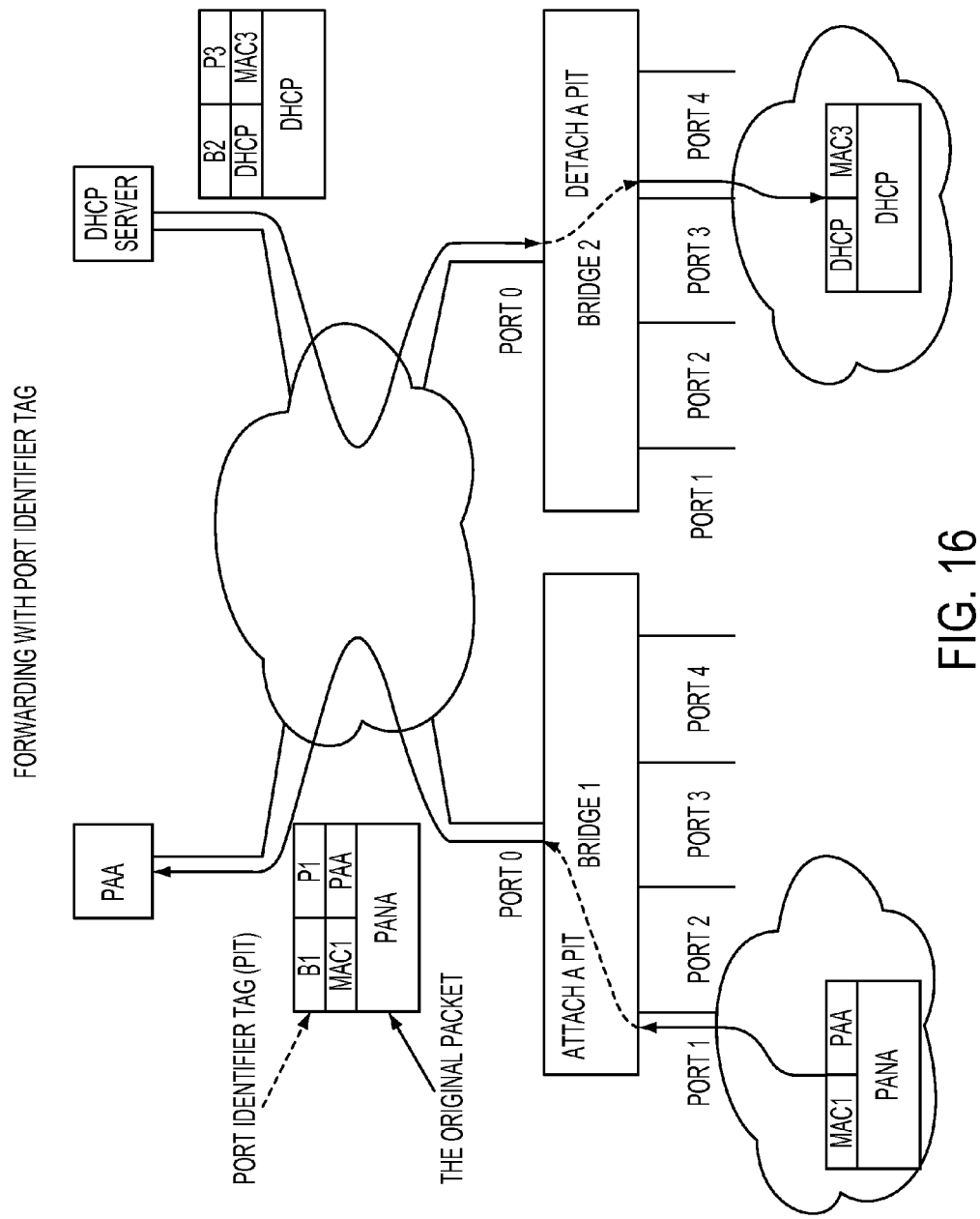

FIG. 16 labeled "Forwarding with Port Identifier Tag" shows an illustrative and non-limiting example employing two bridges. A node connected to Port 1 of Bridge 1 is sending a packet to PAA. In this regard, the Bridge 1 attaches a port identifier tag "B1:P1" to the packet, which shows that the packet was sent from Port 1 (P1) of Bridge 1 (B1). Then, the tagged packet is sent to the PAA. If the destination MAC address of the original packet is a unicast address (e.g., communicated to a single receiver), to determine the destination IP address is rather trivial. For example, the destination IP address can be found in a PIT Node Table (see, e.g., FIG. 18). Looking up the ARP (Address Resolution Protocol) table is another possible implementation. If the destination MAC address of the original packet is a broadcast address (e.g., communicated to anyone) or a multicast address (e.g., communicated to multiple receivers), there can be more choices of designs implementations, a few of which are set forth below:

The bridge can send a unicast packet to each IP address found in PIT Node Table records for broadcast or multicast addresses.

The bridge can send a broadcast or multicast packet using a pre-shared key (PSK) pre-configured for broadcast or multicast packets.

The bridge looks into the IP header of the packet and determines what service is wanted. If the packet is a UDP packet and its destination port is a bootstrap protocol (BOOTP) server port for example, the bridge forwards the packet to the BOOTP (or DHCP) server.

In FIG. 16, the DHCP server is also sending a packet to a node connected to Port 3 of the Bridge 2. In this regard, the DHCP server preferably prepares a packet with a port identifier tag "B2:P3" and send it to the Bridge 2. The Bridge 2 detaches the port identifier tag from the packet and forwards the packet to the destination via the Port 3. Note that the Bridge 2 preferably forwards the packet via the Port 3 according to the port identifier, even if there is another node with the same MAC3 on another port. Although a MAC address should preferably be unique in the world, in reality it never happens normally. However, if malicious spoofing nodes can exist, it can be very advantageous to distinguish nodes with the same MAC addresses from each other by port identifiers.

3.3.2. Session Identification

Some network servers distinguish sessions by MAC addresses of their client nodes. PAA (PANA server) and DHCP server are examples of these types of servers. However, if it is assumed that multiple nodes can have the same MAC address because of accidental and/or deliberate attacks, a MAC address is not enough to identify sessions.

Figure 17:
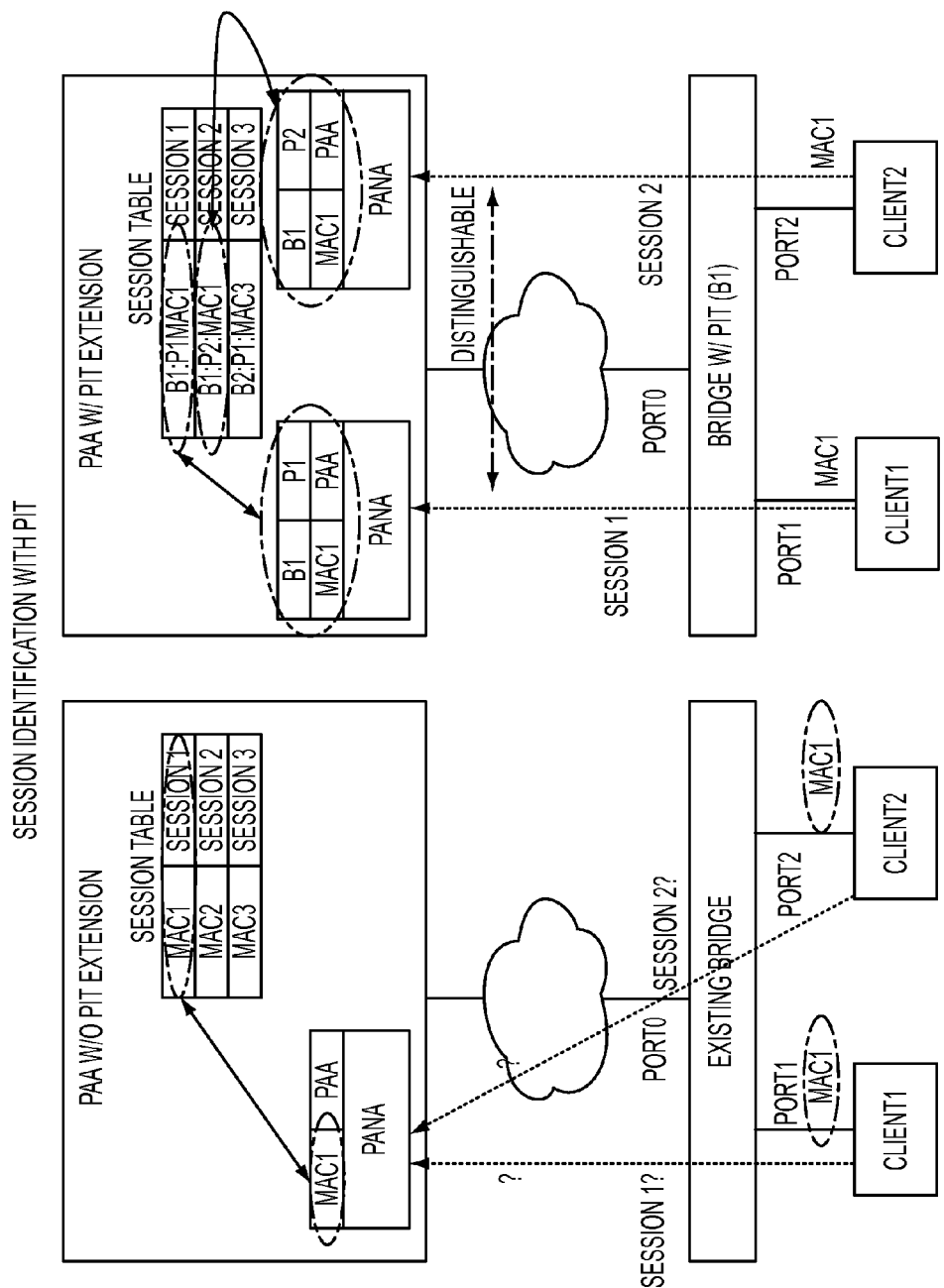

In this regard, FIG. 17 labeled "Session Identification with PIT" shows at the left side of the figure the problem for existing bridges and servers (e.g., PAA). According to some preferred embodiments, when a Port Identifier Tag is in use, the combination of the port identifier and a MAC address can be used to distinguish sessions from each other. The right side of the FIG. 17 demonstrates how the combination of the port identifier and a MAC address can advantageously be used to distinguish sessions. Preferably, the bridge should be configurable so that only packets addressed to PIT-enabled servers will be tagged.

3.3.3. Security Considerations on Port Identifier Tag

Port Identifier Tag is so powerful that it should preferably be kept away from wrong or malicious use. In order to inhibit an attacker from using a PIT as an attacking tool, it is preferable to configure bridges to block packets with a PIT sent from client ports. For example, with reference to FIG. 16, in some preferred embodiments, the Bridge 1 and the Bridge 2 may be configured to discard any PIT packets sent via port 1 to 4 and to accept PIT sent only via port 0 in the figure. In addition, if there is a connection to an external network, such as, e.g., the Internet, a gateway router or a firewall should preferably be configured to discard PIT packets sent from and/or to outer networks.

Another way to increase the reliability of PIT is to use HMAC (Keyed-Hashing for Message Authentication: a hash function based message authentication code) or similar techniques for message authentication.

3.3.4. Potential Implementations of Port Identifier Tag

In some illustrative embodiments, a number of ways to implement PIT can include, for example:

an UDP/IP encapsulation;

a new ethertype;

a new IP option.

Figure 18:
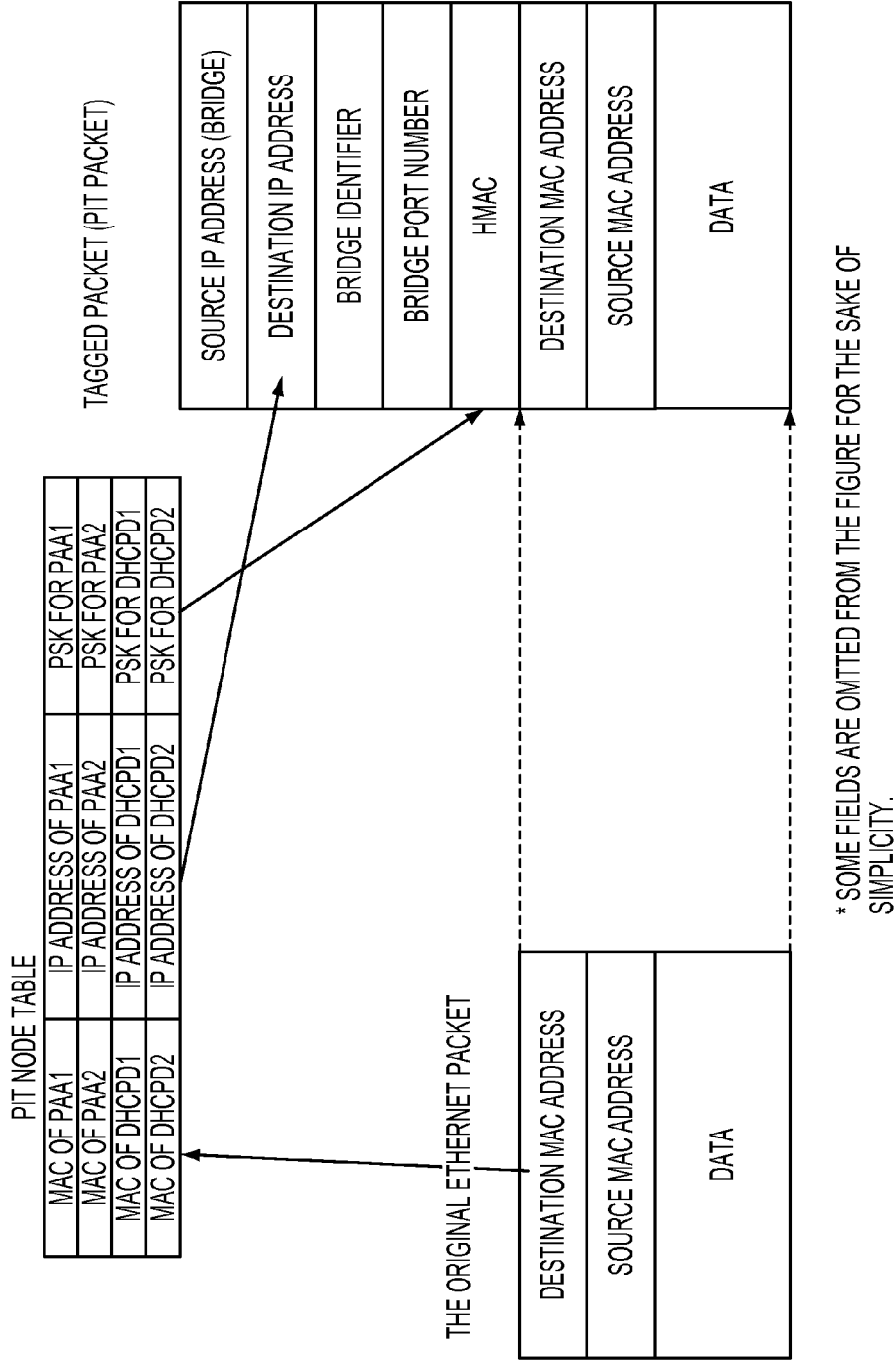

FIG. 18 labeled "An example of PIT message format" depicts an illustrative and non-limiting embodiment in which an UDP/IP encapsulation is employed. FIG. 18 demonstrates how the bridge can construct an UDP/IP encapsulation packet from an Ethernet frame received at a client port. In preferred embodiments, the bridge deals with the packet as follows:

1. The bridge checks the packet to determine whether it can be forwarded or should be blocked according to the AFD, the UFD and the PL. If the packet is to be blocked, it is discarded.

2. The bridge looks up the destination MAC address in a table, such as, e.g., a "PIT Node Table," which preferably includes records of IP addresses and PSKs (Pre-shared Keys) indexed by MAC address. In some embodiments, a PIT Node table may be preconfigured in the bridge by the administrator. Preferably, if the destination MAC address of the Ethernet packet is not found in the table, the packet will be forwarded in the ordinary way without PIT.

3. The bridge constructs a new UDP/IP packet encapsulating the original Ethernet packet. The destination IP address is copied from the record in the PIT Node Table. The record may include the UDP port number to receive the PIT packets at the destination IP node. The source IP address may be the IP address of the bridge itself. If the bridge identifier is represented by its IP address, the "Bridge Identifier" field below may be omitted to reduce the size of PIT packets. The bridge also fills PIT-specific fields including "Bridge Identifier" field and "Bridge Port Number" field. The Bridge Identifier is a number unique among all bridges used in the network. The administrator of the network may pre-configure such for each bridge. The Bridge Port Number is to identify a port in the bridge. An HMAC field may be used, for example, to authenticate the PIT packet. The bridge preferably uses PSK in the record in the PIT Node Table to calculate the HMAC of the PIT message. The HMAC is preferably calculated over the entire IP datagram.

3.4. Other Considerations on the Bridge

In some preferred embodiments, in order to prevent the faking of a PAA and/or a DHCP server, the bridge may also be configured not to forward PANA and DHCP packets from a client port to another client port.

4. Implementation Examples

In the following subsections, two illustrative implementation examples are described. It should be understood based on this disclosure that these are merely illustrative examples.

4.1. First Example of Implementations 4.1.1. Scenario of the First Example

Figure 19:
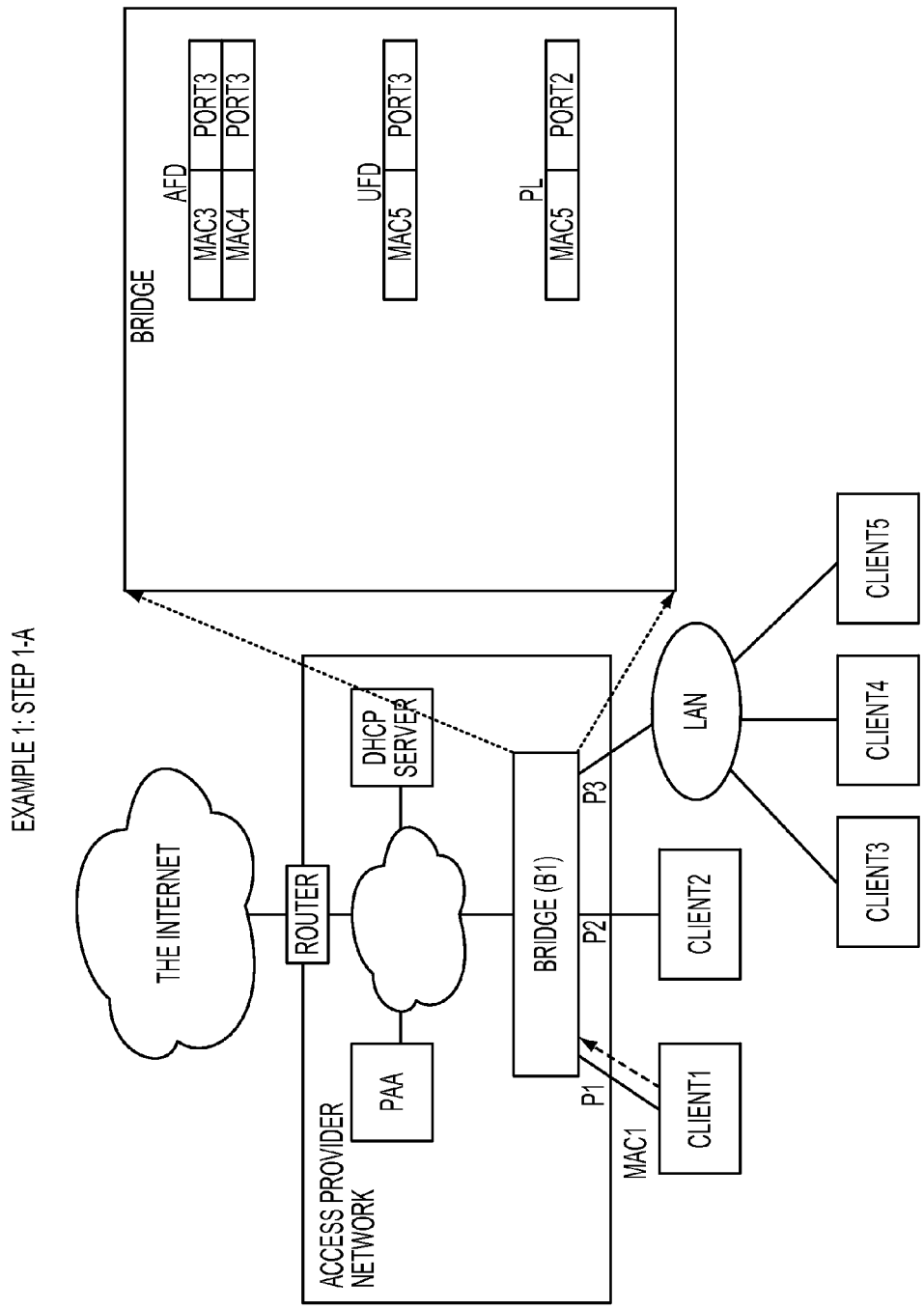

According to a first illustrative implementation, a system can employ an AFD, a UFD and, optionally, a PL. In the preferred embodiments, the system would perform at least some, preferably all, of the following:

1-A. With reference to FIG. 19 labeled "Example 1: Step 1-A," reference is made to a situation in which a client (Client1) begins to connect to the access network. Here, the Client1 is connected to Port 1 (P1) of the Bridge (B1) and sends a first packet during boot. For example, this may involve a router solicitation message, a DHCP Discover/Solicit message or another form of message(s).

Figure 20:
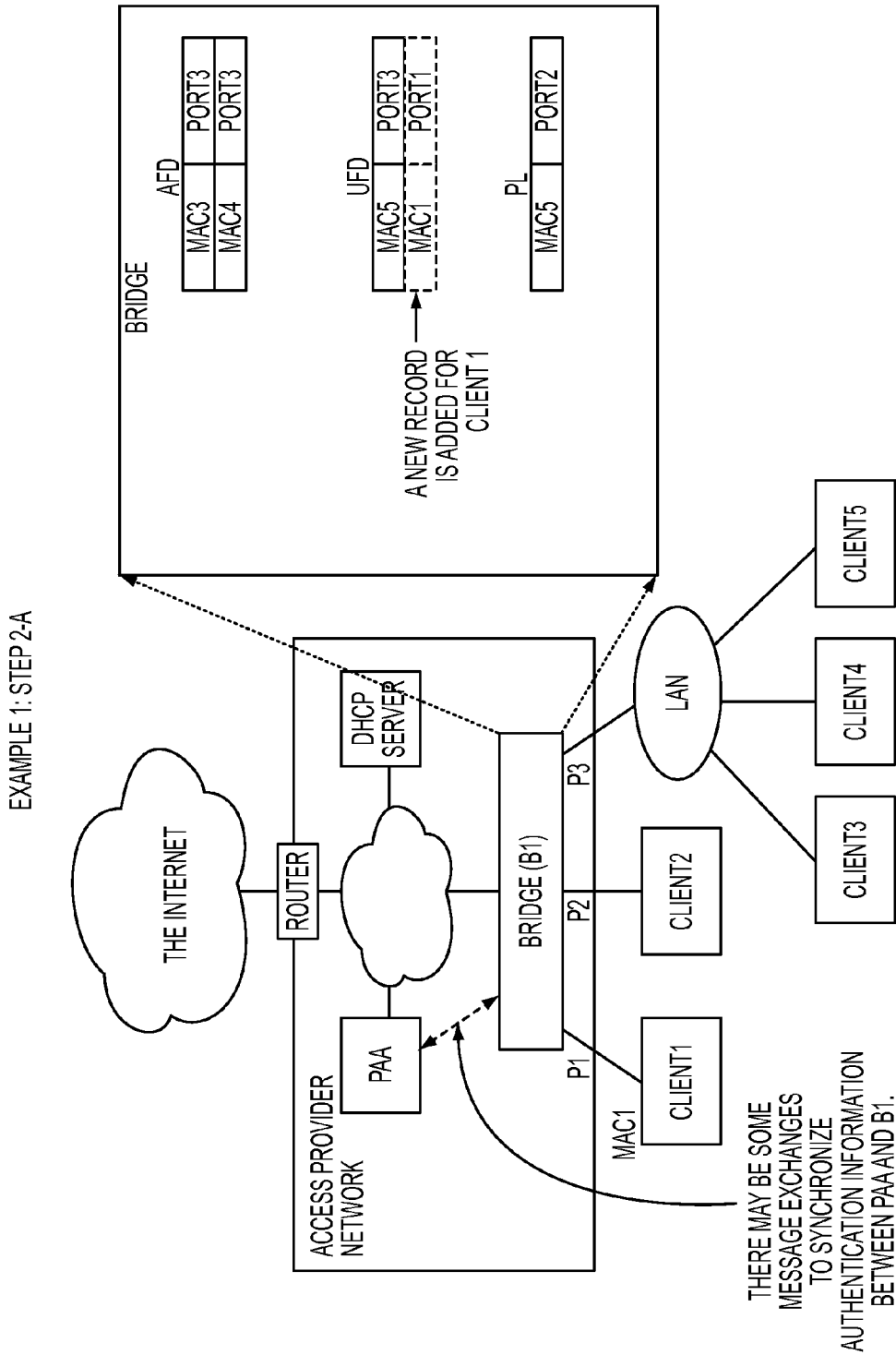

2-A. With reference to FIG. 20 labeled "Example 1: Step 2-A," the bridge adds (or may ask the authenticator to let the bridge add) a new record in the UFD for Client1, because the source MAC address (MAC1) is not found in the AFD, the UFD and the PL. Preferably, the bridge (or the authenticator) starts a new timer to maintain the expiration of the new record.

Figure 21:
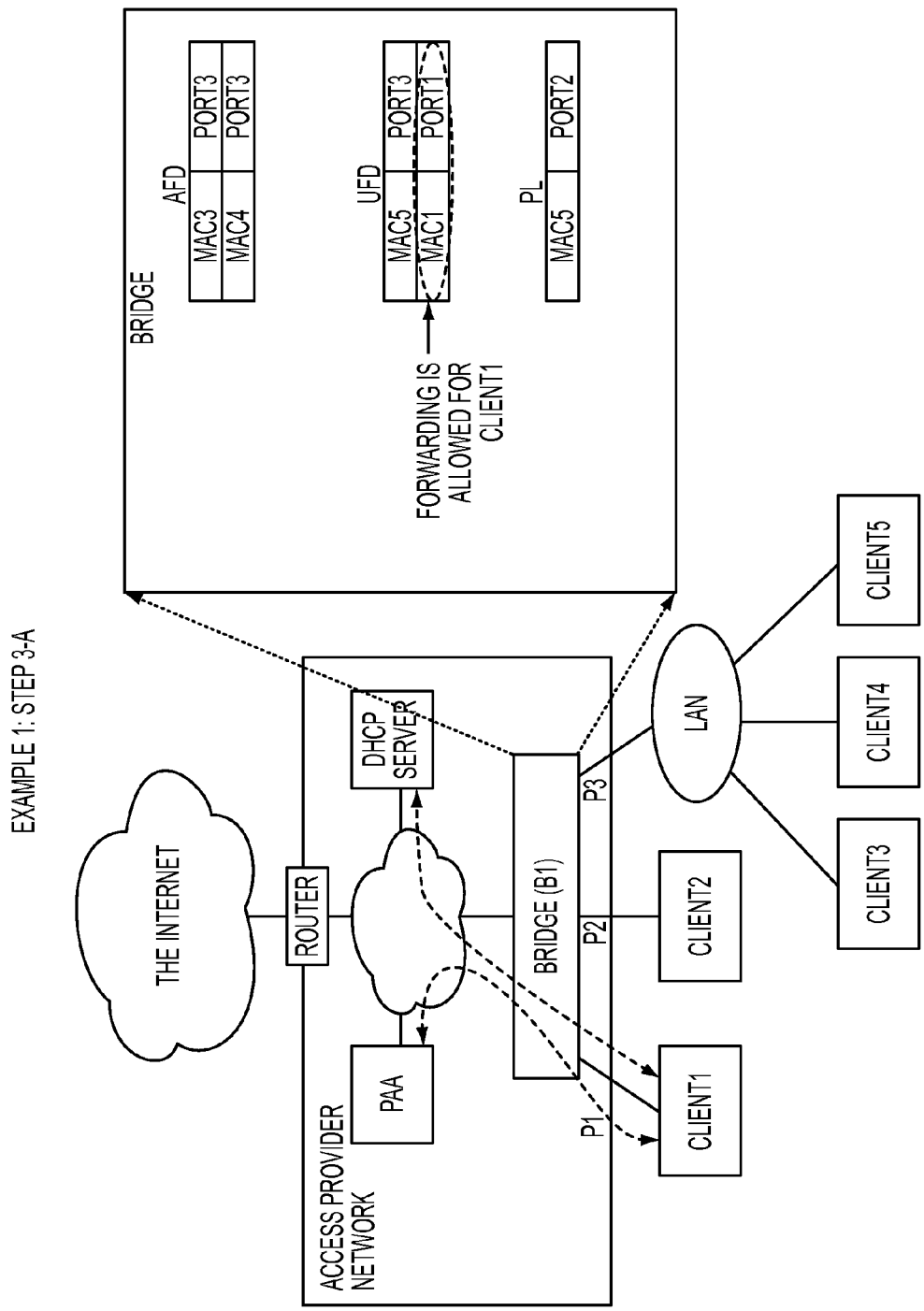

3-A. With reference to FIG. 21 labeled "Example 1: Step 3A," the Client1 proceeds with message exchanges during the bootstrap. These message exchanges may include, e.g., IP address auto-configuration or DHCP messages and PANA authentication messages. Preferably, these messages needed to start a network connection are allowed to be forwarded because Client1 has a record in UFD.

Figure 22:
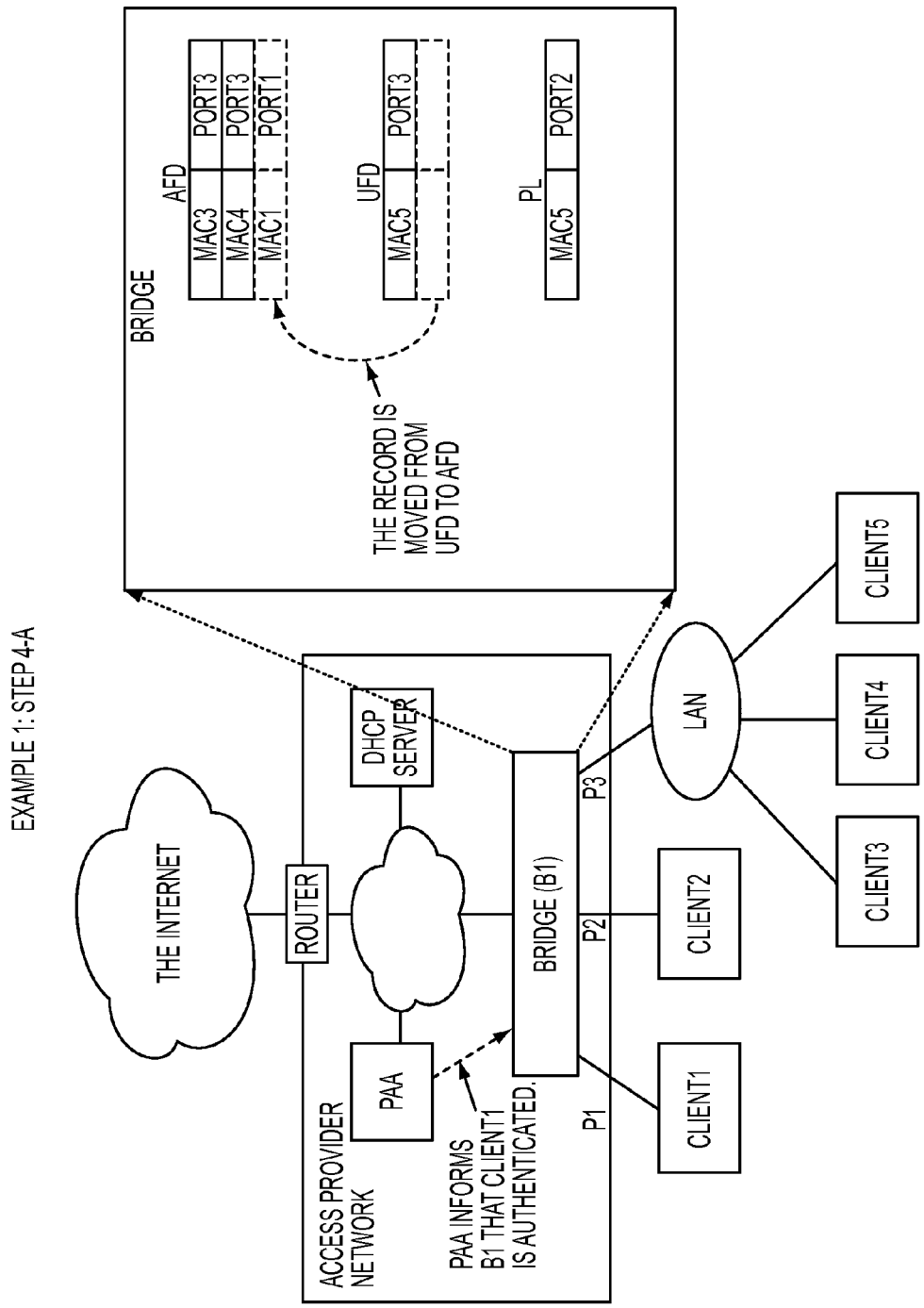

4-A. With reference to FIG. 22 labeled "Example 1: Step 4A," if Client1 is authenticated successfully, the authenticator requests the bridge (B1) to move the Client1 record in the UFD to the AFD.

Figure 23:
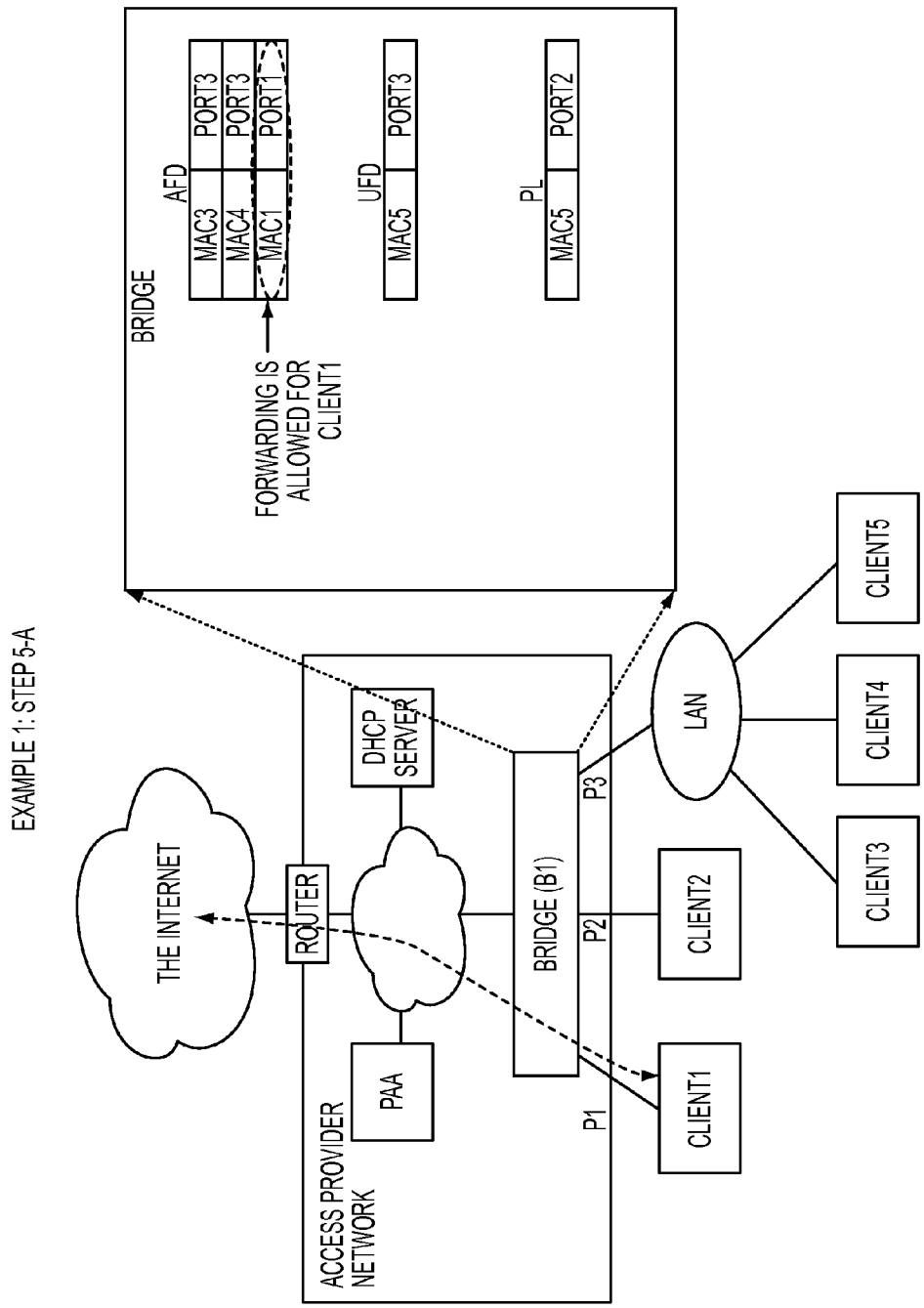

5-A. With reference to FIG. 23 labeled "Example 1: Step 5A," the Client1 begins message exchanges for other applications. In this regard, the Bridge (B1) preferably forwards any authorized packets, because a record for Client1 (MAC1: P1) exists in AFD.

Figure 24:
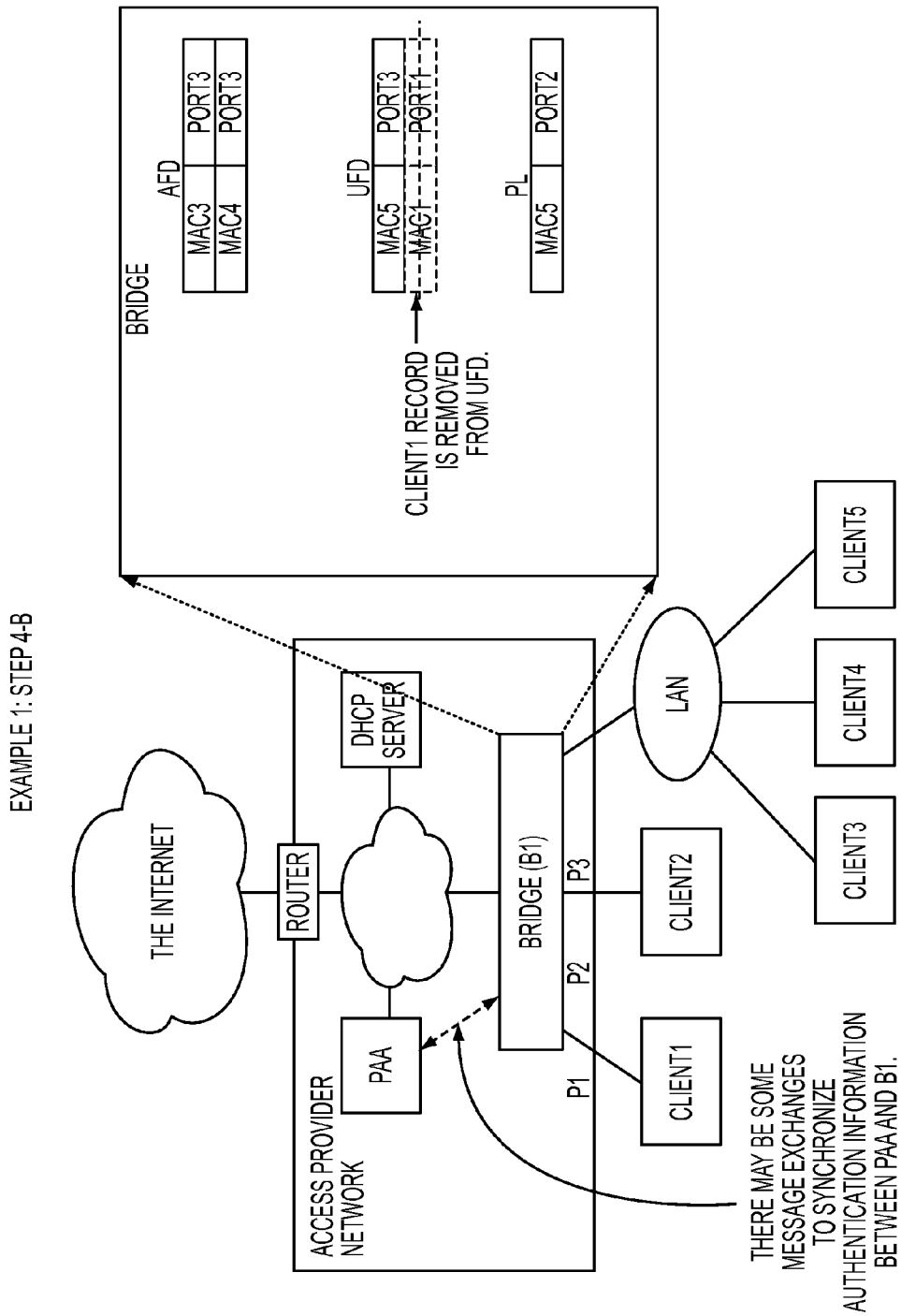

On the other hand, if the Client1 fails in the authentication or if the Client1 record in the UFD expires during the above step 3-A, the steps 4-A to 5-A are preferably replaced with following steps 4-B to 6-B:

4-B. With reference to FIG. 24 labeled "Example 1: Step 4B," the record for Client1 is removed from UFD.

Figure 25:
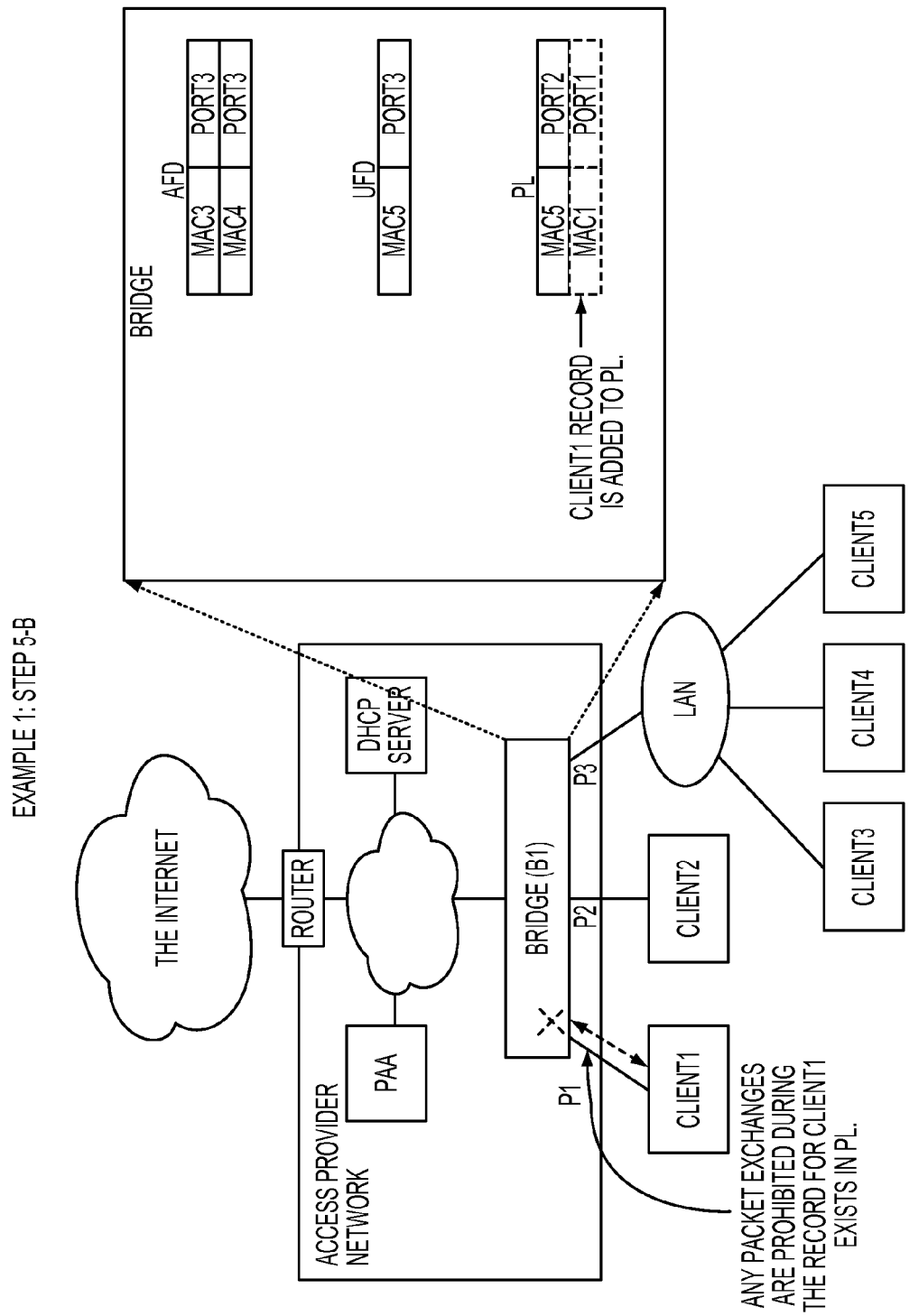

5-B. With reference to FIG. 25 labeled "Example 1: Step 5B," optionally, a new record (MAC1, P1) is added to PL. In this regard, any packets forwarded from and/or to the Client1 are preferably prohibited by the bridge B1 during the period for which the record lasts in the PL.

6-B. In this step, the Client1 may or may not try another authentication beginning once again with the step 1-A.

4.1.2. Security Considerations 4.1.2.1. Threat 1: Service Theft by Spoofing

Figure 26:
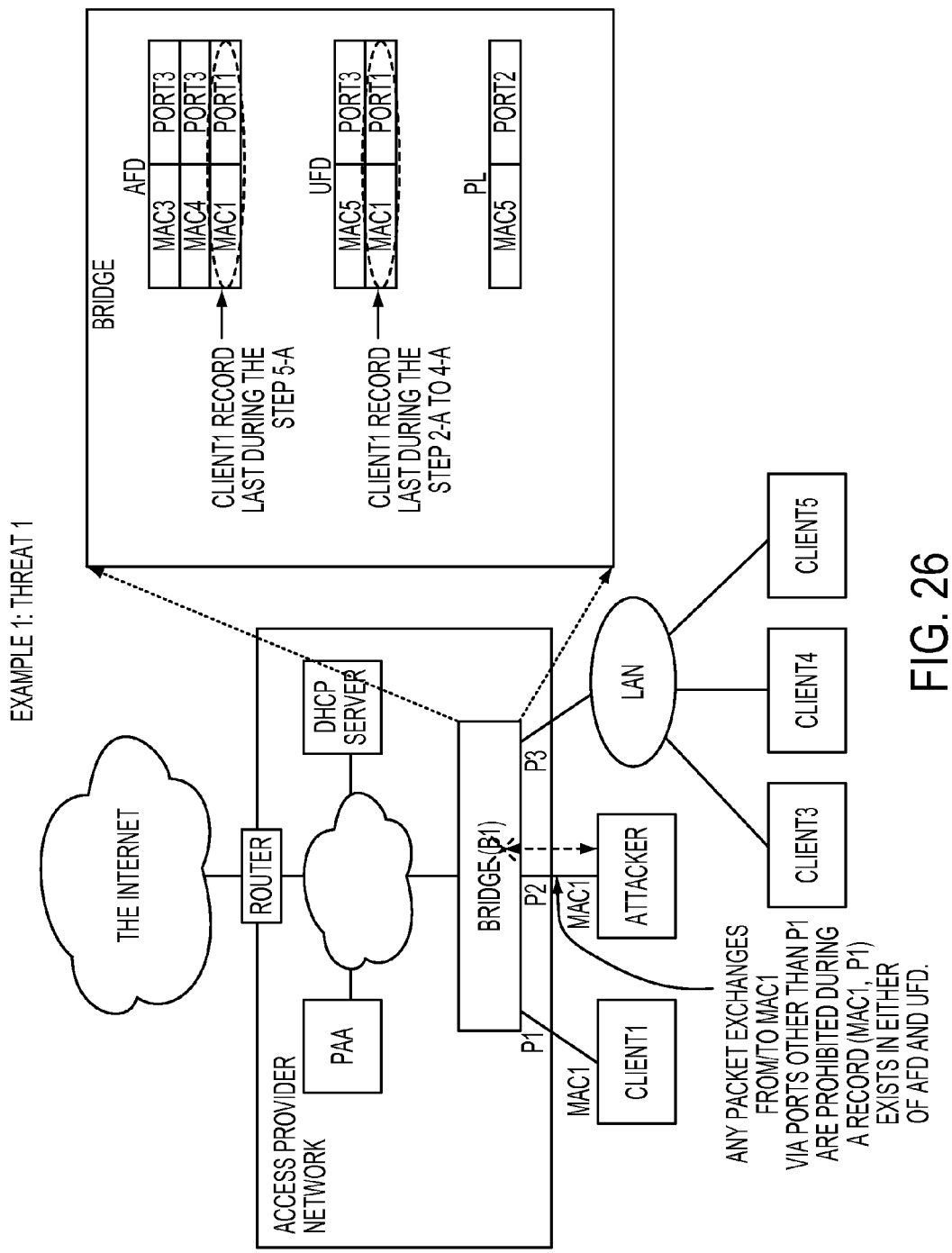

With reference to FIG. 26 labeled "Example 1: Threat 1," in some cases, an attacker could send a packet while spoofing the MAC address MAC1 of the Client1 after the Client1 is authenticated or at the very last moment before the Client1 is authenticated. For example, this could be done with the intention of making the bridge update its forwarding database(s) according to the malicious information and forward subsequent packets addressed to the Client1 to the attacker instead of the legitimate Client1. This is an illustrative service theft attack.

However, any packet exchanges from/to MAC1 via ports other than P1 are preferably prohibited during a period that a record (e.g., MAC1, P1) exists in either of the AFD and the UFD. As a result, this type of attack would fail during the above-noted step 5-A (i.e., the AFD has the record) and steps 2-A to 4-A (i.e., the UFD has the record).

4.1.2.2. Threat 2: DoS Attack Without Authentication

Figure 27:
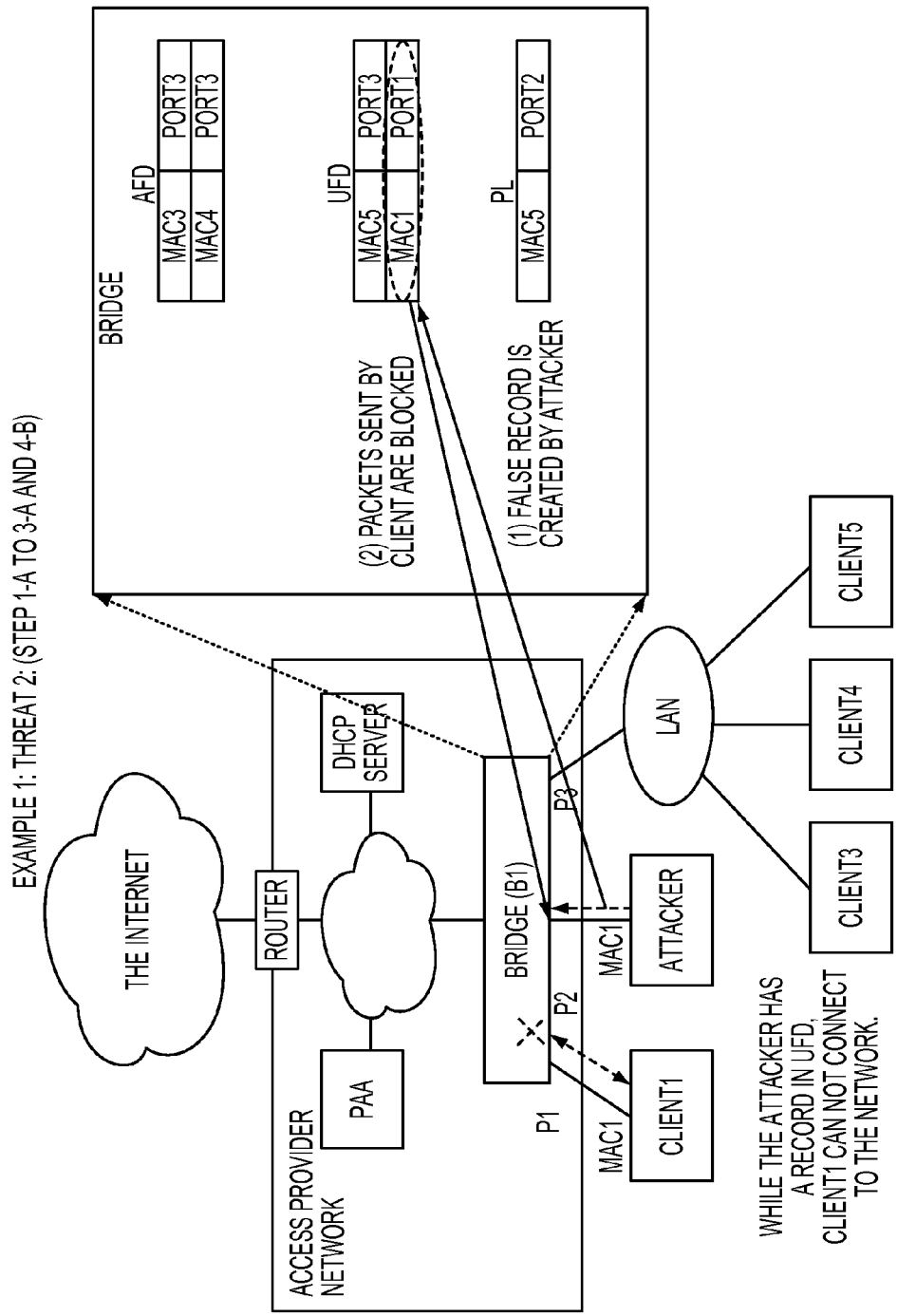
Figure 28:
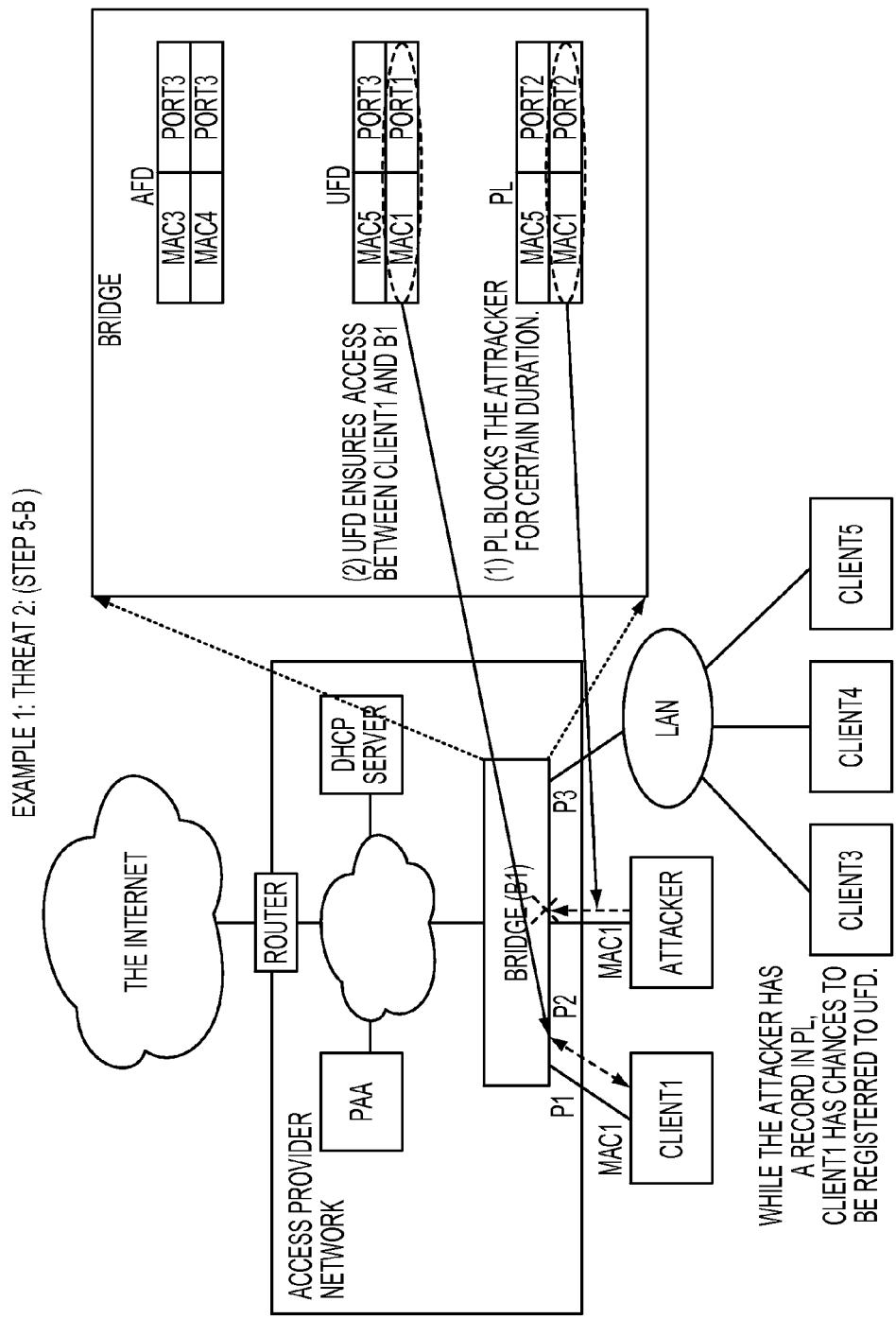
Figure 29:
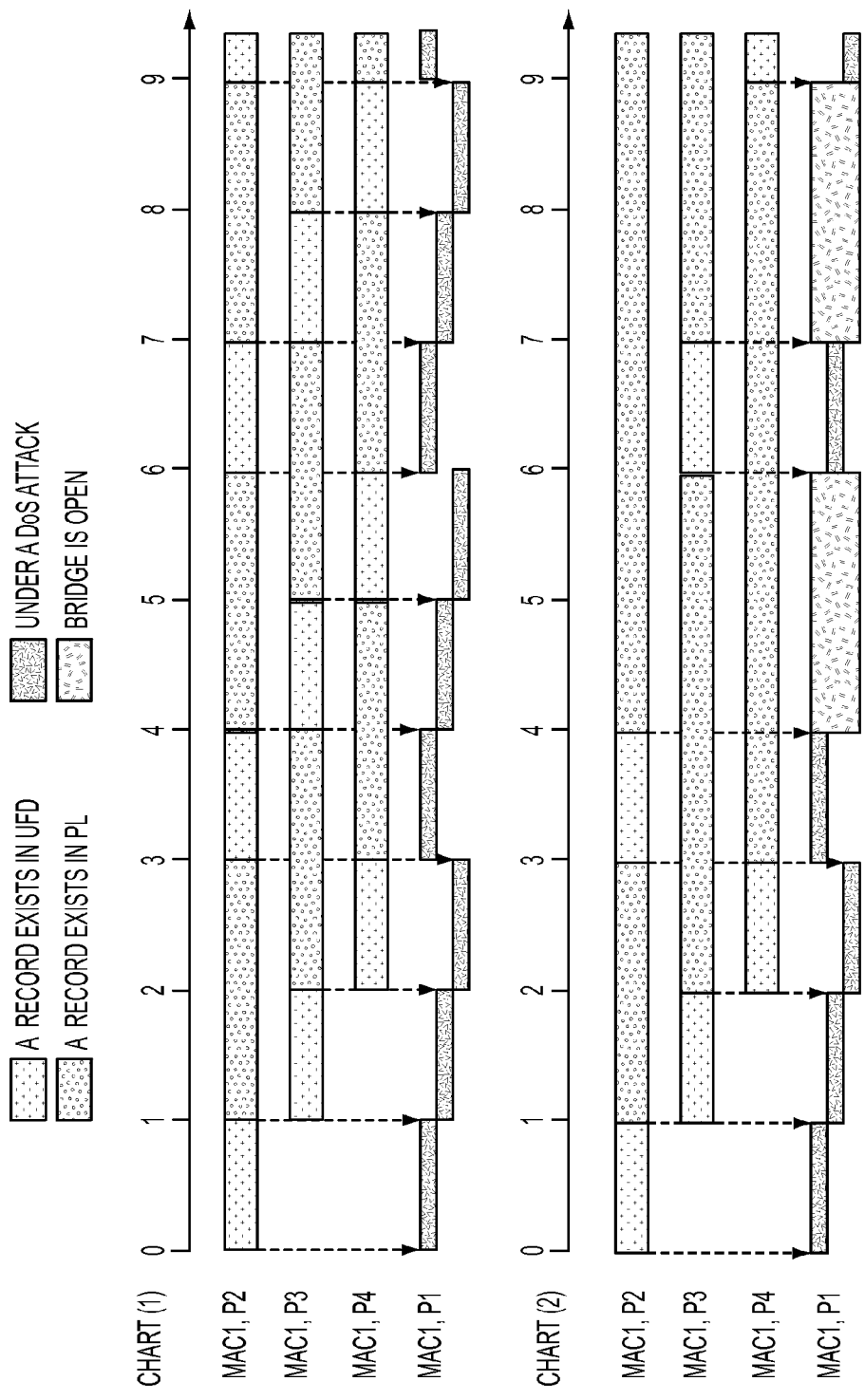

With reference to FIGS. 27-29, in some cases, an attacker may send a packet spoofing the MAC address MAC1 of the Client1 before the first connection of Client1 to the network. For example, if the attacker sends a packet spoofing MAC1 to the bridge, the bridge would create a new record in the UFD, such that the packets sent by the Client1 at a later time would be blocked by the bridge while the record exists.

Then, the attacker could repeat steps 1-A to 3-A and steps 4-B to 6-B. During the period in which the state of the attacker is between the steps 1-A and 4-B, the legitimate Client1 would not be able to gain access to the network. This is another illustrative type of denial-of-service attack (DoS attack). FIG. 27 labeled "Example 1: Threat 2: (Step 1-A to 3-A and 4-B)" illustrates such a DoS attack.

In addition, if an attacker fails in their authentication attempt and the step 5-B is enabled, the record (MAC1, P2) for the attacker may be added to a penalty list (PL). However, during the period that the record lasts, the Client1 may not be able to send a packet to the bridge that creates a record (MAC1, P1) for the Client1 in the UFD. However, once the Client1 gets the record in the UFD, the Client1 can try an authentication without being bothered by the attacker. If the attacker can use multiple ports for the DoS attack, the attacker can potentially fill up time durations with other attacking nodes that are in PL.

With reference to FIG. 29 labeled "Example 1: Threat 2: Simultaneous Attacks," the chart (1) shows this simultaneous DoS attacks from multiple ports. In chart (1), the attacker is using ports P2, P3 and P4 and trying to send spoofing packets to the bridge repeatedly. At time 0, a node at P2 sends a packet and gains a record in the UFD. It, thus, prevents the victim at port P1 from sending packets via the bridge. The attacking record in the UFD expires at time 1, but another attacking node at P3 sends a packet to the bridge and gains a record in UFD. This record expires at time 2, however, yet another node at P4 gains a record in UFD. When this record expires, the first node P1 gets enabled to send a packet again. As illustrated, these steps can be repeated so as to create a DoS condition.

In some embodiments, one illustrative solution to this type of attack is to increase the lifetime of the PL record in proportion to the number of UFD and PL records which have the same MAC address. In illustrative example of this type of solution is shown in chart (2) of FIG. 29. As illustrated in chart (2), the attacking node at P2 sends a packet and gains a record in the UFD at time 0, and a node at P3 gets one at time 1. The UFD record for the node at P3 expires at time 2 and a record (MAC1, P3) is moved to the PL. However, in contrast to that shown in chart (1), this time, the lifetime of the PL record is calculated in proportion to the number of similar records in the UFD and the records in PL. In this example, at time 2, there are two records having MAC1 in UFD and PL. Accordingly, the lifetime of the record is doubled. At time 3, the node at P4 is moved to PL. Accordingly, the lifetime for it is tripled because there are three records of MAC1 in the UFD and the PL. As a result, the legitimate node at P1 has some chances to send packets to the bridge between times 4 and 6 and between times 7 and 9.

In other embodiments, further possible extensions of the PL implementation may include increasing the lifetime of a PL record at an increasing rate or exponentially when the same combination of a MAC address and a port is added to PL repeatedly. This would make the DoS attack described in this section even less feasible. However, it could result in making another type of DoS attack easier. In that regard, if an attacker and a victim use the same port P1, the attacker may try to add a MAC address MAC1 to PL excessive times from P1. After that, the victim might try to connect a node which MAC address is MAC1 to Port 1, but it could fail because the record (MAC1, P1) in PL has an exponentially large duration. To prevent this latter type of DoS attack, a moderate upper time limit may be useful for such an exponential increase.

4.1.2.3. Threat 3: DoS Attack with Authentication

Figure 30:
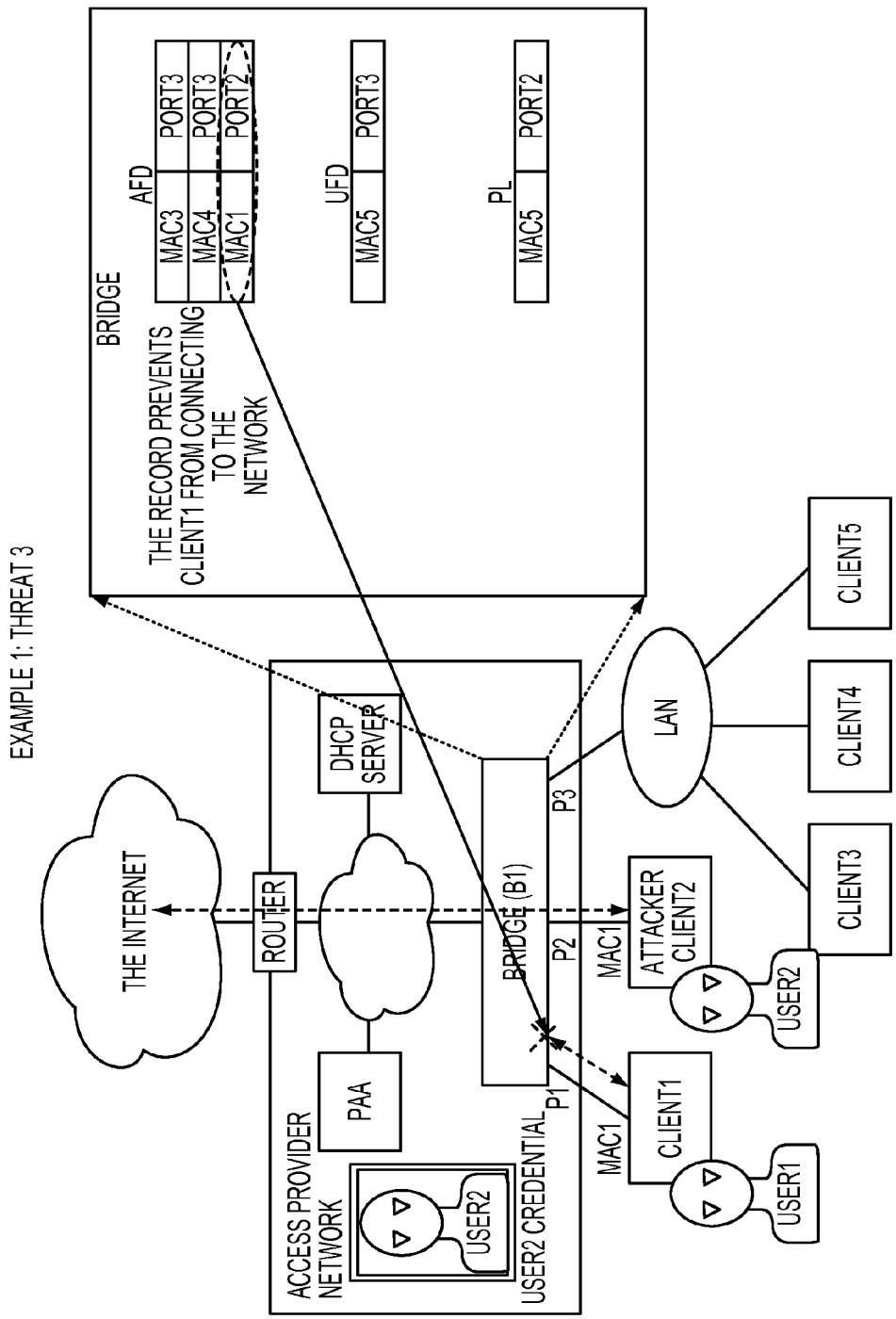

With reference to FIG. 30 labeled "Example 1: Threat 3," a situation in which a first user "User1" uses a node "Client1" and a second user "User2" uses a node "Client2" is considered. As shown, Client1 is connected to P1, and Client2 is connected to P2. In this example, each of the users, User1 and User2, has their own accounts on the authenticator. To prevent User1 from connecting to the network, the attacker User2 can connect Client2 to the network, spoofing the MAC address of Client1. If User2 fails in an authentication, the case is similar to that of threat 2 described in the previous section. However, this time, the User2 can get authenticated using the user's own user credential because the User2 has a valid account on the authenticator. Because Client2 is authenticated using the credential of User2, a record for Client2 is created in the AFD. Accordingly, the Client1 can thus be disabled from connecting to the bridge B1. To prevent this type of attack, the network administrator can revoke the credential of the wrongdoing User2. Alternatively, the administrator could configure the authenticator so that only the credential of User1 can be used for the authentication of MAC1.

In some embodiments, such that the Authenticator can know the port identifier of the client, more flexible configurations are possible for the Authenticator. See, e.g., examples listed at the end of Section 4.2.2.3 below.

4.2. Second Example of Implementations 4.2.1. Scenario of the Second Example

Figure 31:
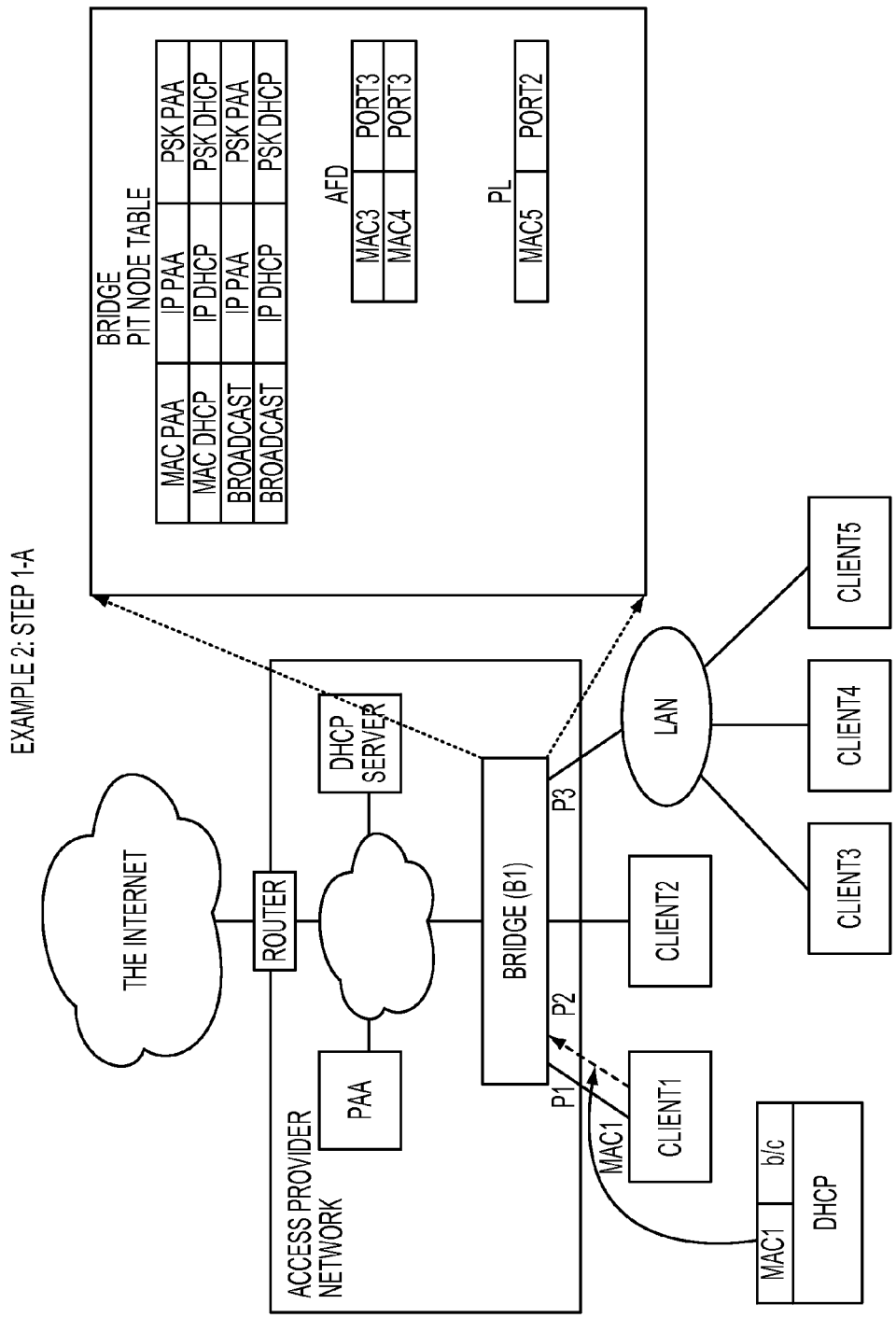

According to a second illustrative implementation, a system can employ an AFD, a PIT and, optionally, a PL. In the preferred embodiments, the system would perform at least some, preferably all, of the following:

1-A. With reference to FIG. 31 labeled "Example 2: Step 1-A," in such illustrative circumstance, a client (Client1) is starting to connect to the access network. As shown, Client1 is connected to Port 1 (P1) of the Bridge (B1) and sends the first packet during boot. This message may be a router solicitation message, a DHCP Discover/Solicit message or another message(s).

Figure 32:
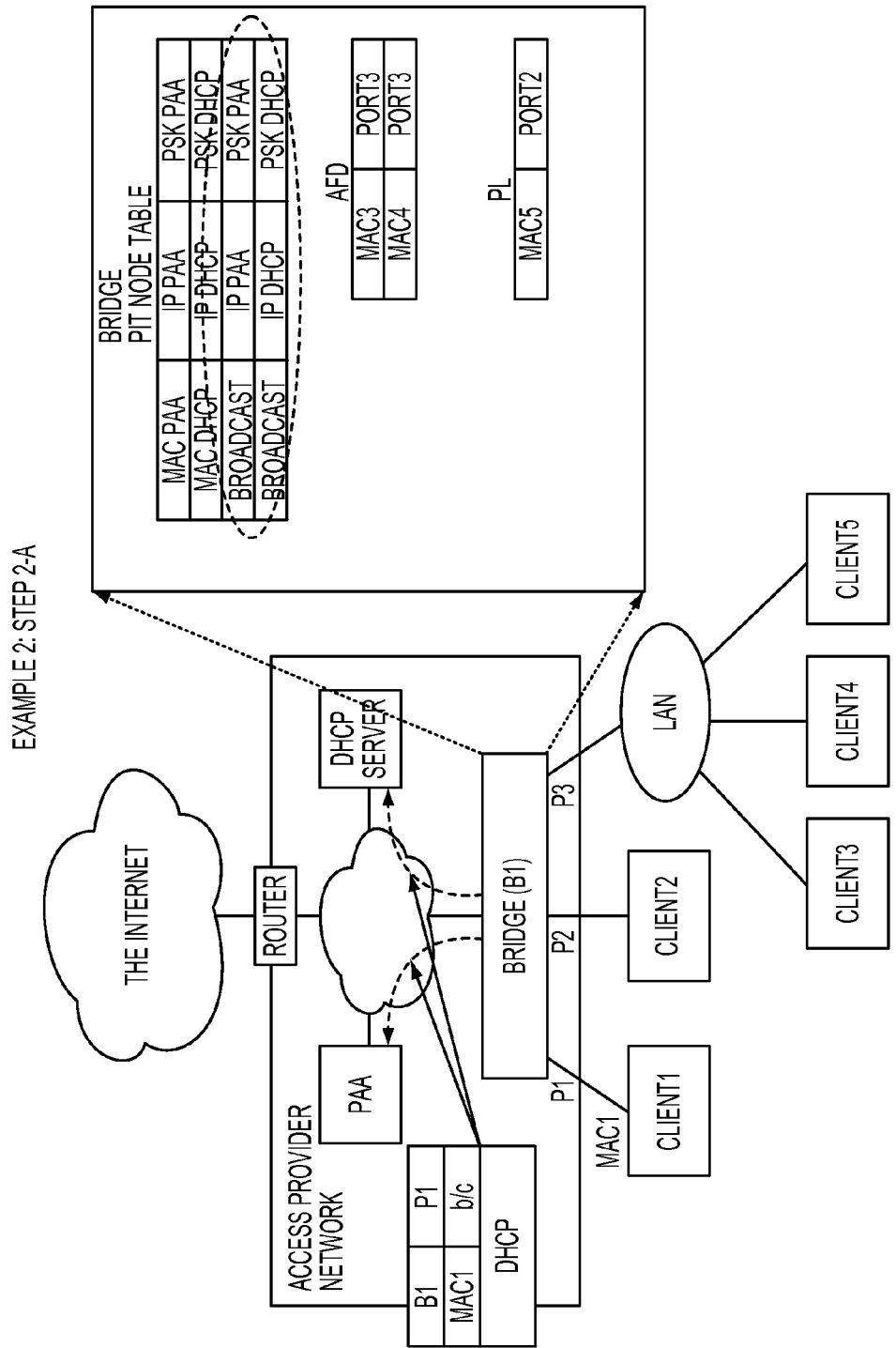

2-A. With reference to FIG. 32 labeled "Example 2: Step 2-A," the bridge attaches a PIT to the packet sent from Client1 and forwards it to the destination node found in the PIT Node Table because the source MAC address (MAC1) is not found in the AFD and the PL. As shown in example of FIG. 32, the bridge sends packets to the PAA and the DHCP server because the destination address of the original packet is a broadcast address. As described above, other implementations could also be used for broadcast packets.

Figure 33:
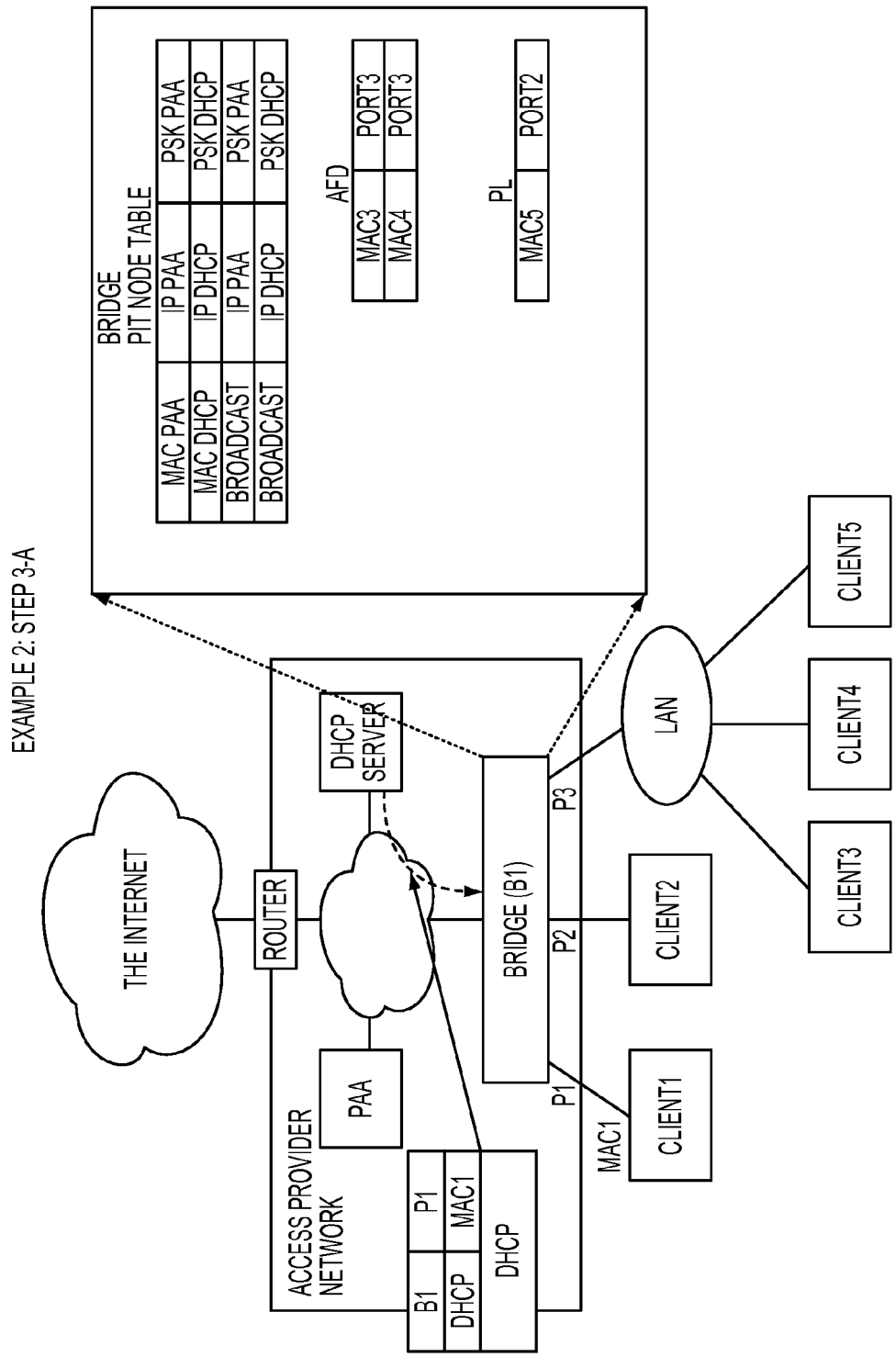

3-A. With reference to FIG. 33 labeled "Example 2: Step 3-A," the DHCP server sends a response to Client1, attaching the PIT copied from the request packet.

Figure 34:
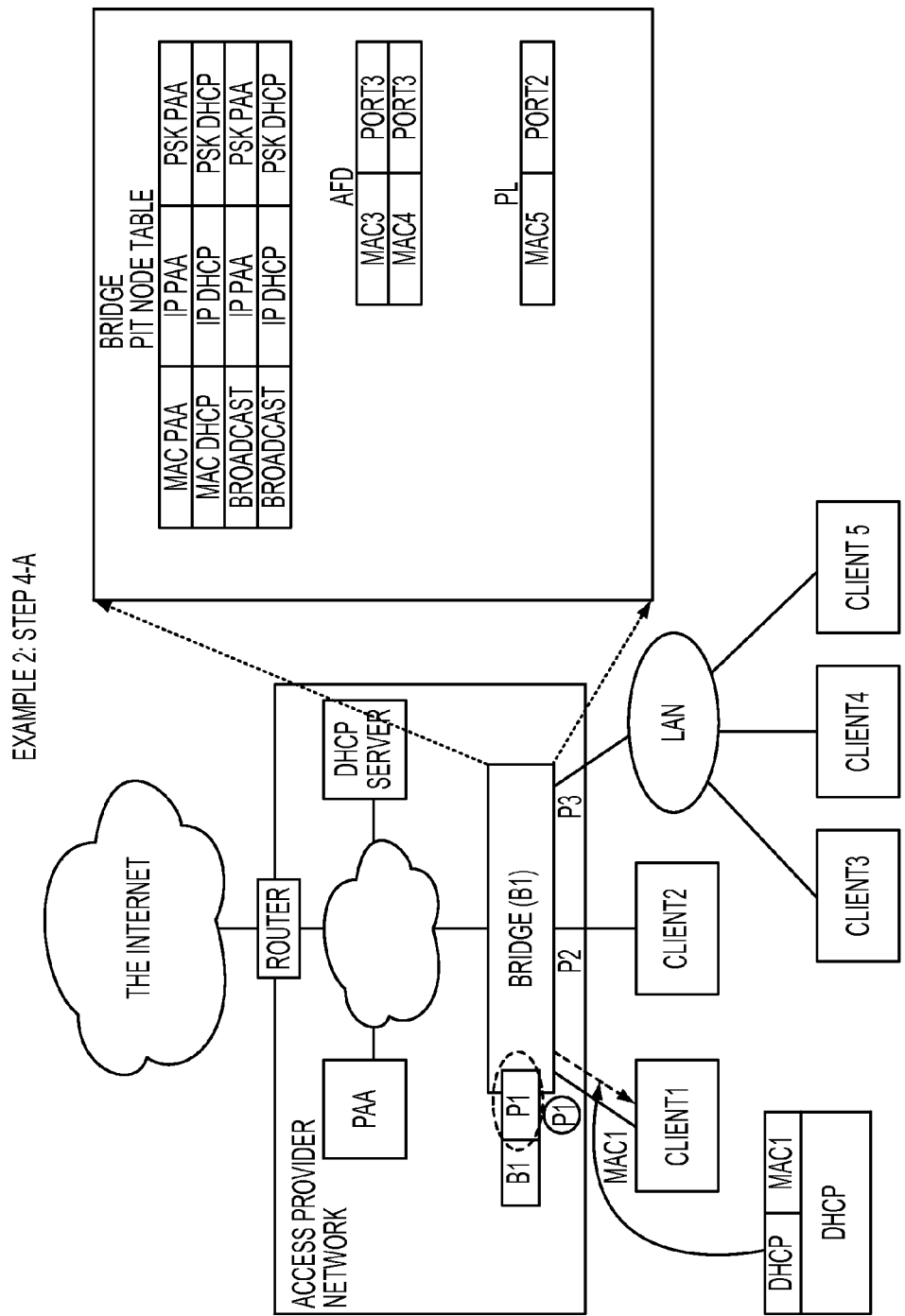

4-A. With reference to FIG. 34 labeled "Example 2: Step 4-A," the bridge detaches PIT from the packet and forwards it to the port found in the PIT.

Figure 35:
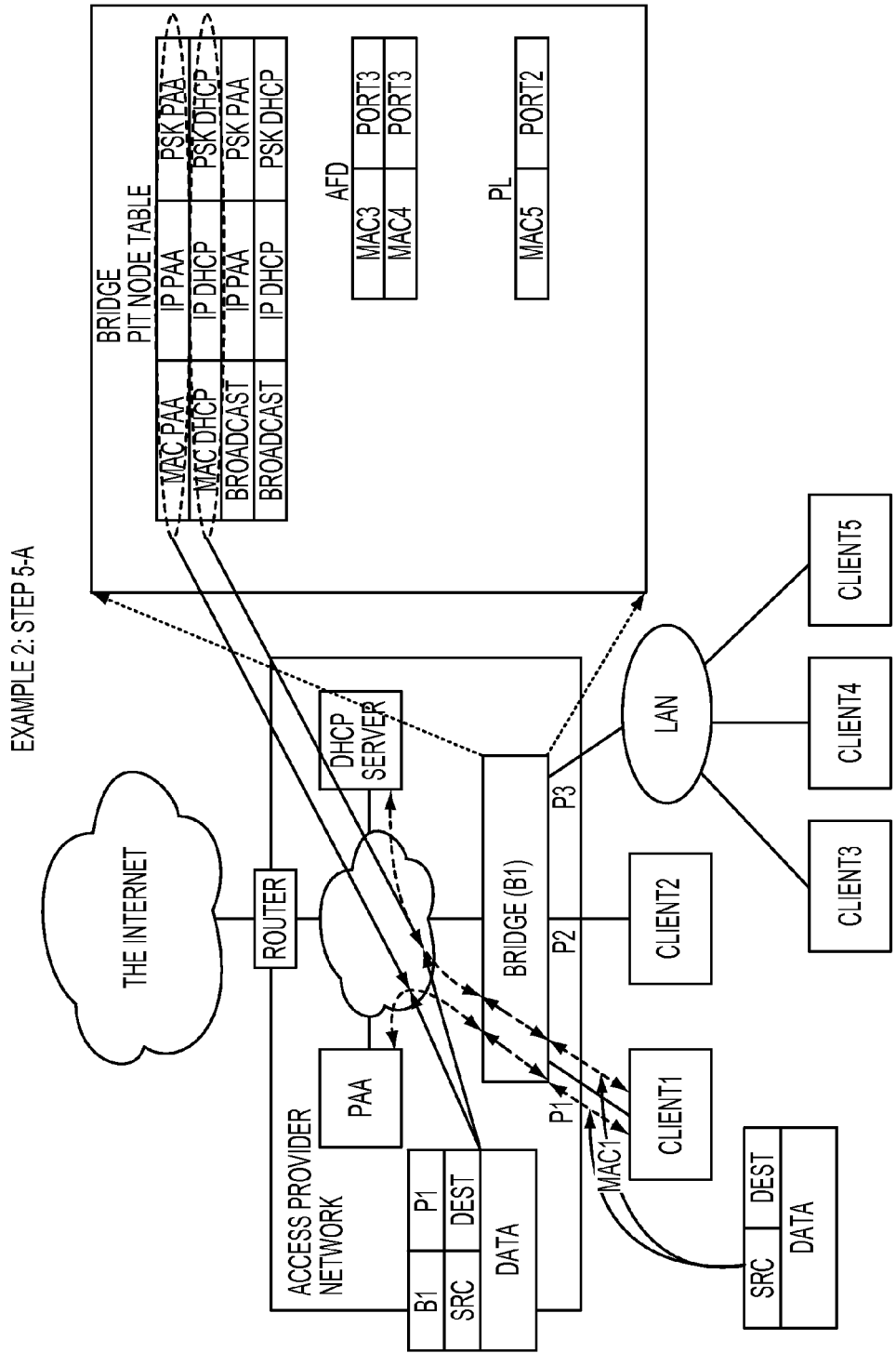

5-A. With reference to FIG. 35 labeled "Example 2: Step 5-A," the Client1 proceeds with message exchanges during the bootstrap. These may include, e.g., IP address auto-configuration or DHCP messages and PANA authentication messages.

Figure 36:
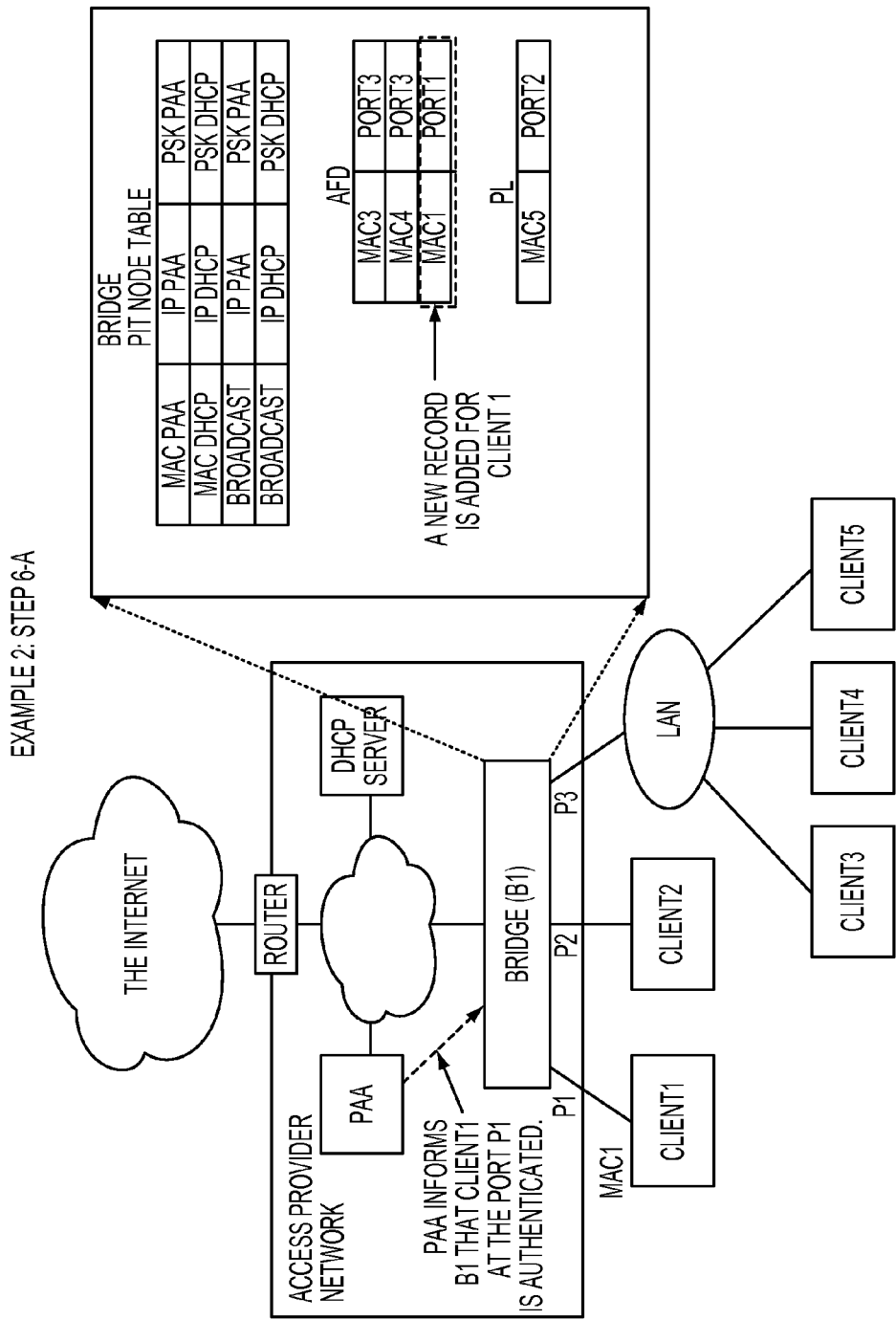

6-A. With reference to FIG. 36 labeled "Example 2: Step 6-A," if the Client1 is authenticated successfully, the authenticator requests the bridge (B1) to add a new record in the AFD for Client1.

Figure 37:
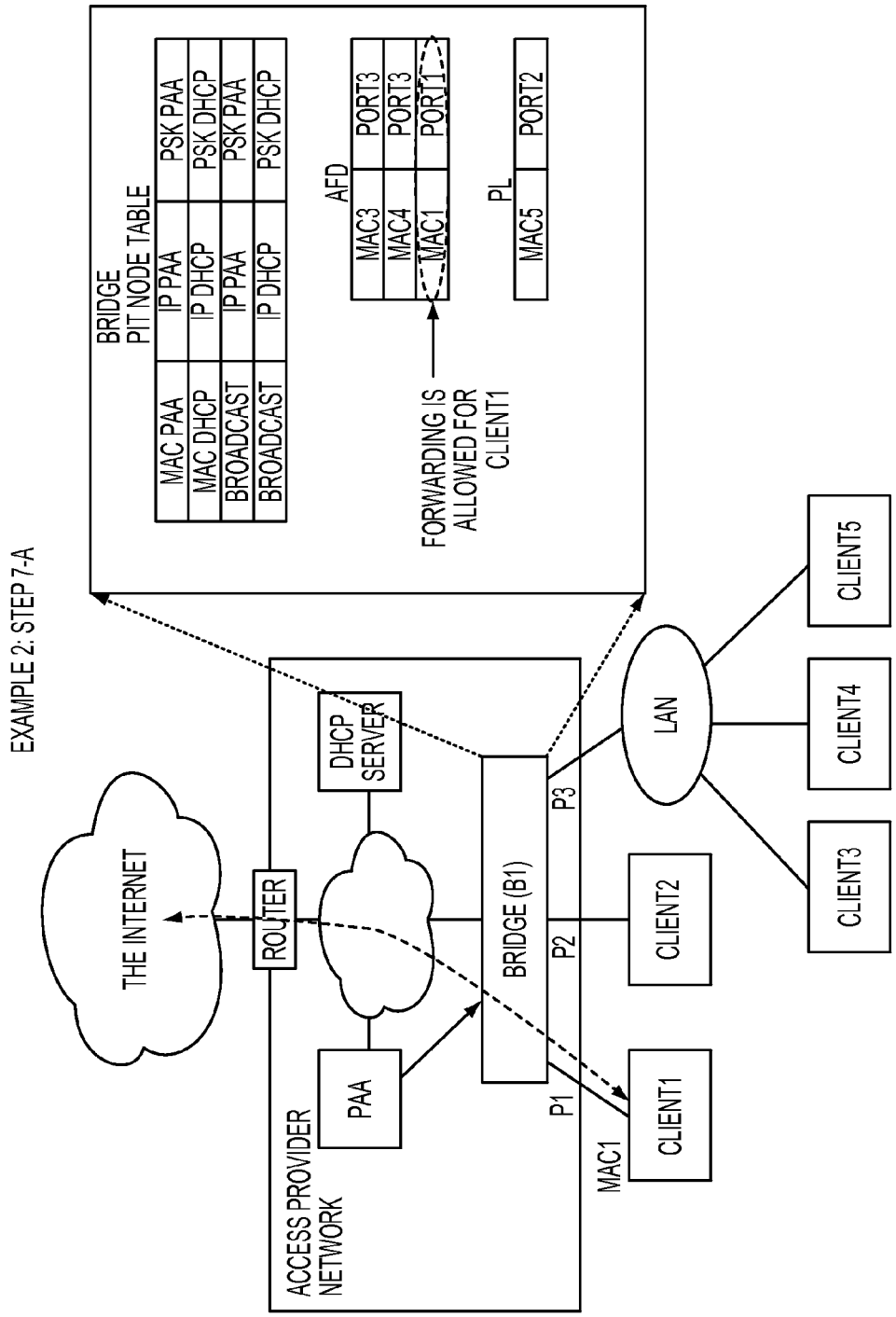

7-A. With reference to FIG. 37 labeled "Example 2: Step 7-A," the Client1 begins the message exchanges for other applications. In that regard, the bridge (B1) forwards any authorized packets because a record for Client1 (MAC1:P1) exists in the AFD.

In some preferred embodiments, if the Client1 fails in the authentication at the step 5-A above, the authenticator may request the bridge to add a new record in the PL for the Client1.

4.2.2. Security Considerations 4.2.2.1. Threat 1: Service Theft by Spoofing

Figure 38:
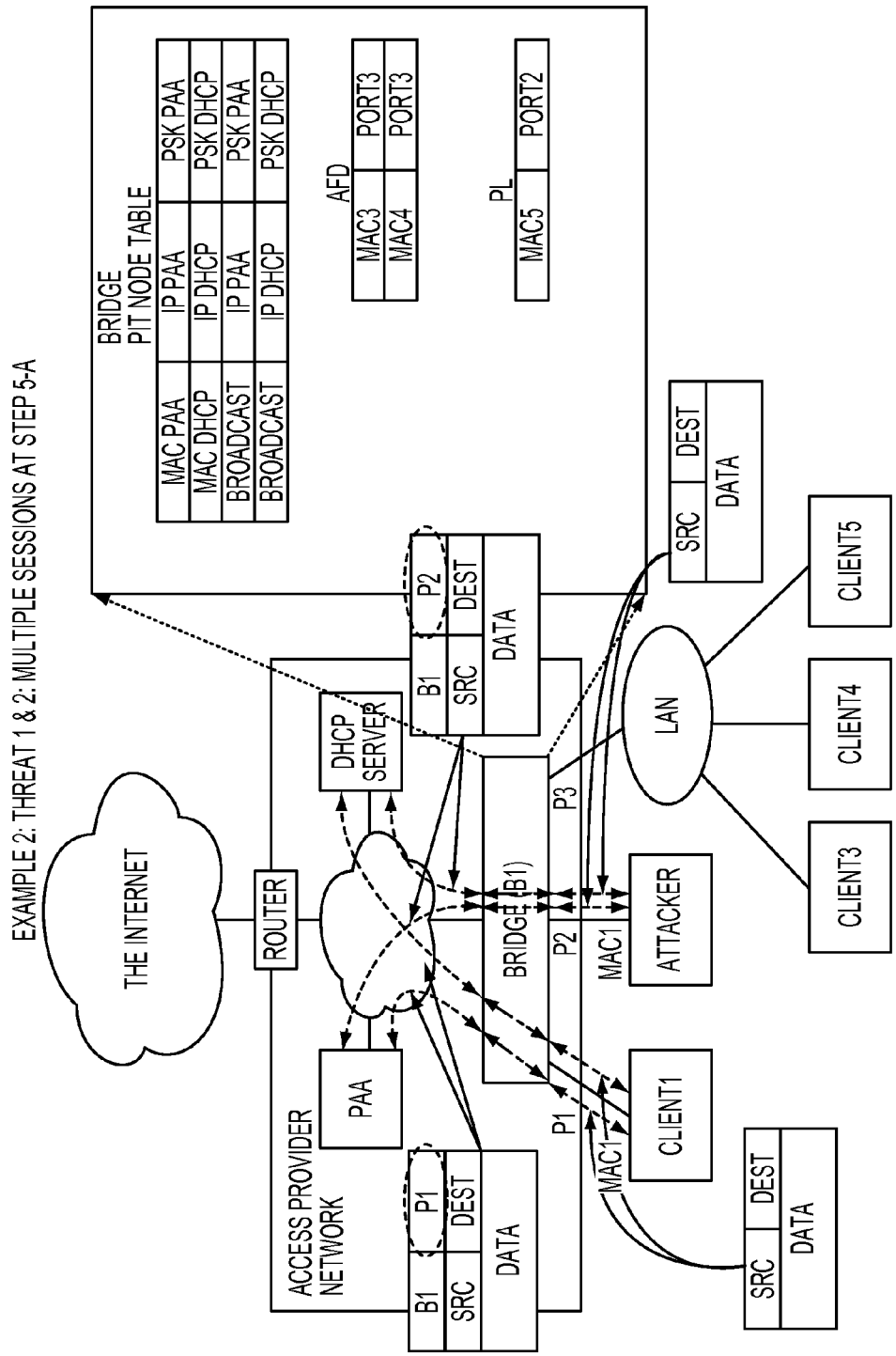
Figure 39:
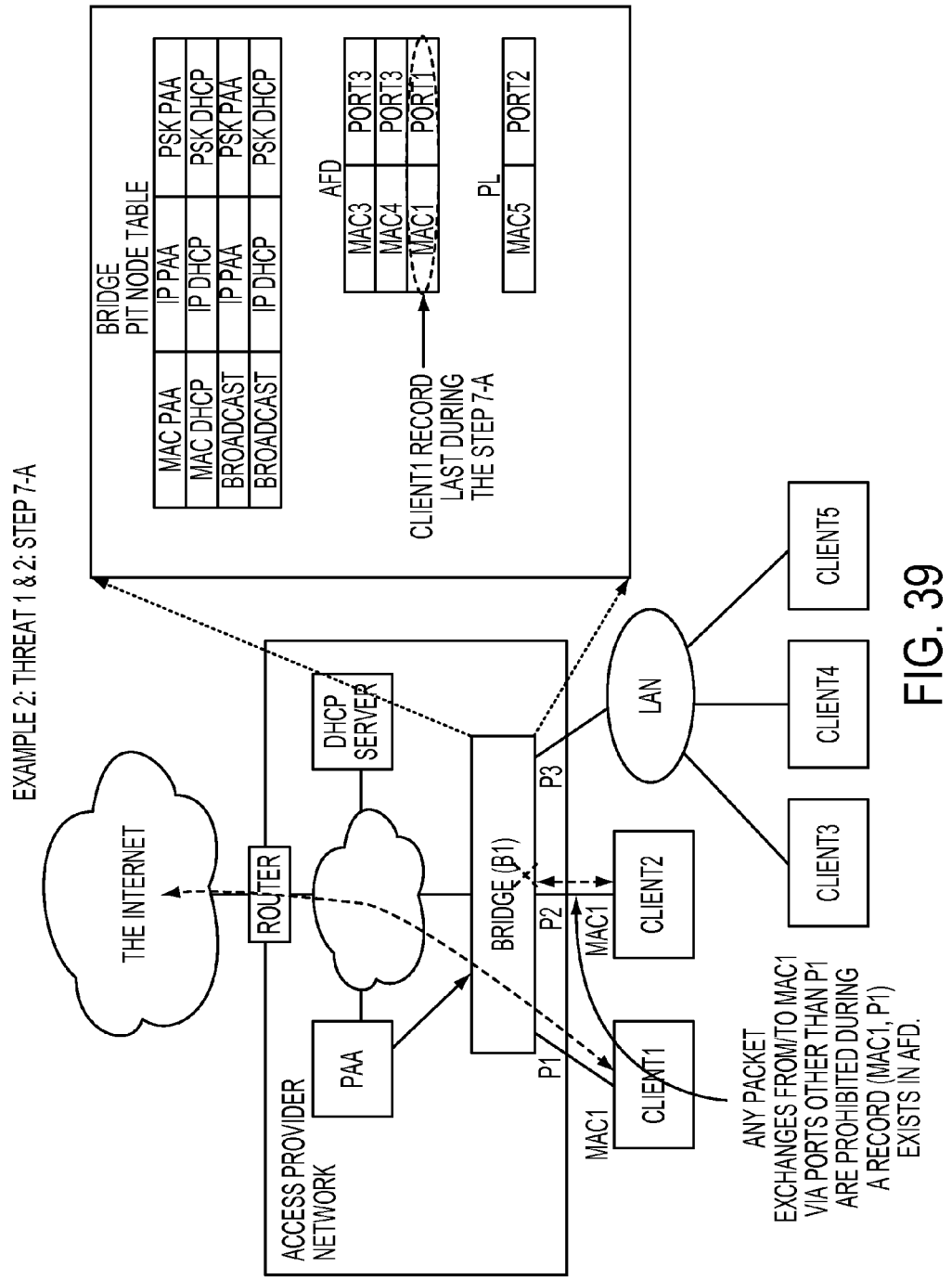

With reference to FIGS. 38-39, in some cases, an Attacker may send a packet spoofing the MAC address MAC1 of the Client1 after the Client1 has been authenticated or at the very last moment before the Client1 is authenticated. This may be done with the intention of making the bridge update its forwarding database according to the malicious information and to forward subsequent packets addressed to Client1 to an Attacker instead of to the legitimate Client1. But the Authenticator and the DHCP server preferably distinguish sessions not only by MAC addresses but also by port identifiers. Accordingly, they should not be confused by spoofing packets sent from a different port. See FIG. 38 labeled "Example 2: Threat 1 & 2: Multiple sessions at Step 5-A." In addition, once the Client1 is authenticated and a record for the Client1 is added to the AFD at the step 6-A, any packet exchange from and/or to MAC1 via ports other than P1 would be prohibited. As a result, this type of attack should fail. See FIG. 39 labeled "Example 2: Threat 1 & 2: Step 7-A."

4.2.2.2. Threat 2: DoS Attack Without Authentication

Also with reference to FIGS. 38-39, in some cases, an attacker may send a packet spoofing the MAC address MAC1 of the Client1 before the first connection of the Client1 to the network. Although this could potentially be problematic for the above-described implementations using the UFD, this should not be problematic for the above-described implementations using the PIT.

Because the Authenticator and the DHCP server can distinguish multiple sessions, the Client1 can always try its authentication, while the Attacker is sending spoofing packets. See FIG. 38 labeled "Example 2: Threat 1 & 2: Multiple sessions at Step 5-A." Once Client1 gets authenticated and a record for Client1 is added to AFD at the step 6-A, any packet exchanges from and/or to MAC1 via ports other than P1 will be prohibited. Accordingly, such an attack would, thus, fail. See FIG. 39 labeled "Example 2: Threat 1 & 2: Step 7-A."

4.2.2.3. Threat 3: DoS Attack With Authentication

Reference is now made to illustrative cases in which a) a user "User1" uses a node "Client1" and a user "User2" uses a node "Client2," b) Client1 is connected to port P1 and Client2 is connected to port P2, and c) each of User1 and User2 have their own accounts on the authenticator. To prevent the User1 from connecting to the network, the attacker User2 can connect Client2 to the network, spoofing the MAC address of Client1. If User2 fails in an authentication, the case is similar to threat 2 described in the previous section. However, this time, the User2 can get authenticated using the user's own user credential because the User2 has a valid account on the authenticator. Furthermore, because Client2 is authenticated using the credential of User2, a record for Client2 is created in the AFD. As a result, the Client1 can thus be disabled from connecting to the bridge B1.

In order to prevent this type of attack, the network administrator can revoke the credential of the wrongdoing User2. Alternatively, the administrator may configure the authenticator so that only the credential of User1 can be used for the authentication of MAC1.

The PIT enables more flexible configurations for the Authenticator. For example, because the authenticator knows the port identifier for each message, it is possible to specify limitations using port identifiers. For example, some or all of the following rules may be implemented in some illustrative embodiments:

- Deny an authentication request for MAC1 if it comes from a port B1:P2. For example, this rule could be useful in the case described above.
- Do not accept the credential of User1 if it comes from a port other than port B1:P1. If User1 uses the user's network nodes at the particular port B1:P1, this rule may be useful. As a result, even if someone steals the secret key of User1, the attacker can not use the key at ports other than at port B1:P1.
- Deny an authentication request for MAC1 if it comes from a port other than the port B1:P1. Assume a network node connected to Port B1:P1 and that the node is shared among several users. Preferably, each user has their account to use the node. Users can use the node, while an Attacker cannot do a DoS attack from ports other than B1:P1.
- Allow any valid credentials from port B1:P1, while only allowing limited combinations of credentials and MAC at the port(s) other than B1:P1. This rule may be useful in cases in which port B1:P1 is placed in a secured room, while other ports are located within unsecured open spaces.

Part III: Bootstrapping Multicast Security from Network Access Authentication Protocol 1. Background Information 1.1. References The following general background references are incorporated herein by reference in their entireties.

1. B. Cain, et al., "Internet Group Management Protocol, Version 3," RFC 3376, October 2002 (hereinafter referred to as [RFC3376]).
2. R. Vida and L. Costa, "Multicast Listener Discovery Version 2 (MLDv2) for IPv6," RFC 3810, June 2004 (hereinafter referred to as [RFC3810]).
3. T. Hayashi, et al., "Multicast Listener Discovery Authentication Protocol (MLDA)," Internet-Draft, draft-hayashi-mida-02.txt, work in progress, April 2004 (hereinafter referred to as [MLDA]).
4. M. Christensen, et al., "Considerations for IGMP and MLD Snooping Switches," Internet-Draft, draft-ietf-magma-snoop-11.txt, work in progress, May 2004 (hereinafter referred to as' [MLDSNOOP]).
5. B. Lloyed and W. Simpson, "PPP Authentication Protocols", RFC 1334, October 1992 (hereinafter referred to as [RFC1334]).
6. M. Baugher et. al., "The Secure Real-time Transport Protocol (SRTP)," RFC 3711, March 2004 (hereinafter referred to as [RFC371]).
7. J. Arkko, et al., "MIKEY: Multimedia Internet Keying," Internet-Draft, draft-ieff-msec-mikey-08.txt, work in progress, December 2003 (hereinafter referred to as [MIKEY]).
8. M. Thomas and J. Vilhuber, "Kerberized Internet Negotiation of Keys (KINK)," Internet-Draft, draft-ieff-kink-kink-05.txt, work in progress, January 2003 (hereinafter referred to as [KINK]).
9. T. Hardjono and B. Weis, "The Multicast Group Security Architecture," RFC 3740, March 2004 (hereinafter referred to as [RFC3740]).
10. H. Harney, et al., "GSAKMP," Internet-Draft, draft-ieff-msec-gsakmp-sec-06.txt, work in progress, June 2004 (hereinafter referred to as [GSAKMP]).
11. T. Narten and E. Nordmark, "Neighbor Discovery for IP Version 6 (IPv6)," RFC 2461, December 1998 (hereinafter referred to as [RFC2461]).
12. H. Schulzrinne, et al., "RTP: A Transport Protocol for Real-time Applications," RFC 3550, July 2003 (hereinafter referred to as [RFC3550]).
13. B. Aboba, et al., "Extensible Authentication Protocol (EAP)," RFC 3748, June 2004 (hereinafter referred to as [RFC3748]).
14. B. Aboba, et al., "Extensible Authentication Protocol (EAP) Key Management Framework," Internet-Draft, draft-ieff-eap-keying-02.txt, work in progress, June 2004 (hereinafter referred to as [EAP-KEY].
15. D. Waitzman, et al., "Distance Vector Multicast Routing Protocol," RFC 1075 November 1998 (hereinafter referred to as [RFC1075]).
16. A. Ballardie, "Core Based Trees (CBT version 2) Multicast Routing," RFC 2189, September 1997 (hereinafter referred to as [RFC2189]).
17. D. Estrin, et al., "Protocol Independent Multicast-Sparse Mode (PIM-SM): Protocol Specification," RFC 2362, June 1998 (hereinafter referred to as [RFC2362]).
18. D. Forsberg, et al., "Protocol for Carrying Authentication for Network Access (PANA)," Internet-Draft, draft-ieff-pana-pana-04.txt, work in progress, May 7, 2004 (hereinafter referred to as [PANA]).

19. IEEE Standard for Local and Metropolitan Area Networks, "Port-Based Network Access Control," IEEE Std 802.1X-2001 (hereinafter referred to as [802.1X]).

1.2. Terminology

In this disclosure, the terminology "Multicast Router" includes, e.g., a router that is capable of forwarding IP multicast packets. In some examples, there may be multiple IP multicast routers in the same IP link.

In this disclosure, the terminology "Multicast Listener" includes, e.g., a host or a router that has a desire to receive IP multicast packets.

1.3. IP Multicast Overview

Figure 40:
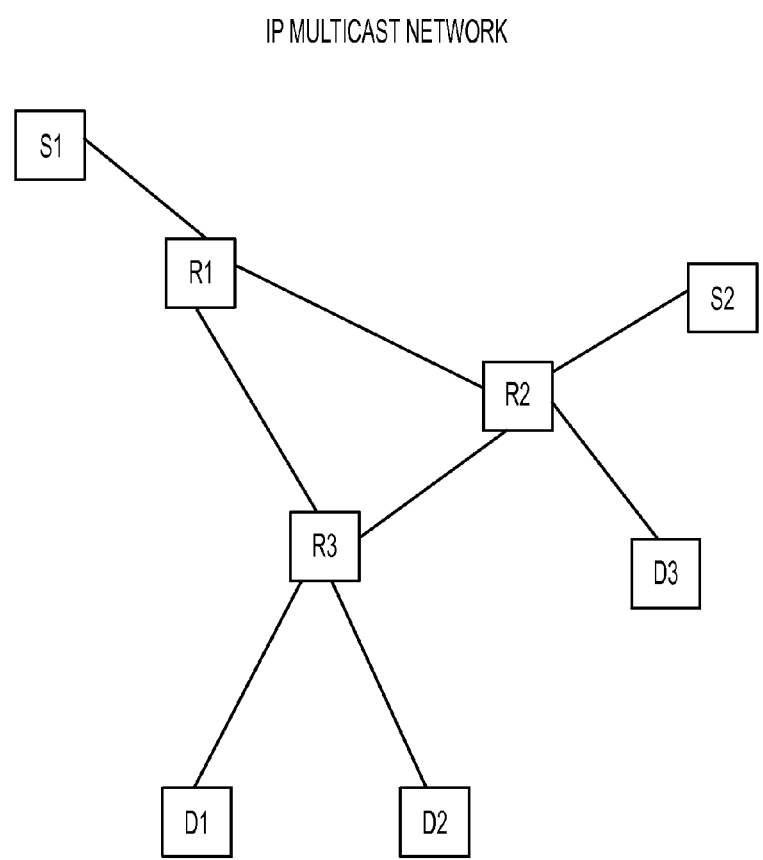
FIGS. 40-47 are illustrative schematic diagrams demonstrating, inter alia, features according to some preferred embodiments of the invention related to, inter alia, bootstrapping multicast security from network access authentication protocol related to Part III of the detailed description of the preferred embodiments, and more particularly.

FIG. 40 shows an example of an IP multicast network. In this illustrative example, S1 and S2 are nodes that originate IP multicast packets destined for a particular multicast address G to the network. R1, R2 and R3 are routers that are capable of forwarding IP multicast packets. In addition, D1, D2 and D3 are nodes that are the ultimate receivers of the IP multicast packets. In this illustrative example, it is assumed that each link is a point-to-point link.

Figure 41:
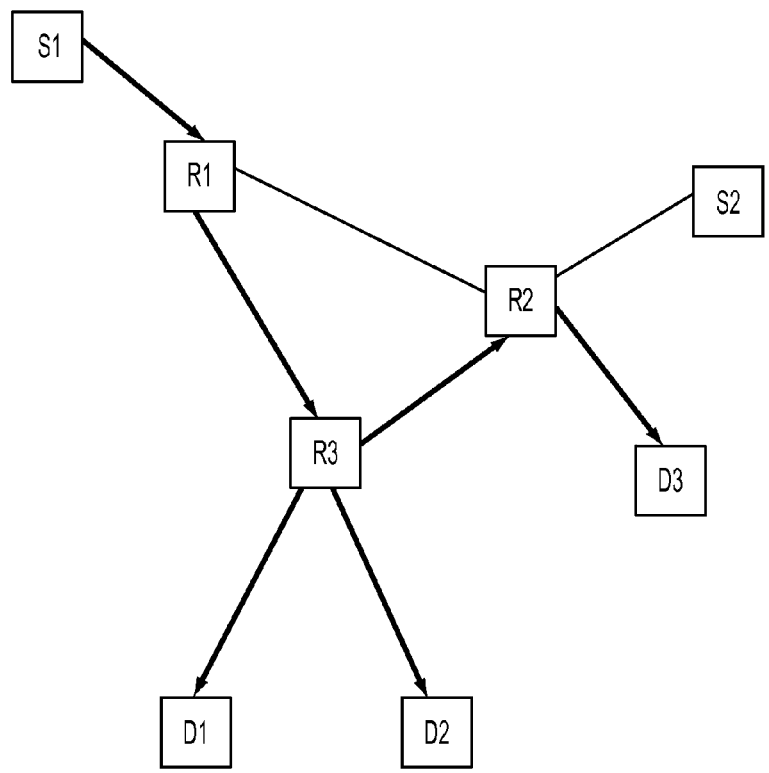
Figure 42:
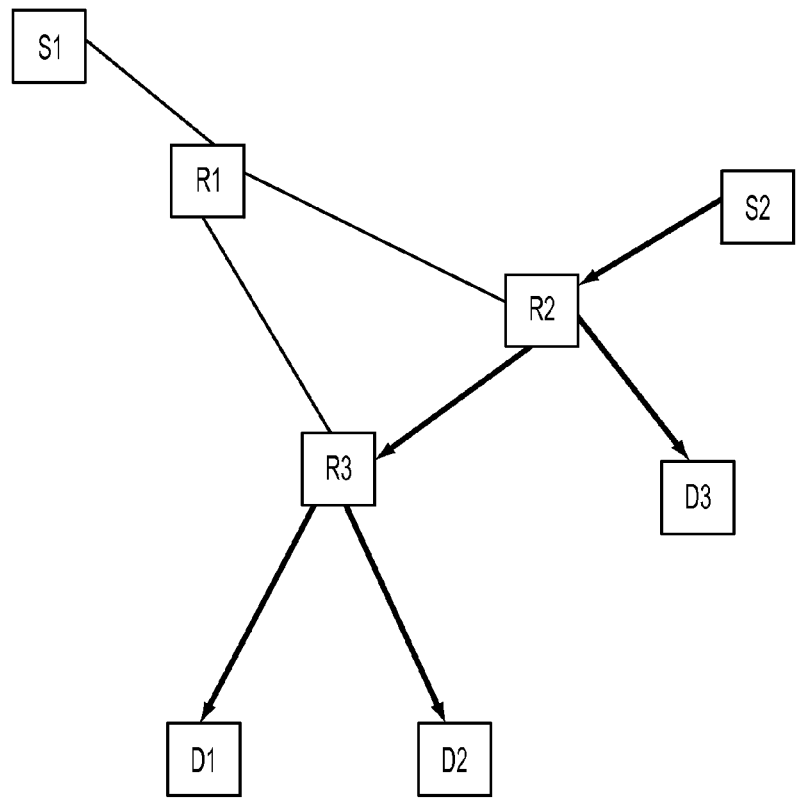

FIGS. 41-42 show examples of IP multicast packet forwarding path for multicast packets originated from S1 and S2, respectively, to multicast address G in the network shown in FIG. 40. A multicast routing table is maintained by each router to forward multicast packets to the listeners. Multicast routing tables can be constructed statically, dynamically or both statically and dynamically. Multicast routing protocols such as Distance-Vector Multicast Routing Protocol, (see [RFC1075]), Based Tree (see [RFC2189]), and PIM (Protocol-Independent Multicast) (see [RFC2362]) can be used for dynamically constructing multicast routing tables. The resulting multicast forwarding paths can be different depending on the multicast routing protocols in use. In these examples, router R3 needs to create multiple copies of each multicast packet to forward it to multiple next hop nodes for the multicast address G.

Figure 43:
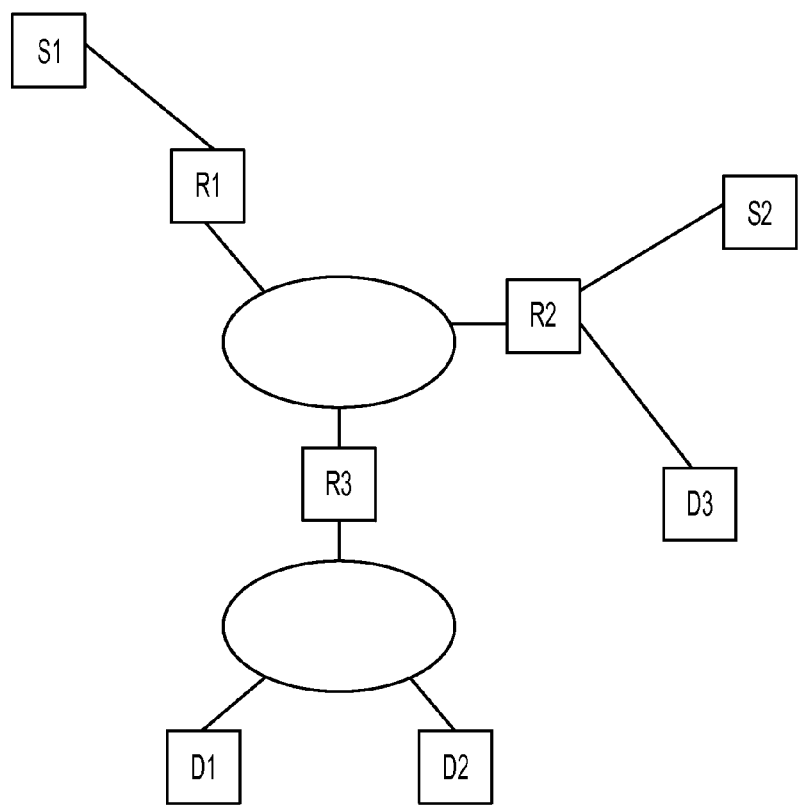

FIG. 43 shows an illustrative example of an IP multicast network containing shared links. As shown, S1 and S2 are nodes that originate IP multicast packets destined for a particular multicast address G to the network. R1, R2 and R3 are routers that are capable of forwarding IP multicast packets. In addition, D1, D2 and D3 are nodes that are the final receivers of the IP multicast packets.

Figure 44:
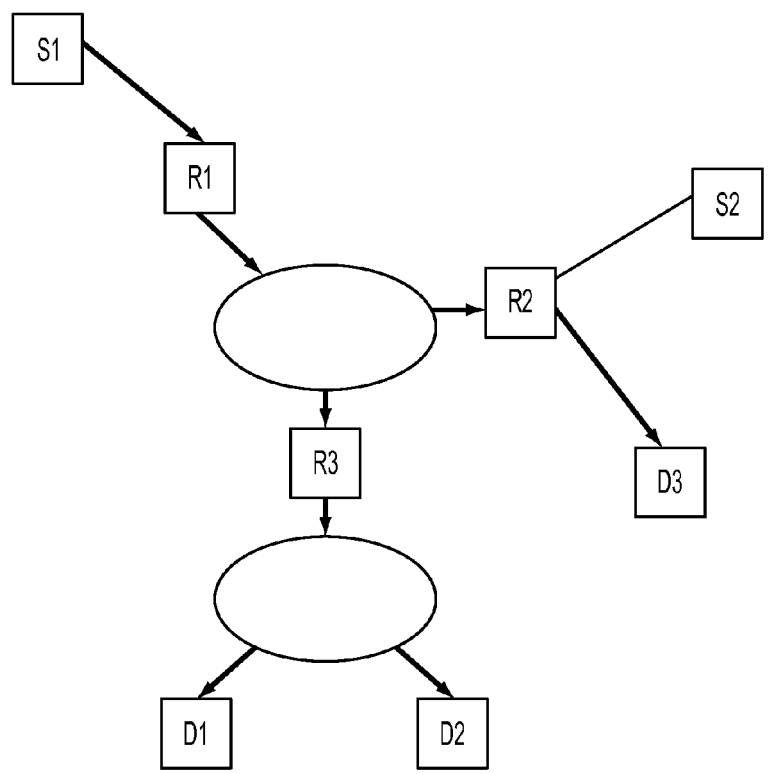

FIG. 44 shows an illustrative example of an IP multicast packet forwarding path for multicast packets originated from S1 to the multicast address G. Unlike the previous examples, here the Router R1 does not need to create multiple copies of a multicast packet to forward the packet.

1.4. Multicast Listener Discovery

Multicast Listener Discovery (MLD) is a protocol that is designed to run among IPv6 multicast routers and IPv6 multicast listeners on the same IP link for maintaining multicast listener states.

An overview of version 2 of MLD protocol is described below (see also [RFC3810]). For IPv4, IGMP (Internet Group Management Protocol) (see [RFC3376]) is used for similar purposes as MLD. Because MLD and IGMP provide the similar functionality, a similar explanation and discussion (except for differences with regard to message names and address types) can be applied to IGMP. Accordingly, in this disclosure, a discussion in relation to IGMP is not elaborated upon further in this disclosure.

A multicast listener state is maintained per link of a multicast router and conceptually involves of a set of records of the form:

(IPv6 multicast address, filter mode, source list).

The filter mode indicates either INCLUDE or EXCLUDE, where INCLUDE indicates that multicast packets sent from any source address listed in the source list and destined for the IPv6 multicast address is forwarded on the link and EXCLUDE indicates that multicast packets sent from any source address listed in the source list and destined for the IPv6 multicast address is not forwarded on the link.

In MLDv2, a multicast router multicasts a Multicast Listener Query (MLQ) message periodically or on demand on each link. An MLQ message is sent on demand when a Multicast Listener Report (MLR) message that causes a change in the multicast listener state of a link is received on the link. A multicast listener sends an MLR message when it expresses its desire to listen to or to no longer listen to a particular multicast address (or source) or when it receives an MLQ message. A multicast router updates the multicast listener state when it receives an MLR. The multicast router forwards multicast packets originated from a particular source S and destined for a particular multicast address G on an link if and only if the multicast listener state of the link indicates that forwarding packets with source-destination address pair (S,G) are explicitly allowed or not explicitly prohibited.

Figure 45:
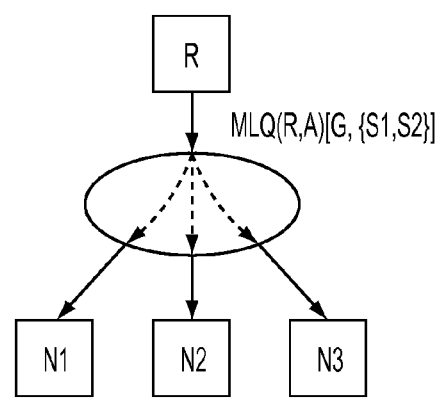
Figure 46:
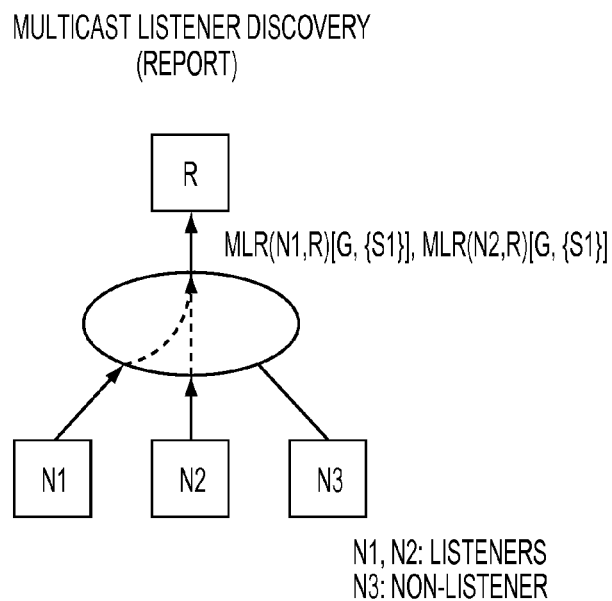

FIG. 45 shows an example for sending an MLQ message that queries the existence of multicast listeners for (S1,G) or (S2,G) multicast traffic. FIG. 46 shows an example for sending MLR messages that report the existence of multicast listeners N1 and N2 for (S1, G) multicast traffic, in response to the MLQ in FIG. 45.

1.5. MLD Snooping

Figure 47:
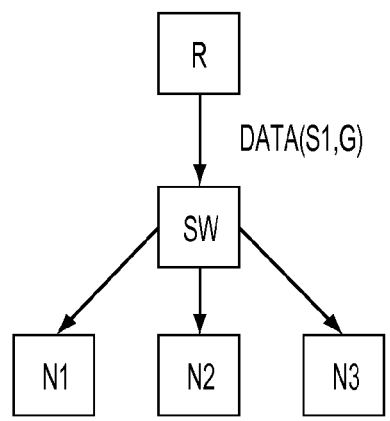
Figure 48:
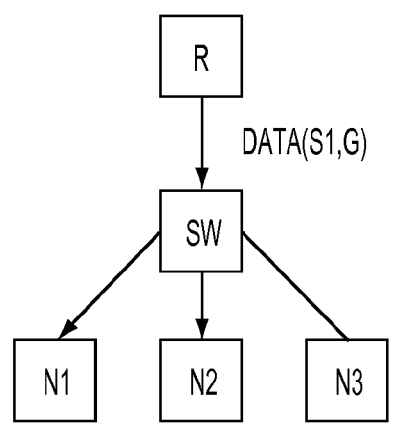
FIG. 48 is a schematic architectural diagram showing multicast data packet forwarding with MLD snooping.

FIGS. 47-48 show the packet forwarding for (S1,G) multicast packets after completion of the MLD procedure shown in FIGS. 45-46. In FIG. 47, the link-layer switch SW does not have the functionality of so called "MLD snooping" (see [MLDSNOOP]). In FIG. 48, the link-layer switch SW has this "MLD snooping" functionality. A link-layer switch with MLD snooping looks into payloads of link-layer frames to see higher-layer information including MLD headers or payloads and ICMP, and forwards link-layer multicast data frames that carry IP multicast packets only to the ports where multicast listener's presence is known by monitoring the MLD message exchanges. More specifically, a multicast listener is considered to be present on a port of the switch if the switch sees an MLR message on the port, and finer grained (and more efficient) link-layer multicast forwarding is possible by using the contents of MLR message payloads such as multicast destination addresses and multicast source addresses. Without MLD snooping, the switch will forward any link-layer multicast data frames that are allowed to be forwarded to all ports including the ports where there is no multicast listener, which could result in inefficient resource usage.

1.6. MLD Authentication

A secure extension to MLD called MLD authentication protocol or MLDA protocol is defined in the above-cited reference [MLDA]. The MLDA protocol provides the functionality for a multicast listener to authenticate to a multicast router so that only authenticated multicast listeners on a link can update the multicast listener state of the link of the multicast router. In this manner, MLD authentication can be used for subscription-based multicast streaming contents delivery by forwarding data traffic only to authenticated and authorized subscriber nodes. MLDA supports PAP (Password Authentication Protocol) and CHAP (Challenge-Response Authentication Protocol) authentication protocols for authenticating multicast listeners, which allows multicast listeners to be authenticated by backend AAA (Authentication, Authorization and Accounting) servers by having AAA client functionality on the multicast routers in order to avoid passwords of multicast listeners to be stored on every multicast router in the access networks.

1.7. SRTP

SRTP (Secure Real-time Transport Protocol) is set forth in the above-cited reference [RFC371 1] and provides application-layer per-packet encryption, integrity protection and replay protection.

2. Problem with Existing Methods

As described below, there are a variety of problems with and limitations in existing methods.

Problem 1:

A first problem involves that the MLD itself does not prevent unauthorized listeners from sending MLR messages to change the multicast listener state to receive multicast packets, which would result in free-riding of multicast-based services, regardless of whether the type of the link (e.g., point-to-point or shared) between the listeners and the multicast router and regardless of whether a MLD snooping technique is used on the link or not in the case of a shared link.

In this regard, MLDA could be used for solving this security problem by, e.g., employing an appropriate access control tied with listener authentication and authorization provided by MLDA. However, there has been no such an access control method tied with a listener authentication and authorization mechanism such as MLDA.

Problem 2:

A second problem involves a security problem due to the weakness of the authentication protocols supported by MLDA. Since both PAP and CHAP supported by MLDA are known to be vulnerable against dictionary attack when static passwords of multicast listeners are used as the shared secrets of PAP and CHAP, the use of those algorithms are dangerous and not recommended unless these authentication protocols are run over a secure communication channel. Especially, PAP and CHAP should not be used over a wireless LAN where an attacker can easily be a bogus access point to obtain or guess user passwords.

Problem 3:

A third problem involves that MLDA does not provide confidentiality of MLDA payloads. Furthermore, MLDA requires modification to MLD.

Problem 4:

A fourth problem involves that although MLDA can be integrated with AAA, since most commercial access networks require network access authentication which is also integrated with AAA, it is possible that a network access client which is also a multicast listener would result in an inefficient signaling in view of performing the AAA procedure twice, presenting once for network access authentication for obtaining a global IP address and once for receiving credentials, which should preferably be avoided as much as possible.

Problem 5:

A fifth problem involves that solutions relying solely on network layer and/or link-layer security mechanisms including MLDA and IEEE 802.11i cannot prevent clients that are authenticated and authorized for network access over a wireless access link from receiving and decoding multicast data packets that are forwarded on the link to other multicast listeners. This means that a higher-layer per-packet security mechanism such as SRTP (see [RFC3711]) is needed to avoid free-riding of multicast services over fully shared access links. Such a higher-layer per-packet multicast security mechanism needs exchange protocols to deliver multicast cipher keys to the multicast listeners in order to automate the multicast key distribution procedure. The above-noted MIKEY (see [MIKEY]) and KINK (see [KINK]) are designed to function as such. However, there is no practical solution for establishing credentials needed for using such multicast key exchange protocols.

3. Proposed Solutions 3.1. Bootstrapping MLDA from Network Access Authentication One problem of using MLDA is due to the use of static passwords of multicast listeners as the shared secrets of PAP and CHAP in MLDA. One solution is to use a dynamically generated shared secret for PAP and CHAP in MLDA. The shared secret preferably has a lifetime so that the secret is valid only for a limited amount of time. In this disclosure, a security association between a multicast listener and a multicast router based on the shared secret used in MLDA is referred to as the MLDA security association or the MLDA SA and the shared secret is referred to as the MLDA-Key. In the preferred embodiments, two exemplary methods to archive dynamic generation of an MLDA-Key are described below.

In the first method, the MLDA-Key is derived from an authentication session key which is dynamically created by using a network access authentication protocol such as, e.g., PANA (see [PANA]) and IEEE 802.1X (see [802.1X]). When PANA or IEEE 802.1X is used for a network access authentication protocol, the authentication session key can be derived from an EAP (see [RFC3748]) Master Session Key (MSK) through an AAA-Key (see [EAP-KEY]).

In the second method, the MLDA-Key can be encrypted and carried over a network access authentication protocol such as, e.g., PANA and IEEE 802.1X. When PANA is used as a network access authentication, the encrypted MLDA-Key may be carried in, e.g., PANA-Bind-Request and PANA-Bind-Answer messages. In this case, the MLDA-Key can be generated or managed by, e.g., a key distribution center (KDC). In this regard, an MLDA key distribution mechanism can be implemented for such purposes as appropriate based on this disclosure.

Figure 49:
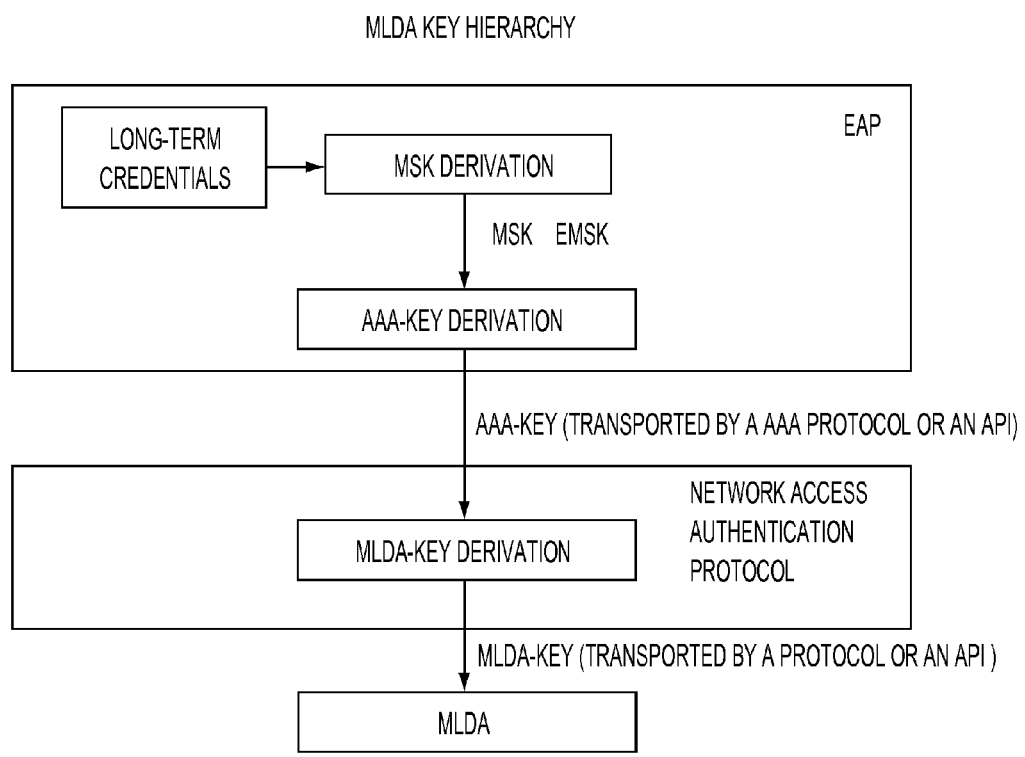
FIG. 49 is a schematic architectural diagram showing an MLDA key hierarchy.

FIG. 49 shows the MLDA key hierarchy in the first method. In FIG. 49, three protocol entities are included: EAP; network access authentication protocol (e.g., PANA and IEEE 802.1X); and MLDA. Note that a lifetime of the MLDA-Key together with the MLDA-Key may be delivered from the network access authentication entity to the MLDA entity.

By using a short-term shared secret as an MLDA-Key instead of using a long-term password, the security level of MLDA can be improved. Among other things, this provides a solution to Problem 2 described above in the preceding section 2. In addition, these illustrative methods are efficient in that an additional AAA procedure for MLDA is not needed once an AAA procedure for network access authentication is done. As a result, these also provide solutions to Problem 4 described above in the preceding section 2.

In various embodiments, an MLDA key derivation algorithm can be implemented by those in the art as appropriate based on this disclosure.

Figure 53:
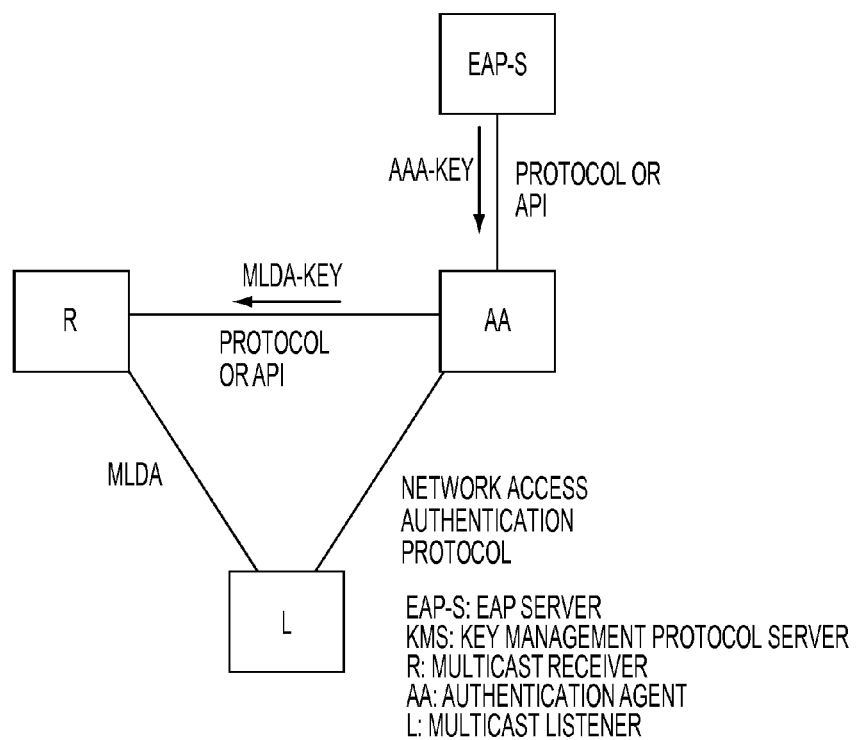
FIG. 53 is a schematic architectural diagram showing a functional model for bootstrapping MLDA in a $1^{st}$ method.

FIG. 53 shows a functional model of the first method. As shown, the EAP-S (EAP Server) is an end-point of an EAP method. The M (Authentication Agent) is an authenticator of a network access authentication protocol (such as, e.g., an IEEE 802.1X authenticator or a PANA agent). The R is a multicast router. The L is a multicast listener. In some embodiments, the EAP-S can be co-located in the same physical entity as AA. In addition, in some embodiments, the AA can be co-located in the same physical entity as the EAP-S or the R.

With reference to FIG. 53, a network access authentication occurs between L and M before MLDA is performed. In some embodiments, the network access authentication uses EAP for authenticating L, where the M contacts the EAP-S to obtain an AAA-Key via an AAA protocol or an API. When the network access authentication is completed with success, the M derives the MLDA-Key from the AAA-Key and passes the MLDA-Key to R. The L derives the same MLDA-Key locally from the AAA-Key it shares with the AA. After this point, the R and the L are able to perform MLDA.

Figure 54:
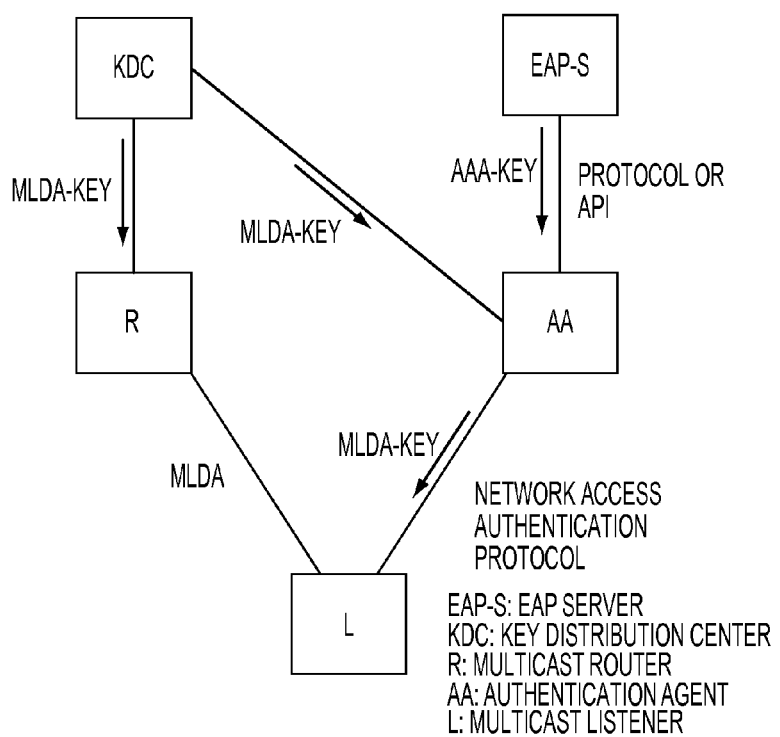
FIG. 54 is a schematic architectural diagram showing a functional model for bootstrapping MLDA in a $2^{nd}$ method.

FIG. 54 shows a functional model of the second method. As shown, the EAP-S (EAP Server) is an end-point of an EAP method. The AA (Authentication Agent) is an authenticator of a network access authentication protocol (such as, e.g., an IEEE 802.1X authenticator or a PANA agent). The R is a multicast router. The L is a multicast listener. In addition, the KDC is a key distribution center. In some embodiments, the EAP-S may be co-located in the same physical entity as the AA. In addition, in some embodiments, the M may be co-located in the same physical entity as the EAP-S or the R. Moreover, the KDC can be co-located in the same physical entity as the EAP-S, the AA or the R.

With reference to FIG. 54, a network access authentication occurs between the L and the AA first. The network access authentication uses EAP for authenticating L, where the M contacts the EAP-S to obtain an AAA-Key via an AAA protocol or an API. Upon the network access authentication completing with success, the AA obtains a copy of an MLDA key from the KDC, and delivers it to the L over the network access authentication protocol with encryption. The R may obtain a copy of the MLDA-Key from the KDC. Once the MLDA-Key is delivered to L, the R and the L are able to perform MLDA.

3.2. Protecting MLD with Multicast IPsec

Instead of using MLDA, it is possible to use IPsec AH and/or ESP to protect MLD protocol exchanges. This method provides not only integrity protection and replay protection but also confidentiality of the contents of the MLD message. In addition, this method does not require any modification to the MLD protocol itself. These two (IPsec AH and/or ESP) provide a solution for Problem 3 described above in the preceding section 2. Since the MLD protocol is based on (e.g., link-local) multicast communications, the underlying IPsec SA forms a Group Security Association or a GSA (see [RFC3740]) which is a many-to-many association (e.g., between multicast listeners and multicast routers in the case of MLD). In order to automatically create an IPsec GSA, a multicast key management protocol can be used. There are a number of key management protocols that can be used for establishing a GSA, such as, e.g., GSAKMP (see [GSAKMP]), MIKEY (see [MIKEY]) and KINK (see [KINK]).

Similar to unicast key management protocols such as, e.g., IKE, a multicast key management protocol would generally be based on unicast communications and should have mutual authentication of end-points in order to avoid a multicast key to be established by wrong entities. This means that a certain key used for mutual authentication in the multicast key management protocol should be pre-configured on each end-point of the multicast key management protocol. Such a key is referred to as a Multicast Key Management Key or an MKM-Key. In the preferred embodiments, the proposed method is based on deriving an MKM-Key and is derived from a network access authentication protocol in the same way as deriving an MLDA-Key.

Figure 50:
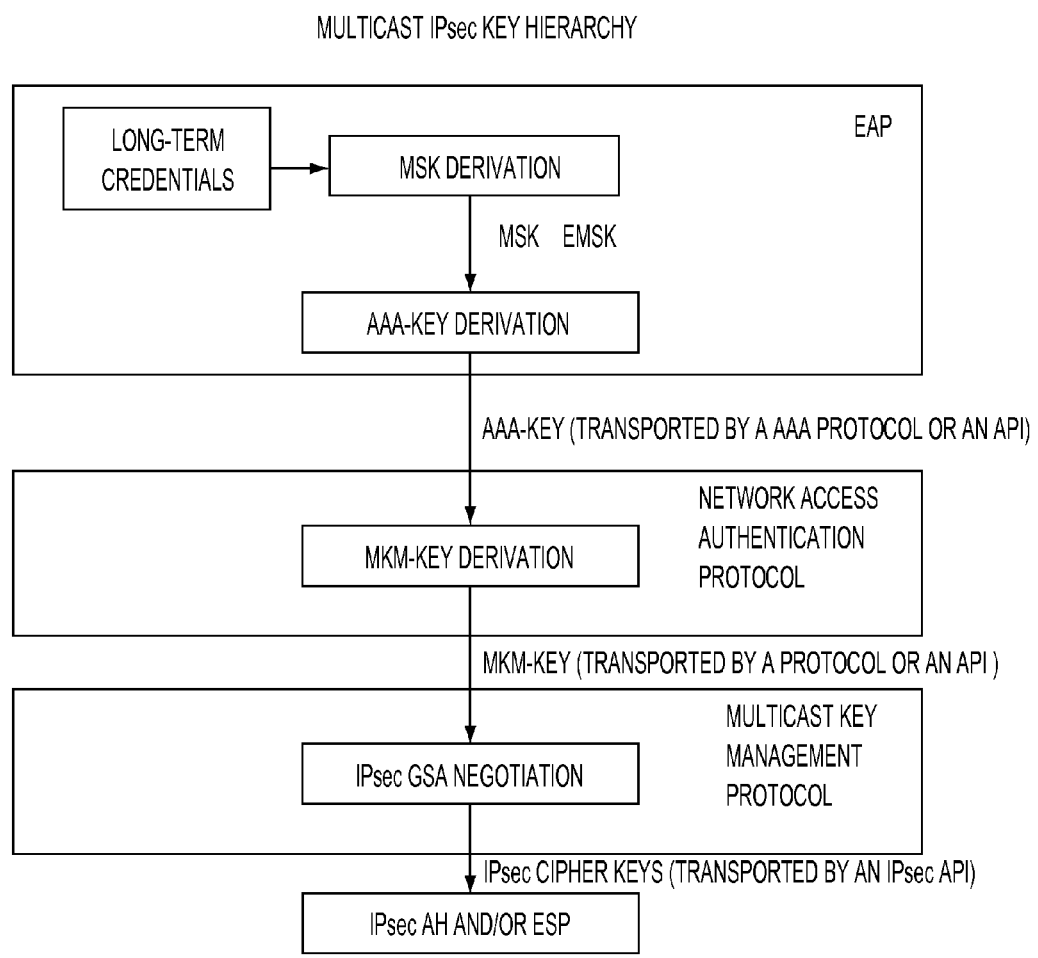
FIG. 50 is a schematic architectural diagram showing multicast IPsec key hierarchy.

FIG. 50 shows the multicast IPsec key hierarchy in the case an IPsec GSA is established by using a multicast key management protocol and an MKM-Key is derived from a network access authentication protocol.

This key derivation model can be used not only for securing MLD with multicast IPsec, but also for securing other multicast communication protocols, such as, e.g., IPv6 Neighbor Discovery (see [RFC2461]) and RTP (see [RFC3550]), with multicast IPsec.

This illustrative scheme can be very efficient in that, e.g., an additional AAA procedure for MLDA is not required once an AAA procedure for network access authentication is done. As a result, this provides a solution to Problem 4 described above in the preceding section 2.

In various embodiments, an MKD-Key derivation algorithm for each possible multicast key management protocol can be implemented by those in the art as appropriate based on this disclosure.

Figure 55:
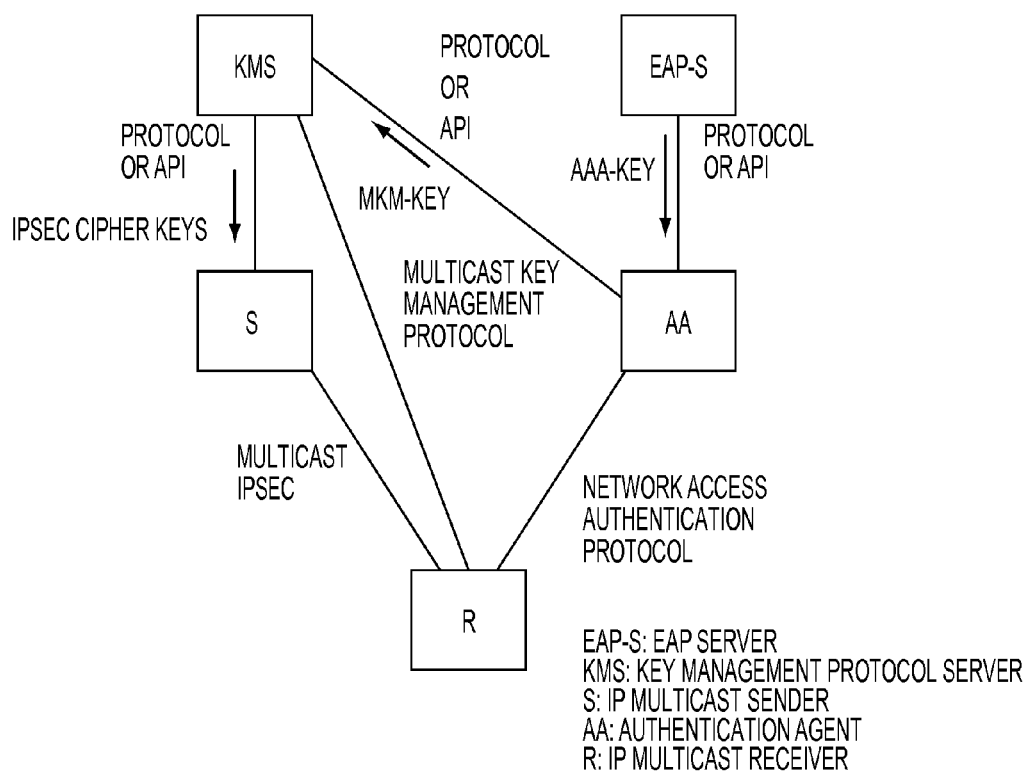
FIG. 55 is a schematic architectural diagram showing a functional model for bootstrapping multicast IPsec.

FIG. 55 shows a functional model of this method. As shown, the EAP-S (EAP Server) is an end-point of an EAP method. The M (Authentication Agent) is an authenticator of a network access authentication protocol (e.g., an IEEE 802.1X authenticator or a PANA agent). The R is a multicast IPsec receiver. The S is a multicast IPsec sender. The KMS is a key management protocol server. Here, the EAP-S may be co-located in the same physical entity as AA. In addition, the KMS may be co-located in the same physical entity as the M, the EAP-S or the S.

In FIG. 55, a network access authentication occurs between R and M first. The network access authentication uses EAP for authenticating R, where the AA contacts the EAP-S to obtain an AAA-Key via an AAA protocol or an API. When the network access authentication is completed with success, the AA derives the MKM-Key from the AAA-Key and passes the MKM-Key to the KMS. Then, the key management protocol runs between the KMS and the R. Once the key management protocol generates IPsec cipher keys, the IPsec cipher keys are delivered from the KMS to the S and finally the S and the R are able to perform MLD or any other multicast-based protocols over multicast IPsec.

3.3. Integration of MLD or MLDA and Link-Layer Multicast Access Control

In some embodiments, a link-layer switch that supports copying of layer-2 multicast frames to a limited set of ports, (e.g., a limited multicast functionality), can be used for access control of multicast traffic over a shared link.

When MLDA or MLD with IPsec is used for securely maintaining multicast listener states, a multicast router can control such a link-layer switch on the link in a way that multicast packets are forwarded to the ports where there are multicast listeners from which cryptographically valid MLR messages are received. In this method, MLDA and MLD with IPsec can be bootstrapped from a network access authentication protocol such as PANA and IEEE 802.1X by using the methods described in the preceding sections 3.1 and 3.2.

If a link-layer switch with a limited multicast functionality also supports the schemes described in the above Part II entitled "Binding Network Bridge and Network Access Control," it is possible to filter out MLR and MLQ messages originated from and destined for listeners that have not been successfully authenticated and authorized for network access. If the switch also supports MLD snooping, it is possible to perform link-layer multicast access control without relying on MLDA or MLD with IPsec. In this method, multicast listeners are authenticated and authorized for network access by using a network access authentication protocol such as, e.g., PANA and IEEE 802.1X.

Thus, these two methods can advantageously provide a solution to Problem 1 of section 2.

If, by using a signaling mechanism that is provided independently of MLD or MLDA, multicast traffic filtering information (such as, e.g., authorized multicast group addresses and/or authorized multicast source address) for a multicast listener is installed to a link-layer switch and delivery of the subsequent authorized multicast traffic to the link-layer is enabled, then MLD or MLDA may not be used between multicast listeners and the multicast router.

3.4. Bootstrapping Secure Multicast Application Session from Network Access Authentication As discussed above in section 2 with respect to Problem 5, a higher-layer per-packet security mechanism such as, e.g., SRTP (see [RFC3711]) is needed to avoid free-riding of multicast services over fully shared access links. Such a mechanism includes encryption of application data traffic. For such an application-layer security to work in large-scale environment, a mechanism would be used to automatically establish a security association for a secure application session with multicast keys. In some embodiments, there are two illustrative methods to archive this which are described in detail below.

The first method is based on bootstrapping a multicast key management protocol that is used for establishing a security association for a secure application session. In various embodiments, there are a number of key management protocols that can be used for establishing a security association for a secure multicast application session, such as, e.g., GSAKMP (see [GSAKMP]), MIKEY (see [MIKEY]) and KINK (see [KINK]). In addition, SIP may be used as a multicast key management protocol. As described above in section 3.2, an MKM-Key is needed for mutual authentication in the multicast key management protocol. The method derives an MKM-Key from a network access authentication protocol in the same way as described above in section 3.2.

Figure 51:
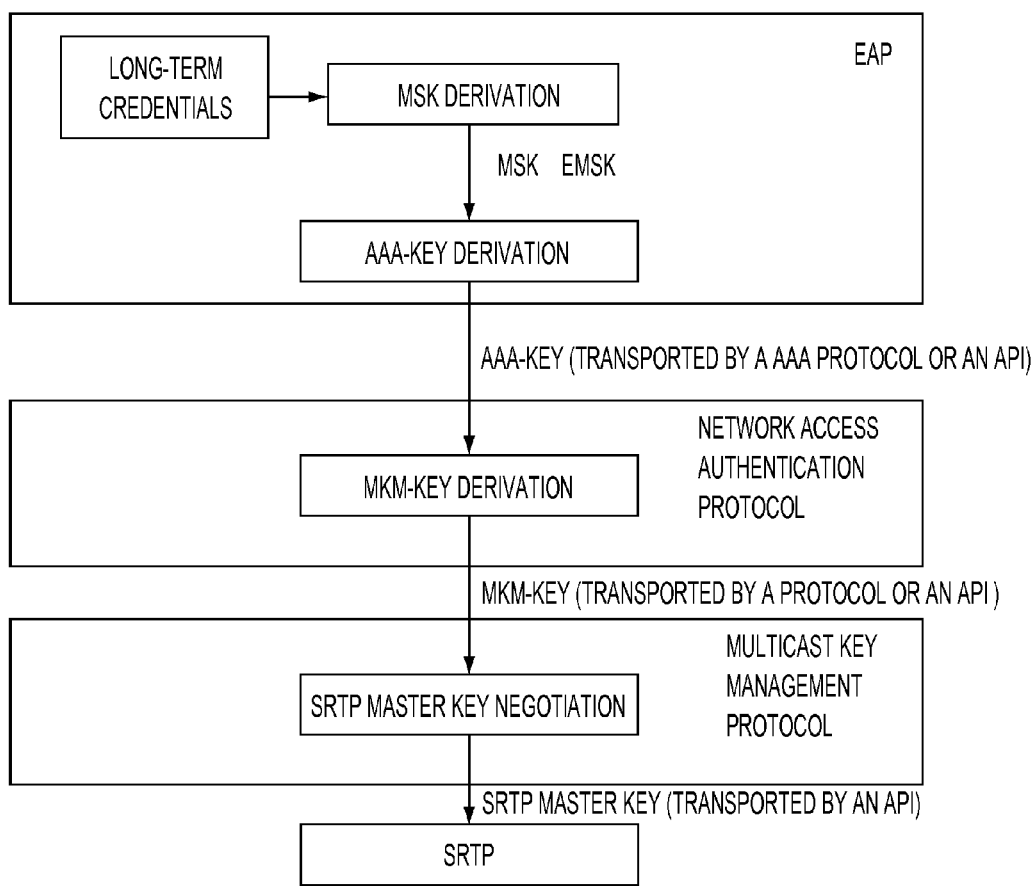
FIG. 51 is a schematic architectural diagram showing SRTP key hierarchy in a $1^{st}$ method.

FIG. 51 shows the multicast application session key hierarchy in the case SRTP is used as a secure application-layer protocol in the first method. In FIG. 51, an SRTP master key (see [RFC371 1]) is established by using a multicast key management protocol and an MKM-Key is derived from a network access authentication protocol. This key derivation model can be used not only for SRTP, but also for securing other multicast-based application-layer protocols. The particular MKM-Key derivation algorithm for each possible multicast key management protocol and application session key derivation algorithm for each possible multicast application can be implemented by those in the art as appropriate based on this disclosure.

The second method is based on carrying application session keys over a network access authentication protocol such as, e.g., PANA and IEEE 802.1X. When PANA is used as a network access authentication, application session keys such as, e.g., SRTP master keys (see [RFC3711]) may be carried with encrypted in PANA-Bind-Request and PANA-Bind-Answer messages. In this case, the application session keys can be generated or managed by a key distribution center (KDC). The application session key distribution mechanism can be implemented by those in the art as appropriate based on this disclosure.

Figure 52:
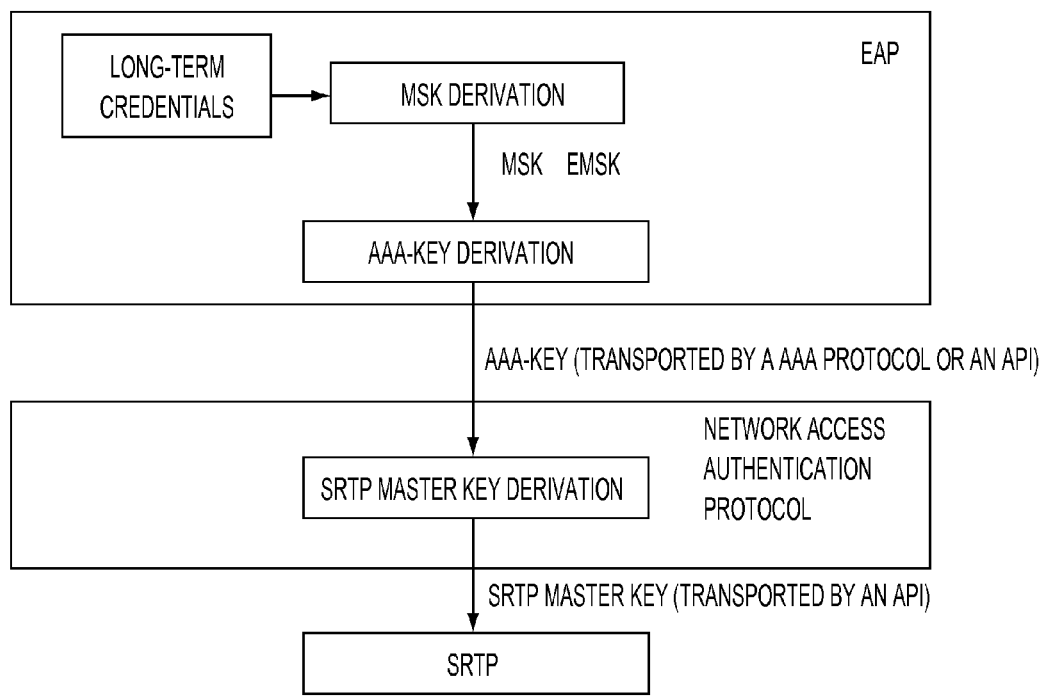
FIG. 52 is a schematic architectural diagram showing SRTP key hierarchy in a $2^{nd}$ method.

FIG. 52 shows the multicast application session key hierarchy in the case SRTP is used as a secure application-layer protocol in the second method. In FIG. 52, an SRTP master key (see [RFC3711]) is established by using a multicast key management protocol and an MKM-Key is derived from a network access authentication protocol.

In some embodiments, these two methods can provide solutions to Problem 5 described above in section 2, and may be used together with other methods described in sections 3.1 through 3.3.

Figure 56:
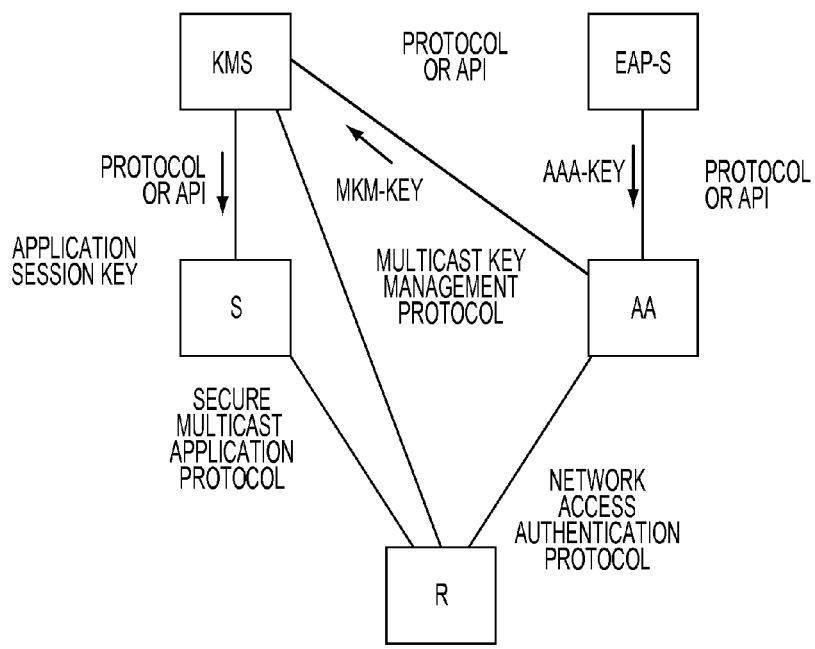
FIG. 56 is a schematic architectural diagram showing a functional model for bootstrapping a secure multicast application in a $1^{st}$ method.

FIG. 56 shows a functional model of the first method. The EAP-S (EAP Server) is an end-point of an EAP method. The M (Authentication Agent) is an authenticator of a network access authentication protocol (e.g., an IEEE 802.1X authenticator or a PANA agent). The R is a multicast application receiver. The S is a multicast application sender. The KMS is a key management protocol server. In addition, the EAP-S may be co-located in the same physical entity as M. Moreover, the KMS may be co-located in the same physical entity as the AA, the EAP-S or the S.

In FIG. 56, a network access authentication occurs between the R and the M first. The network access authentication uses EAP for authenticating R, where the M contacts the EAP-S to obtain an AAA-Key via an AAA protocol or an API. When the network access authentication is completed with success, the AA derives the MKM-Key from the AAA-Key and passes the MKM-Key to the KMS. Then, the key management protocol runs between the KMS and the R. Once the key management protocol generates an application session key, the S and the R are able to send and receive multicast application traffic protected with an application-layer security mechanism.

Figure 57:
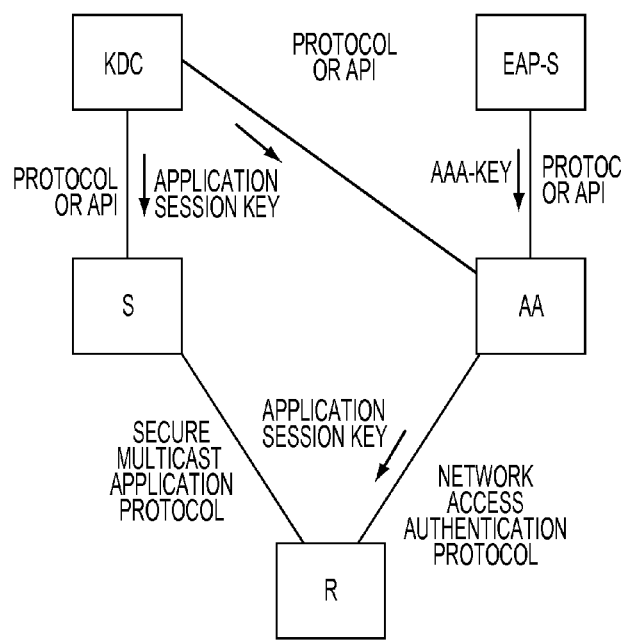
FIG. 57 is a schematic architectural diagram showing a functional model for bootstrapping a secure multicast application in a $2^{nd}$ method.

FIG. 57 shows a functional model of the second method. The EAP-S (EAP Server) is an end-point of an EAP method. The AA (Authentication Agent) is an authenticator of a network access authentication protocol (e.g., an IEEE 802.1X authenticator or a PANA agent). The R is a multicast application receiver. The S is a multicast application sender. The KDC is a key distribution center. In addition, the EAP-S may be co-located in the same physical entity as AA. And, the KDC may be co-located in the same physical entity as the AA, the EAP-S or the S.

In FIG. 57, a network access authentication occurs between the R and the M first. The network access authentication uses EAP for authenticating R, where the AA contacts the EAP-S to obtain an AAA-Key via an AAA protocol or an API. Upon the network access authentication completing with success, the AA obtains a copy of an application session key from KDC, and delivers it to the R over the network access authentication protocol. The S may obtain a copy of the application session key from KDC. Once the application session key is delivered to R, the S and the R are able to send and receive multicast application traffic protected with an application-layer security mechanism.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A system for providing secure communication in an access network, comprising:
    networked computers configured to operate as:
    an authenticator for authenticating access to said access network;
    a dynamic host configuration protocol (DHCP) server for managing internet protocol (IP) address assignments for said access network;
    a router for connecting said access network to other networks; and
    a network bridge constituting a server port, a plurality of client ports and a forwarding database configured to communicate with each other, said forwarding database is configured to store connections as a relation between media access control address (MAC) and said client ports and includes at least an authorized forwarding database (AFD), an unauthorized forwarding database (UFD), and a penalty list database (PL),
    wherein said UFD is configured to store said connections, as the relation between said MAC addresses and said client ports, that have yet to be authenticated by said authenticator, for a time period specified by said network bridge or said authenticator prior to being moved to the AFD or removed from the UFD, and said UFD is configured to remove said connections from the UFD if said connections fail in the authentication or the time period specified expires;
    wherein the connections that are authenticated are moved to said AFD, which is configured to store said authenticated connections as the relation between said MAC addresses and said client ports for a time period specified by said network bridge or said authenticator and said AFD is configured to remove said authenticated connections from the AFD based on a predetermined policy of the access network or physical disconnection of said authenticated connections from the respective client ports;
    wherein the network bridge is configured to prohibit communication exchanges from the client ports other than those that comport with said connections as the relation between said MAC addresses and said client ports stored in either of the AFD and the UFD for the time period specified; and
    wherein the penalty list database (PL) configured to store said connections removed from the UFD and remove the stored connections automatically at the expiration of a life time timer assigned to each of the stored connections in the PL and in which a length of said life time timer is configured to increase at an increasing rate or exponentially each time the same combination of the MAC address and the client port is added to the PL repeatedly in order to prevent denial of service attack (DoS) from the client ports other than the client ports that comport with said connections as the relation between said MAC addresses and said client ports stored in either of the AFD and the UFD.

2. The system of claim 1, wherein:
    said authenticator is configured so that none of the client ports are assigned with the same MAC address to prevent a user attached to one client port to act like a user attached to another client port in order to gain access to the AFD by spoofing the MAC address assigned to the user attached to the another client port.

3. The system of claim 2, wherein:
    for each of the client ports that are authenticated by the authenticator, a record of a client attached to each of the client ports is added to the AFD such that any packet exchange to and from the MAC address via the client ports other than the authenticated client ports will be prohibited in order to prevent at least a theft by spoofing and denial of service attacks.

4. The system of claim 1, wherein:
    said network bridge is configured to tag a packet with port identifier tag (PIT) when forwarding the packet to said authenticator and DHCP server, in which said authenticator and said DHCP server are configured to distinguish sessions not only by the MAC address assigned to each of the client ports but also by identifiers assigned to each of the client ports.

5. A computer network system having a network bridge for providing secure communication in an access network, comprising:
    networked computers in said access network that includes at least an authenticator, a dynamic host configuration protocol (DHCP) server and a router, wherein said network bridge includes:
    a server port that communicates with said access network;
    a plurality of client ports that connect clients to said access network;
    a forwarding database configured to store connections as a relation between media access control address (MAC) and said client ports, said forwarding database includes at least an authorized forwarding database (AFD), an unauthorized forwarding database (UFD), and a penalty list database (PL),
    wherein said UFD is configured to store said connections, as the relation between said MAC addresses and said client ports, that have yet to be authenticated by said authenticator, for a time period specified by said network bridge or said authenticator prior to being moved to the AFD or removed from the UFD, and said UFD is configured to remove said connections from the UFD if said connections fail in the authentication or the time period specified expires;
    wherein the connections that are authenticated are moved to said AFD, which is configured to store said connections as the relation between said MAC addresses and said client ports, authenticated by said authenticator, for a time period specified by said network bridge or said authenticator and said AFD is configured to remove said authenticated connections from the AFD based on a predetermined policy of the access network or physical disconnection of said authenticated connections from the respective client ports;

wherein the network bridge is configured to prohibit communication exchanges from the client ports other than those that comport with said connections as the relation between said MAC addresses and said client ports stored in either of the AFD and the UFD for the time period specified; and wherein the penalty list database (PL) configured to store said connections removed from the UFD and remove the stored connections automatically at the expiration of a life time timer assigned to each of the stored connections in the PL and in which a length of said life time timer is configured to increase at an increasing rate or exponentially each time the same combination of the MAC address and the client port is added to the PL repeatedly in order to prevent denial of service attack (DoS) from the client ports other than the client ports that comport with said connections as the relation between said MAC addresses and said client ports stored in either of the AFD and the UFD.

6. The network bridge as set forth in claim 5, wherein:
said authenticator is configured so that none of the client ports are assigned with the same MAC address to prevent a user attached to one client port to act like a user attached to another client port in order to gain access to the AFD by spoofing the MAC address assigned to the user attached to the another client port.

7. The network bridge as set forth in claim 5, wherein:
said network bridge is configured to tag a packet with port identifier tag (PIT) when forwarding the packet to said authenticator and DHCP server, in which said authenticator and said DHCP server are configured to distinguish sessions not only by the MAC address assigned to each of the client ports but also by identifiers assigned to each of the client ports.

8. The network bridge as set forth in claim 7, wherein:
for each of the client ports that are authenticated by the authenticator, a record of a client attached to each of the client ports is added to the AFD such that any packet exchange to and from the MAC address via the client ports other than the authenticated client ports will be prohibited in order to prevent at least a theft by spoofing and denial of service attacks.

9. A method for securely communicating in an access network, comprising:
authenticating access to said access network using an authenticator;
managing internet protocol (IP) address assignments for said access network using a dynamic host configuration protocol (DHCP) server;
connecting said access network to other networks using a router;
storing connections as a relation between media access control address (MAC) and client ports in a forwarding database provided in a network bridge including a server port, wherein said forwarding database includes at least an authorized forwarding database (AFD) an unauthorized forwarding database (UFD), and a penalty list database (PL);
storing in said UFD said connections, as the relation between said MAC addresses and said client ports, that have yet to be authenticated by said authenticator, for a time period specified by said network bridge or said authenticator prior to being moved to the AFD or removed from the UFD;
removing from said UFD said connections if said connections fail to authenticate or the time period specified expires;
moving the connections that are authenticated to the AFD and storing in said AFD said connections as the relation between said MAC addresses and said client ports for a time period specified by said network bridge or said authenticator;
removing from said AFD said authenticated connections based on a predetermined policy of the access network or physical disconnection of said authenticated connections from the respective client ports;
configuring the network bridge to prohibit communication exchanges from the client ports other than those that comport with said connections as the relation between said MAC addresses and said client ports stored in either of the AFD and the UFD for the time period specified;
storing in the penalty list database (PL) said connections removed from the UFD and removing the stored connections automatically at the expiration of a life time timer assigned to each of the stored connections in the PL; and
increasing a length of said life time timer at an increasing rate or exponentially each time the same combination of the MAC address and the client port is added to the PL repeatedly in order to prevent denial of service attack (DoS) from the client ports other than the client ports that comport with said connections as the relation between said MAC addresses and said client ports stored in either of the AFD and the UFD.

10. The method according to claim 9, wherein:
a step of configuring said authenticator so that none of the client ports are assigned with the same MAC address to prevent a user attached to one client port to act like a user attached to another client port in order to gain access to the AFD by spoofing the MAC address assigned to the user attached to the another client port.

11. The method according to claim 9, wherein:
a step of configuring said network bridge to tag a packet with port identifier tag (PIT) when forwarding the packet to said authenticator and DHCP server, in which said authenticator and said DHCP server are configured to distinguish sessions not only by the MAC address assigned to each of the client ports but also by identifiers assigned to each of the client ports.

12. The method according to claim 11, wherein:
for each of the client ports that are authenticated by the authenticator, adding a record of a client attached to each of the client ports to the AFD such that any packet exchange to and from the MAC address via the client ports other than the authenticated client ports will be prohibited in order to prevent at least a theft by spoofing and a denial of service attack.

* * * * *